(12) United States Patent  
Siekmann et al.

(10) Patent No.: US 11,882,284 B2  
(45) Date of Patent: Jan. 23, 2024

(54) DETERMINATION OF SET OF CANDIDATE TRANSFORMS FOR VIDEO ENCODING

(71) Applicant: Fraunhofer-Gesellschaft zur Foerderung der angewandten Forschung e.V., Munich (DE)

(72) Inventors: Mischa Siekmann, Berlin (DE); Bjoern Stallenberger, Berlin (DE); Christian Bartnik, Berlin (DE); Sebastian Bosse, Berlin (DE); Jonathan Pfaff, Berlin (DE); Philipp Helle, Berlin (DE); Jackie Ma, Berlin (DE); Martin Winken, Berlin (DE); Detlev Marpe, Berlin (DE); Heiko Schwarz, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 220 days.

(21) Appl. No.: 17/035,431

(22) Filed: Sep. 28, 2020

(65) Prior Publication Data

US 2021/0084301 A1 Mar. 18, 2021

Related U.S. Application Data

(63) Continuation of application No. PCT/EP2019/058043, filed on Mar. 29, 2019.

(30) Foreign Application Priority Data

Mar. 29, 2018 (EP) .................................. 18165242  
Mar. 15, 2019 (EP) .................................. 19163314

(51) Int. Cl.  
*H04N 19/12* (2014.01)  
*H04N 19/159* (2014.01)  
(Continued)

(52) U.S. Cl.  
CPC ........... *H04N 19/12* (2014.11); *H04N 19/159* (2014.11); *H04N 19/167* (2014.11);  
(Continued)

(58) Field of Classification Search  
None  
See application file for complete search history.

(56) References Cited

U.S. PATENT DOCUMENTS 10,750,181 B2 * 8/2020 Huang ................. H04N 19/139  
2012/0008675 A1 1/2012 Karczewicz et al.  
(Continued)

FOREIGN PATENT DOCUMENTS

CN 102388614 A * 3/2012 ........... H04N 19/109  
WO 2018011345 A1 1/2018

OTHER PUBLICATIONS

Alshina, E, et al., "Known tools performance investigation for next generation video coding", ITU-T SG16 Doc. VCEG-AZ05, 5 pp.  
(Continued)

*Primary Examiner* — Mohammed Jebari  
(74) *Attorney, Agent, or Firm* — Conley Rose, P.C.

(57) ABSTRACT

In transform coefficient coding, predetermined sets of transforms may be used. Embodiments of the present invention provide an encoder and a decoder for encoding a picture into/from a data stream using block-based prediction and block-based residual coding, the encoder and decoder supporting a set of transforms for the block-based residual coding. The encoder and decoder are configured to determine a transform candidate list of transforms for a current residual block out of the set of transforms based on a height and a width of the current residual block, and to encode/decode a prediction residual within the residual block using one selected transform out of the selectable list of transforms and selectively signal/derive the selected transform in/from the data stream.

33 Claims, 18 Drawing Sheets

(51) Int. Cl.
  *H04N 19/167* (2014.01)
  *H04N 19/176* (2014.01)
  *H04N 19/18* (2014.01)
  *H04N 19/46* (2014.01)
  *H04N 19/61* (2014.01)

(52) U.S. Cl.
  CPC ........... *H04N 19/176* (2014.11); *H04N 19/18* (2014.11); *H04N 19/46* (2014.11); *H04N 19/61* (2014.11)

(56) References Cited

U.S. PATENT DOCUMENTS

| | | | | |
|---|---|---|---|---|
| 2016/0014430 A1* | 1/2016 | Hinz | ............... | H04N 19/198 375/240.16 |
| 2017/0094314 A1* | 3/2017 | Zhao | ............... | H04N 19/159 |
| 2018/0020218 A1* | 1/2018 | Zhao | ............... | H04N 19/61 |
| 2019/0387230 A1* | 12/2019 | Sim | ............... | H04N 19/176 |
| 2021/0120269 A1* | 4/2021 | Chen | ............... | H04N 19/119 |
| 2021/0127112 A1* | 4/2021 | Choi | ............... | H04N 19/12 |

OTHER PUBLICATIONS

Chen, Jianle, et al., "Algorithm description of Joint Exploration Test Model 7", JVET-G1001, Torino, 51 pp.
Chen, Jianle, et al., "Coding tools investigation for next generation video coding", ITU-T SG16 Doc. COM16-C806, 7 pp.
Lan, Cuiling, et al., "Enhancement of HEVC using Signal Dependent Transform (SDT)", MPEG doc. m37503, Oct. 2015 and ITU-T SG16/Q6 Doc. VCEG-AZ08, Jun. 2015, 7 pp.
Li, Bohan, et al., "Layered-Givens Transforms: Tunable Complexity, Highperformance Approximation of Optimal Non-Separable Transforms", ICIP, pp. 1687-1691.
Said, Amir, et al., "Highly efficient non-separable transforms for next generation video coding.", IEEE, 5 pp.
Zhao, Xin, et al., "Mode-dependent non-separable secondary transform", ITU-T SG16/Q6 Doc. COM16-C1044, 5 pp.

* cited by examiner a)

| | | | | | | | |
|---|---|---|---|---|---|---|---|
| a | a | a | a | b | c | b | c |
| a | a | d | d | b | c | b | c |
| a | d | d | d | b | c | b | c |
| a | d | d | d | b | c | b | c |
| e | e | e | e | e | e | e | e |
| f | f | f | f | g | g | g | g |
| e | e | e | e | e | e | e | e |
| f | f | f | f | g | g | g | g | a : $T_0$   b : $T_1$   c : $T_2$
d : $T_3$   e : $T_4$   f : $T_5$
g : $T_6$ c)

| 0 | 2 | 5 | 9 | 32 | 34 | 37 | 41 |
|---|---|---|---|---|---|---|---|
| 1 | 4 | 8 | 12 | 33 | 36 | 40 | 44 |
| 3 | 7 | 11 | 14 | 35 | 39 | 43 | 46 |
| 6 | 10 | 15 | 15 | 38 | 42 | 45 | 47 |
| 16 | 18 | 21 | 25 | 48 | 50 | 53 | 57 |
| 17 | 20 | 24 | 28 | 49 | 52 | 56 | 60 |
| 15 | 22 | 27 | 30 | 52 | 55 | 59 | 62 |
| 22 | 24 | 29 | 31 | 54 | 58 | 61 | 63 |

D = {8, 8, 4, 4, 4, 4, 16, 16} d)

| 0 | 2 | 5 | 9 | 14 | 20 | 27 | 35 |
|---|---|---|---|---|---|---|---|
| 1 | 4 | 8 | 13 | 19 | 26 | 34 | 42 |
| 3 | 7 | 12 | 18 | 25 | 33 | 41 | 48 |
| 6 | 11 | 17 | 24 | 32 | 40 | 47 | 53 |
| 10 | 16 | 23 | 31 | 39 | 46 | 52 | 57 |
| 15 | 22 | 30 | 38 | 45 | 51 | 56 | 60 |
| 21 | 29 | 37 | 44 | 50 | 55 | 59 | 62 |
| 28 | 36 | 43 | 49 | 54 | 58 | 61 | 63 |

| 0 | 4 | 1 | 5 | 2 | 6 | 3 | 7 |
|---|---|---|---|---|---|---|---|
| 8 | 12 | 9 | 13 | 10 | 14 | 11 | 15 |
|   |   |   |   |   |   |   |   |
|   |   |   |   |   |   |   |   |
|   |   |   |   |   |   |   |   |
|   |   |   |   |   |   |   |   |
|   |   |   |   |   |   |   |   | o)

DETERMINATION OF SET OF CANDIDATE TRANSFORMS FOR VIDEO ENCODING

CROSS-REFERENCE TO RELATED APPLICATIONS

This application is a continuation of copending International Application No. PCT/EP2019/058043, filed Mar. 29, 2019, which is incorporated herein by reference in its entirety, and additionally claims priority from European Applications No. 18165242.1, filed Mar. 29, 2018, and 19163314.8, filed Mar. 15, 2019, which are both incorporated herein by reference in their entirety.

BACKGROUND OF THE INVENTION

The present invention is concerned with picture and video coding, and in particular with block-based picture and video coding. The picture may be a still image or a consecutive order of images in a moving picture sequence. Some particular examples and embodiments of the present invention are concerned with an unified and extended scheme for residual coding in the context of video coding, utilizing a mode-dependent set of transform candidates used for a transform for obtaining the respective residual signal in the spatial domain.

1. Technical Background

In addition to DCT-II and 4×4 DST-VII, which have been employed in some standards as in HEVC (High Efficiency Video Coding), other standards like JEM (Joint Exploration Test Model) for example may define two extra families of transforms. The set of Adaptive Multiple Core Transforms (AMT) and Mode-dependent Non-Separable Secondary Transforms (NSST).

2.1 Adaptive Multiple Core Transform [1,8]

AMT extends the set of available transforms for luma components by transforms from the DCT/DST families, namely DST-VII, DCT-VIII, DST-I and DCT-V. AMT applies if the according CU level flag is set, otherwise DCT-II is used. For inter coded blocks, two additional flags decide between DST-VII and DCT-VIII for each horizontal and vertical transform, respectively. If a block is intra coded, it depends on the intra prediction mode, which transforms are available. Each intra mode maps to two out of three predefined sets. One for each horizontal and vertical transform. Each set consists of two transforms. If the number of significant coefficients is larger than a predefined threshold an index is signaled for each direction, otherwise the first transform of each set is used.

2.2 Mode-Dependent Non-Separable Secondary Transforms [1,2]

NSST defines second stage transforms which are applied to coefficients of a core transform (primary transform). "If both width and height of a transform coefficient block is larger than or equal to 8, then 8×8 non-separable secondary transform is applied to the top-left 8×8 region of the transform coefficients block. Otherwise, if either W or H of a transform coefficient block is equal to 4, a 4×4 non-separable secondary transform is applied and the 4×4 non-separable transform is performed on the top-left min(8,W)× min(8,H) region of the transform coefficient block. The above transform selection rule is applied for both luma and chroma components." [1]

2.3 Large Block-Size Transforms with High-Frequency Zeroing

"In the JEM, large block-size transforms, up to 128×128 in size, are enabled, which is primarily useful for higher resolution video, e.g., 1080p and 4K sequences. High frequency transform coefficients are zeroed out for those transform blocks having a size (width or height, or both width and height) larger than or equal to 64, so that only the lower-frequency coefficients are maintained. For example, for an M×N transform block, with M as the block width and N as the block height, when M is larger than or equal to 64, only the left 32 columns of transform coefficients are kept. Similarly, when N is larger than or equal to 64, only the top 32 rows of transform coefficients are kept. When transform skip mode is used for a large block, the entire block is used without zeroing out any values." [1]

However, existing techniques may have several drawbacks. For example, with increasing picture size, the coding effort increases considerably. Thus, it would be desirable to provide a codec with improved efficiency.

SUMMARY

Therefore, it is suggested to provide a mode-dependent set of transform candidates. The identification of the transform used for obtaining the residual signal in spatial domain may exploit a candidate list utilizing already decoded syntax elements. The coefficients of the residual block may be decoded conditioned on the available transforms in the candidate list. In doing so, the candidate list itself can be iteratively reduced by removing those transforms that conflict with already obtained information about the coefficients. When all coefficients are decoded and more than one transform candidate is left, an index into the candidate list may be signaled.

The innovative concept of introducing a mode dependent candidate list may allow for a flexible and efficient testing and signaling of transforms for residual blocks. For example, the classification of structured transforms by their induced constraints may allow for exploiting the dependencies between chosen transforms, resulting coefficients and neighboring transform blocks.

An embodiment may have an encoder for encoding a picture into a data stream using block-based prediction and block-based residual coding, the encoder supporting a set of transforms for the block-based residual coding and configured to determine a selectable list of transforms for a current residual block out of the set of transforms; encode transform coefficient data into the data stream which represents a prediction residual within the residual block using one selected transform out of the selectable list of transforms; signal the selected transform in the data stream, and/or perform the determination of the selectable list, in a manner depending on the transform coefficient data or on a portion of the transform coefficient data.

Another embodiment may have a decoder for decoding a picture from a data stream using block-based prediction and block-based residual decoding, the decoder supporting a set of transforms for the block-based residual decoding and configured to determine a selectable list of transforms for a current residual block out of the set of transforms; decode transform coefficient data from the data stream which represents a prediction residual within the residual block using one selected transform out of the selectable list of transforms; derive the selected transform from the data stream, and/or perform the determination of the selectable list, in a manner depending on the transform coefficient data or on a portion of the data transform coefficient data.

According to another embodiment, a method for encoding a picture into a data stream using block-based prediction and block-based residual coding, supporting a set of transforms for the block-based residual coding, may have the steps of: determining a selectable list of transforms for a current residual block out of the set of transforms; encoding transform coefficient data into the data stream which represents a prediction residual within the residual block using one selected transform out of the selectable list of transforms; signaling the selected transform in the data stream, and/or perform the determination of the selectable list, in a manner depending on the transform coefficient data or on a portion of the transform coefficient data.

According to another embodiment, a method for decoding a picture from a data stream using block-based prediction and block-based residual decoding, supporting a set of transforms for the block-based residual decoding, may have the steps of: determining a selectable list of transforms for a current residual block out of the set of transforms; decoding transform coefficient data from the data stream which represents a prediction residual within the residual block using one selected transform out of the selectable list of transforms; deriving the selected transform from the data stream, and/or perform the determination of the selectable list, in a manner depending on the transform coefficient data or a portion of the data transform coefficient data.

Still another embodiment may have a non-transitory digital storage medium having stored thereon a computer program for performing a method for encoding a picture into a data stream using block-based prediction and block-based residual coding, supporting a set of transforms for the block-based residual coding, the method having the steps of: determining a selectable list of transforms for a current residual block out of the set of transforms; encoding transform coefficient data into the data stream which represents a prediction residual within the residual block using one selected transform out of the selectable list of transforms; signaling the selected transform in the data stream, and/or perform the determination of the selectable list, in a manner depending on the transform coefficient data or on a portion of the transform coefficient data, when said computer program is run by a computer.

Another embodiment may have a non-transitory digital storage medium having stored thereon a computer program for performing a method for decoding a picture from a data stream using block-based prediction and block-based residual decoding, supporting a set of transforms for the block-based residual decoding, the method having the steps of: determining a selectable list of transforms for a current residual block out of the set of transforms; decoding transform coefficient data from the data stream which represents a prediction residual within the residual block using one selected transform out of the selectable list of transforms; deriving the selected transform from the data stream, and/or perform the determination of the selectable list, in a manner depending on the transform coefficient data or a portion of the data transform coefficient data, when said computer program is run by a computer.

Another embodiment may have a data stream obtainable by the above inventive method for encoding a picture.

Still another embodiment may have a datastream obtainable by the above inventive method for decoding a picture.

Aspects of the Invention

According to a first aspect, embodiments of the present innovative concept may provide an encoder for encoding a picture into a data stream using block-based prediction and block-based residual coding, the encoder supporting a set of transforms for the block-based residual coding. The encoder may be configured to determine a transform candidate list of transforms for a current residual block out of the set of transforms based on a height and a width of the current residual block. The encoder may further be configured to encode a prediction residual within the residual block using one selected transform out of the selectable list of transforms and selectively signal the selected transform in the data stream. Signaling may selectively denote the fact that possibly the candidate list contains merely one candidate transform so that the signaling may be left off.

According to the first aspect, further embodiments of the present innovative concept may provide a decoder for decoding a picture from a data stream using block-based prediction and block-based residual decoding, the decoder supporting a set of transforms for the block-based residual decoding. The decoder may be configured to determine a transform candidate list of transforms for a current residual block out of the set of transforms based on a height and a width of the current residual block, and to decode a prediction residual within the residual block in a domain of one selected transform out of the selectable list of transforms with selectively deriving the selected transform from the data stream. Deriving may selectively denote the fact that possibly the candidate list contains merely one candidate transform so that the signaling/derivation may be left off.

According to a second aspect, embodiments of the present innovative concept may provide an encoder for encoding a picture into a data stream using block-based prediction and block-based residual coding, the encoder supporting a set of transforms for the block-based residual coding. The encoder may be configured to determine a selectable list of transforms for a current residual block out of the set of transforms, and to encode transform coefficient data into the data stream which represents a prediction residual within the residual block using one selected transform out of the selectable list of transforms. The encoder may further be configured to signal the selected transform in the data stream, and/or to perform the determination of the selectable list in a manner depending on the transform coefficient data or on a portion of the transform coefficient data.

According to the second aspect, further embodiments of the present innovative concept may provide a decoder for decoding a picture from a data stream using block-based prediction and block-based residual decoding, the decoder supporting a set of transforms for the block-based residual decoding. The decoder may be configured to determine a selectable list of transforms for a current residual block out of the set of transforms, and to decode transform coefficient data from the data stream which represents a prediction residual within the residual block using one selected transform out of the selectable list of transforms. The decoder may further be configured to derive the selected transform from the data stream, and/or to perform the determination of the selectable list, in a manner depending on the transform coefficient data or on a portion of the data transform coefficient data.

According to a third aspect, embodiments of the present innovative concept may provide an encoder for encoding a picture into a data stream using block-based prediction and block-based residual coding, the encoder supporting a set of transforms for the block-based residual coding. The encoder may be configured to determine a selectable list of transforms for a current residual block out of the set of transforms, and to signal the selected transform in the data stream. The encoder may further be configured to encode transform coefficients which represent a prediction residual within the residual block using one selected transform out of the selectable list of transforms in a manner dependent on the selected transform or on the selectable list of transforms.

According to the third aspect, further embodiments of the present innovative concept may provide a decoder for decoding a picture from a data stream using block-based prediction and block-based residual decoding, the decoder supporting a set of transforms for the block-based residual decoding. The decoder may be configured to determine a selectable list of transforms for a current residual block out of the set of transforms, and to derive the selected transform from the data stream. The decoder may further be configured to decode from the data stream transform coefficients which represent a prediction residual within the residual block using one selected transform out of the selectable list of transforms in a manner dependent on the selected transform or the selectable list of transforms.

According to a fourth aspect, embodiments of the present innovative concept may provide an encoder for encoding a picture into a data stream using block-based prediction and block-based residual coding, the encoder supporting a set of transforms for the block-based residual coding. The encoder may be configured to determine a selectable list of transforms for a current residual block out of the set of transforms, and to encode a prediction residual within the residual block using one selected transform out of the selectable list of transforms. The encoder may further be configured to signal the selected transform in the data stream using an transform indicator, wherein the transform indicator is signaled in the data stream using a code with one or more digits, wherein each of a set of the one or more digits is uniquely associated with a respective transform property.

According to the fourth aspect, further embodiments of the present innovative concept may provide a decoder for decoding a picture from a data stream using block-based prediction and block-based residual decoding, the decoder supporting a set of transforms for the block-based residual decoding. The decoder may be configured to determine a selectable list of transforms for a current residual block out of the set of transforms, and to decode from the data stream a prediction residual within the residual block using one selected transform out of the selectable list of transforms. The decoder may further be configured to derive the selected transform from the data stream using an transform indicator, wherein the transform indicator is derived from the data stream using a code with one or more digits, wherein each of a set of the one or more digits is uniquely associated with a respective transform property. For example, the code may comprise bins of the transform indicator subject to binary arithmetic coding or syntax elements which the transform indicator is composed of and which may be parsed from the data stream.

According to a fifth aspect, embodiments of the present innovative concept may provide an encoder for encoding a picture into a data stream using block-based prediction and block-based residual coding, the encoder supporting a set of transforms for the block-based residual coding. The encoder may further be configured to predict an intra-predicted block by applying a spatial neighborhood of the intra-predicted block onto a selected neural network out of a plurality of neural networks to obtain a prediction of the intra-predicted block, and to determine a selectable set of transforms for a residual block covering the intra-predicted block out of the set of transforms based on the selected neural network and a block size of the residual block. The encoder may further be configured to encode a prediction residual associated with the prediction of the intra-predicted block within the residual block using one selected transform out of the selectable set of transforms and signal the selected transform in the data stream.

According to the fifth aspect, further embodiments of the present innovative concept may provide a decoder for decoding a picture from a data stream using block-based prediction and block-based residual decoding, the decoder supporting a set of transforms for the block-based residual decoding. The decoder may be configured to predict an intra-predicted block by applying a spatial neighborhood of the intra-predicted block onto a selected neural network out of a plurality of neural networks to obtain a prediction of the intra-predicted block, and to determine a selectable set of transforms for a residual block covering the intra-predicted block out of the set of transforms based on the selected neural network and a block size of the residual block. The decoder may further be configured to decode a prediction residual associated with the prediction of the intra-predicted block within the residual block from the data stream in a domain of one selected transform out of the selectable set of transforms with deriving the selected transform from the data stream.

According to a sixth aspect, embodiments of the present innovative concept may provide an encoder for encoding a picture into a data stream using block-based prediction and block-based residual coding. The encoder may be configured to predict an intra-predicted block by applying a spatial neighborhood of the intra-predicted block onto a neural network to obtain a prediction of the intra-predicted block in a domain of a primary transform, and to encode a prediction residual associated with the prediction of the intra-predicted block within a residual block using one selected transform out of a selectable set of transforms and signal the selected transform in the data stream, wherein the selectable set of transforms is populated by at least one multi-stage transform involving the primary transform and a secondary transform applied onto a sub-group of primary transform coefficients of the primary transform.

According to the sixth aspect, further embodiments of the present innovative concept may provide a decoder for decoding a picture from a data stream using block-based prediction and block-based residual coding. The decoder may be configured to predict an intra-predicted block by applying a spatial neighborhood of the intra-predicted block onto a neural network to obtain a prediction of the intra-predicted block in a domain of a primary transform, and to decode from the data stream a prediction residual associated with the prediction of the intra-predicted block within a residual block in a further domain of one selected transform out of a selectable set of transforms with deriving the selected transform from the data stream, wherein the selectable set of transforms is populated by at least one multi-stage transform involving the primary transform and a secondary transform applied onto a sub-group of primary transform coefficients of the primary transform.

According to a seventh aspect, embodiments of the present innovative concept may provide an encoder for encoding a picture into a data stream using block-based prediction and block-based residual coding, the encoder supporting a set of transforms for the block-based residual coding. The encoder may be configured to predict an intra-predicted block based on a spatial neighborhood of the intra-predicted block using a selected one of out of a set of intra prediction modes to obtain a prediction of the intra-predicted block, and to determine a selectable set of transforms for a residual block covering the intra-predicted block out of the set of transforms based on the selected intra prediction mode and a block size of the residual block. The encoder may further be configured to encode a prediction residual associated with the prediction of the intra-predicted block within the residual block using one selected transform out of the selectable set of transforms and signal the selected transform in the data stream.

According to the seventh aspect, further embodiments of the present innovative concept may provide a decoder for decoding a picture from a data stream using block-based prediction and block-based residual decoding, the decoder supporting a set of transforms for the block-based residual decoding. The decoder may be configured to predict an intra-predicted block based on a spatial neighborhood of the intra-predicted block using a selected one of out of a set of intra prediction modes to obtain a prediction of the intra-predicted block, and to determine a selectable set of transforms for a residual block covering the intra-predicted block out of the set of transforms based on the selected intra prediction mode and a block size of the residual block. The decoder may further be configured to decode from the data stream a prediction residual associated with the prediction of the intra-predicted block within the residual block in a domain of one selected transform out of the selectable set of transforms with deriving the selected transform from the data stream.

According to an eighth aspect, embodiments of the present innovative concept may provide an encoder for encoding a picture into a data stream using block-based prediction and block-based residual coding, the encoder supporting a set of transforms for the block-based residual coding. The encoder may be configured to determine a selectable list of transforms for a current residual block out of the set of transforms based on a reference transform selected for a neighboring residual block, e.g. also out of the set of transforms for sake of coding the latter's prediction residual. The encoder may further be configured to encode a prediction residual within the residual block using one selected transform out of the selectable list of transforms and signal the selected transform in the data stream.

According to the eighth aspect, further embodiments of the present innovative concept may provide a decoder for decoding a picture from a data stream using block-based prediction and block-based residual decoding, the decoder supporting a set of transforms for the block-based residual decoding. The decoder may be configured to determine a selectable list of transforms for a current residual block out of the set of transforms based on a reference transform selected for a neighboring residual block, e.g. also out of the set of transforms for sake of coding the latter's prediction residual. The decoder may further be configured to decode a prediction residual within the residual block in a domain of one selected transform out of the selectable list of transforms with deriving the selected transform from the data stream.

According to a ninth aspect, embodiments of the present innovative concept may provide an encoder for encoding a picture into a data stream using block-based prediction and block-based residual coding, the encoder supporting a set of transforms for the block-based residual coding. The encoder may be configured to determine a selectable list of transforms for a current residual block out of the set of transforms, in a manner dependent on a quantization parameter of the current block. If the quantization parameter corresponds to a quantization that is finer than a certain threshold, then the selectable list of transforms for a current residual block is populated with at least one multi-stage transform comprising a primary transform that is applied onto a prediction residual within the current residual block and a secondary transform that is applied onto a sub-group of primary transform coefficients of the primary transform. However, if the quantization parameter corresponds to a quantization coarser than a certain threshold, then the selectable list of transforms for a current residual block may be populated, either in addition to or in place of the at least one multi-stage transform, with a modification of the at least one multi-stage transform according to which the primary transform coefficients beyond the sub-group are zeroed. In both cases the encoder may be configured to encode the prediction residual within the residual block using one selected transform out of the selectable list of transforms and signal the selected transform in the data stream.

According to the ninth aspect, further embodiments of the present innovative concept may provide a decoder for decoding a picture from a data stream using block-based prediction and block-based residual decoding, the decoder supporting a set of transforms for the block-based residual decoding. The decoder may be configured to determine a selectable list of transforms for a current residual block out of the set of transforms, in manner dependent on a quantization parameter of the current block. If the quantization parameter corresponds to a quantization that is finer than a certain threshold, then the selectable list of transforms for a current residual block is populated with at least one multi-stage transform comprising a primary transform being applied onto a prediction residual within the current residual block, and a secondary transform being applied onto a sub-group of primary transform coefficients of the primary transform. However, if the quantization parameter corresponds to a quantization that is coarser than a certain threshold, then the selectable list of transforms for a current residual block is populated, either in addition to or in place of the at least one multi-stage transform, with a modification of the at least one mufti-stage transform wherein the primary transform coefficients beyond the sub-group are zeroed. In both cases, the decoder may be configured to decode the prediction residual within the residual block in a domain of one selected transform out of the selectable list of transforms with deriving the selected transform from the data stream.

According to a tenth aspect, embodiments of the present innovative concept may provide an encoder for encoding a picture into a data stream using block-based prediction and block-based residual coding, the encoder supporting a set of transforms for the block-based residual coding. The encoder may be configured to determine a selectable list of transforms for a current residual block out of the set of transforms based on a reference transform selected for a neighboring residual block, in a manner dependent on a number of, or dependent on a sum over, significant transform coefficients in one or more neighboring residual blocks. If the number or sum is larger than a certain threshold, then the selectable list of transforms for a current residual block is populated with at least one multi-stage transform including a primary transform being applied onto a prediction residual of the current residual block and a secondary transform being applied onto a sub-group of primary transform coefficients of the primary transform. However, if the number or sum is smaller than the certain threshold, then the selectable list of transforms for a current residual block is populated, in addition to or in place of the at least one multi-stage transform, with a modification of the at least one multi-stage transform, wherein primary transform coefficients beyond the sub-group are zeroed. In both cases, the encoder may be configured to encode a prediction residual within the residual block using one selected transform out of the selectable list of transforms and signal the selected transform in the data stream.

According to the tenth aspect, further embodiments of the present innovative concept may provide a decoder for decoding a picture from a data stream using block-based prediction and block-based residual decoding, the decoder supporting a set of transforms for the block-based residual decoding. The decoder may be configured to determine a selectable list of transforms for a current residual block out of the set of transforms based on a reference transform selected for a neighboring residual block, in manner dependent on a number of, or dependent on a sum over, significant transform coefficients in one or more neighboring residual blocks. If the number or sum is larger than a certain threshold, then the selectable list of transforms for a current residual block is populated with at least one multi-stage transform including a primary transform being applied onto a prediction residual of the current residual block and a secondary transform being applied onto a sub-group of primary transform coefficients of the primary transform. However, if the number or sum is smaller than the certain threshold, then the selectable list of transforms for a current residual block is populated, in addition to or in place of the at least one multi-stage transform, with a modification of the at least one multi-stage transform wherein primary transform coefficients beyond the sub-group are zeroed. In both cases, the decoder may further be configured to decode a prediction residual within the residual block in a domain of one selected transform out of the selectable list of transforms with deriving the selected transform from the data stream.

According to a further aspect, computer programs are provided, wherein each of the computer programs is configured to implement the above-described methods of encoding and/or decoding when being executed on a computer or signal processor, so that the above-described method is implemented by one of the computer programs.

BRIEF DESCRIPTION OF THE INVENTION

In the following, embodiments of the present disclosure are described in more detail with reference to the figures, in which.

DETAILED DESCRIPTION OF THE INVENTION

Figure 1:
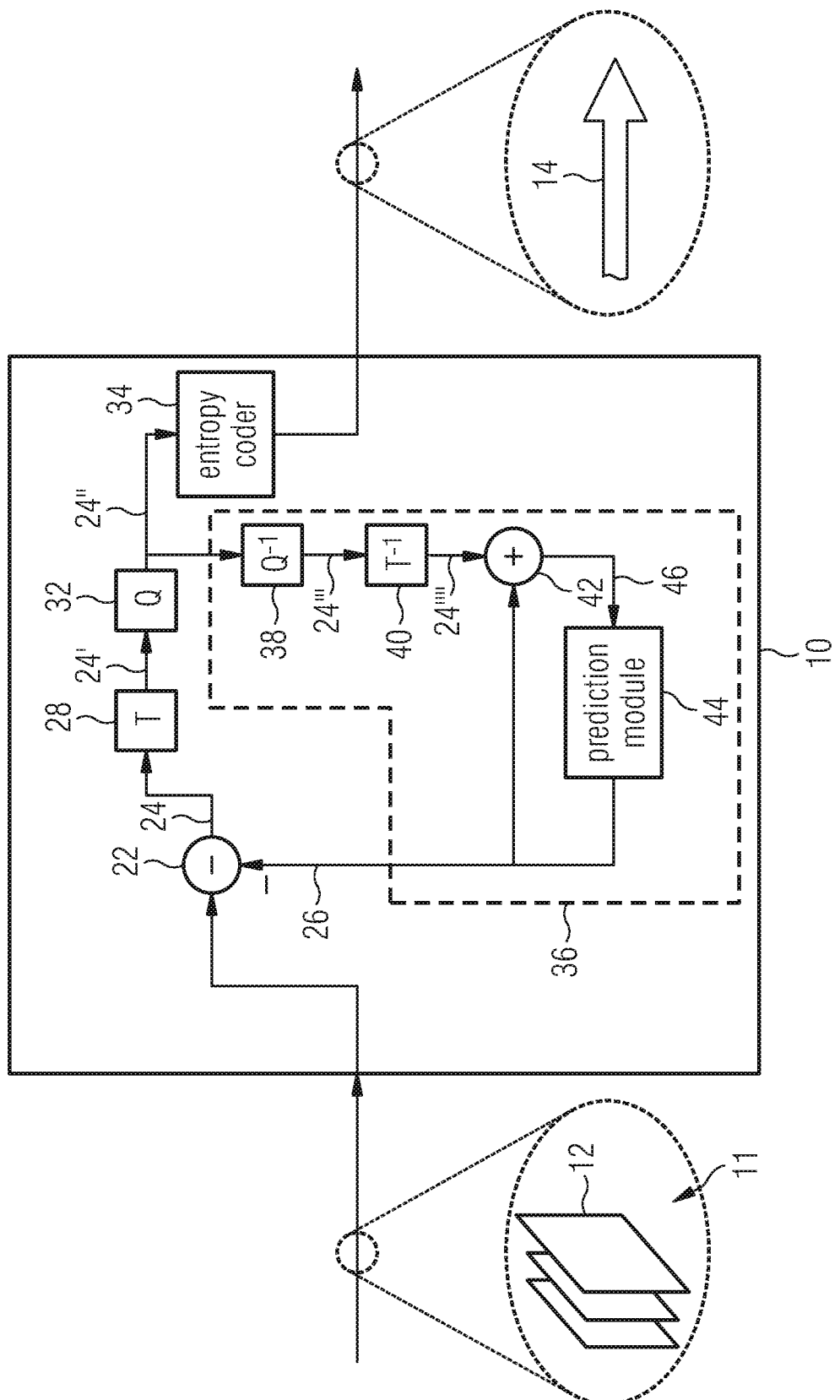
FIG. 1 shows a schematic block diagram of an encoder that may be used in one or more embodiments of the present invention.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

The term transformation may herein also be abbreviated by the term trafo. The term transformation may synonymously be used both for a transformation and a transform (i.e. the result of a transformation).

The following description of the figures starts with a presentation of a description of video encoder and video decoder of a block-based predictive codec for coding pictures of a video in order to form an example for a coding framework into which embodiments described herein may be built. The video encoder and video decoder are described with respect to FIGS. 1 to 3. Thereinafter the description of further embodiments of the present application are presented with respect to figures. Same are numbered and in the above section a reference is made which portions above refer to which embodiment described and claimed below. All these embodiments could be built into the video encoder and decoder of FIGS. 1 and 2, respectively, although the embodiments described herein such as those described with respect to the subsequent Figures may also be used to form video encoder and video decoders not operating according to the coding framework underlying the video encoder and video decoder of FIGS. 1 and 2.

FIG. 1 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10.

Figure 2:
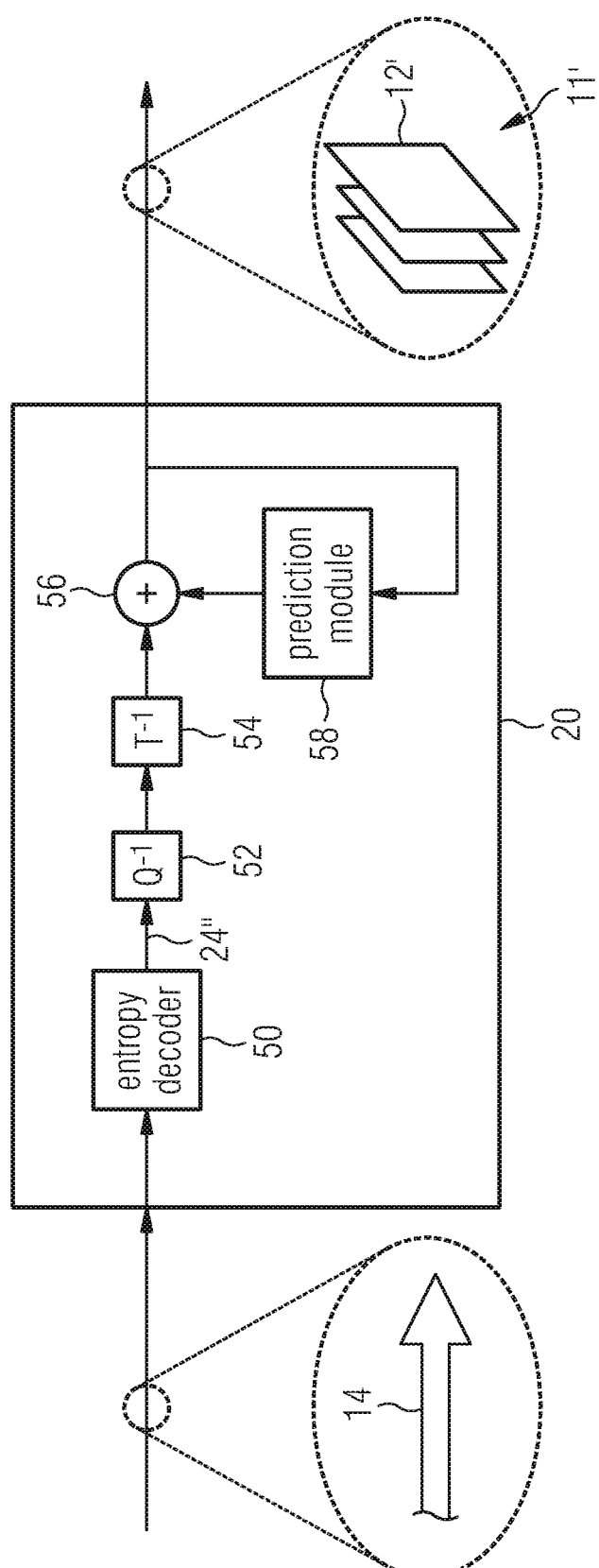
FIG. 2 shows a schematic block diagram of a decoder that may be used in one or more embodiments of the present invention.

FIG. 2 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatus 10 in terms of coding loss introduced by a quantization of the prediction residual signal.

FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal 26 from the original signal, i.e. current picture 12.

The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14.

To this end, encoder 10 may optionally comprise an entropy coder 34 which entropy codes the prediction residual signal as transformed and quantized into data stream 14. The prediction residual 24 is generated by a prediction stage 36 of encoder 10 on the basis of the prediction residual signal 24" decoded into, and decodable from, data stream 14.

To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra prediction, and/or temporal prediction, i.e. inter prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes or modes where the former modes form a kind of set or pool of primitive prediction modes based on which the predictions of picture blocks are composed. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter.

According to intra-coding mode, a prediction signal for a block is obtained on the basis of a spatial, already coded/decoded neighborhood of the respective block. Several intra-coding sub-modes may exist the selection among which, quasi, represents a kind of intra prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples.

Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24''', data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream 14 may comprise parameters controlling and signaling the subdivision of picture 12 and 12', respectively, into the blocks. The decoder 20 uses these parameters to subdivide the picture 12 in the same manner as the encoder 10 did, to assign the same prediction modes and parameters to the blocks, and to perform the same prediction to result in the same prediction signal.

Figure 3:
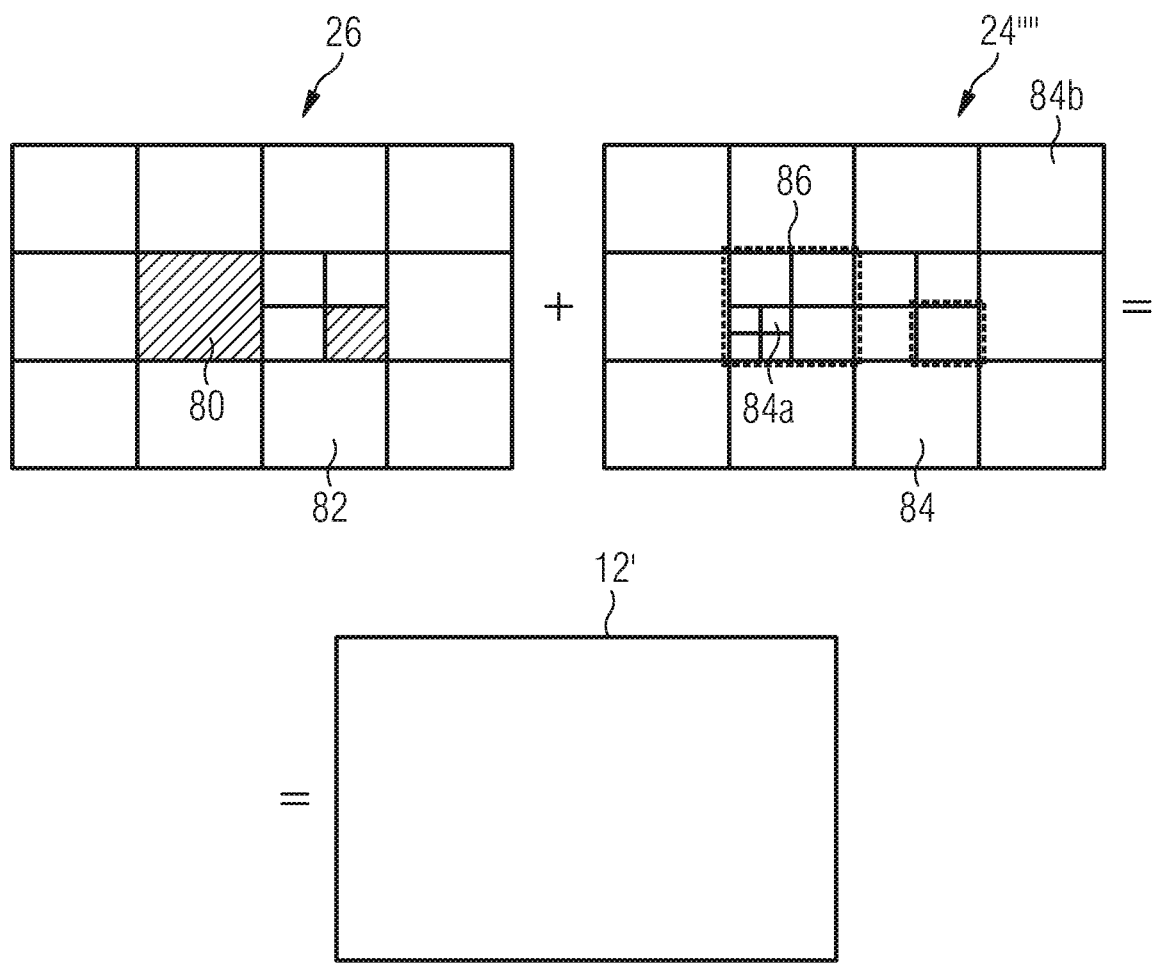
FIG. 3 shows a schematic block diagram of a block based coding scheme that may be used in one or more embodiments of the present invention.

FIG. 3 illustrates the relationship between the reconstructed signal, i.e. the reconstructed picture 12', on the one hand, and the combination of the prediction residual signal 24'''' as signaled in the data stream 14, and the prediction signal 26, on the other hand. As already denoted above, the combination may be an addition.

The prediction signal 26 is illustrated in FIG. 3 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 3 where the picture area is firstly subdivided into rows and columns of tree-root blocks which are then further subdivided in accordance with a recursive multi-tree subdivisioning to result into blocks 80.

The prediction residual signal 24'''' in FIG. 3 is also illustrated as a subdivision of the picture area into blocks 84. These blocks might be called transform or residual blocks in order to distinguish same from the coding blocks 80. In effect, FIG. 3 illustrates that encoder 10 and decoder 20 may use two different subdivisions of picture 12 and picture 12', respectively, into blocks, namely one subdivisioning into coding blocks 80 and another subdivision into blocks 84. Both subdivisions might be the same, i.e. each block 80, may concurrently form a transform block 84 and vice versa, but FIG. 3 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84.

However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of a picture area into blocks, arranged in rows and columns, the result of a recursive multi-tree subdivisioning of the picture area, or a combination thereof or any other sort of segmentation.

Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not be the only subdivision used for coding/decoding. These subdivisions form a granularity at which prediction signal determination and residual coding is performed, but firstly, the residual coding may alternatively be done without subdivisioning, and secondly, at other granularities than these subdivisions, encoder 10 and decoder 20 may set certain coding parameters which might include some of the aforementioned parameters such as prediction parameters, prediction signal composition control signals and the like.

FIG. 3 illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments such as prediction signals obtained from other views or from other coding layers which are coded/decoded in a separate prediction loop with separate DPB, for instance.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

In any case, it should be noted that the set of supported transforms may comprise merely one transform such as one spectral-to-spatial or spatial-to-spectral transform.

As already outlined above, FIGS. 1 to 3 have been presented as an example where the concepts described further below may be implemented in order to form specific examples for video encoders and decoders according to the present application. Insofar, the video encoder and decoder of FIGS. 1 and 2, respectively, represent possible implementations of the video encoders and decoders described herein below.

As to the claims, note that "non-separable" relates to separability in vertical and horizontal direction.

3. Structured Multi-Stage Transforms

Generally, an arbitrary linear transform for a residual block with size $D=W*H$, can be defined by $D*D$ parameters. Here, it is referred to these kind of transforms as fully connected transforms. While these transforms are most flexible, their complexity in terms of number of needed operations and used parameter storage increase quadratic with size D.

Hence, fully connected transforms are only applicable for small transform sizes. In order to reduce the complexity, the transforms can be constrained to have a certain structure, which allow an efficient implementation and reduce the number of transform parameters. One approach uses the transforms to factorize into multiple transforms, where each transform stage itself separates into independent sub-groups. The complexity of those multi-stage transforms can be adjusted by choosing the number of transform stages, the dimensions of the independent sub-groups and by also constraining the sub-group transforms.

Example: Reduction of Number of Multiplications Due to Partitioning into Sub-Blocks Consider a data block with width W and height H. This data block can be represented by a H×W matrix B that is serialized to a (H*W)×1 vector b for further processing.

Let the data block be transformed by a fully connected transform. Transform is done by calculation of matrix vector product T*b between transform matrix T and serialized data block vector b. Transform matrix shape is (H*W)×(H*W) leading to a used number of H*W multiplications per output coefficient. Therefore, for H*W output coefficients, a total of $(H*W)^2$ multiplications is needed.

For H=8 and W=8 this results in 4096 multiplications used for the transform coefficient calculation. Now, let the data block be subdivided into H/4*W/4 sub-blocks representable by 4×4 matrices $B_i$, assuming both H and W being divisible by 4. Each sub-block is again serialized to 16×1 vector $b_i$ for further processing. Transform coefficients are now calculated transforming each sub-block by a fully connected transform and stitching the results. Transforms are again done by calculation of matrix vector products $T_i*b_i$ between sub-block transform matrix $T_i$ and serialized sub-block $b_i$. Since transform matrix shape in this case is 16×16, a total number of 16 multiplications is used per output coefficient. So, for calculating the transform coefficients of a single sub-block 16*16-256 multiplications are used. Since we have H/4*W/4 sub-blocks, the used number of multiplications for all sub-blocks is H/4*W/4*256=H*W*16. Looking at the H=8, W=8 case again, the number of multiplications reduces by 75% from 4096 to 1024 due to the partitioning into sub-blocks and transforming each sub-block independently. By adding a further transform stage with a different partitioning, also inter-block dependencies can be considered. Assuming the same complexity as the first stage, the total number of multiplication is 2048, so only half the complexity as the full connected 8×8 transform.

A further reduction of complexity can be achieved by allowing non-bijective transforms. More precisely, here these transforms are defined as transforms that assume certain sub-groups of transform stages to be all zero and hence reduce the dimension of the residual signal. These transforms are referred to as transforms with dimension reduction and are generalizations of the transforms with high-frequency zeroing as described above. Here, the zeroing of coefficients can be applied in combination with any preceding transform stages and of an arbitrary size. This includes the case where zeroing of coefficients is applied to the first stage. These transforms do not only allow an efficient implementation but also allow an efficient signaling of no-significant coefficients, as described later.

In order to fully describe the multi-stage transforms, as introduced above, each transform stage needs to be given by a unique partitioning into sub-groups and the transforms applied to theses sub-groups.

Figure 4:
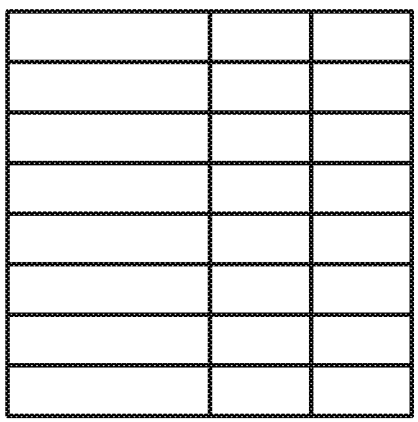
FIG. 4 shows some examples of partitioning a residual block into groups and sub-groups of transform coefficients upon exploitation of a transform.
Figure 4:
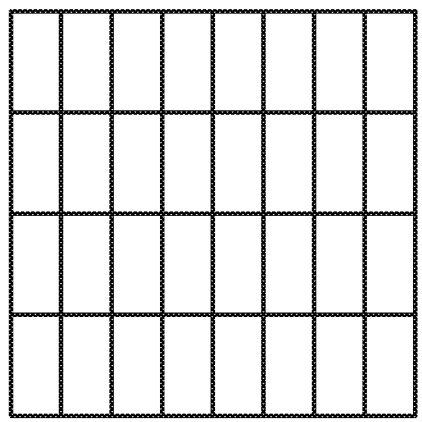
Figure 4:
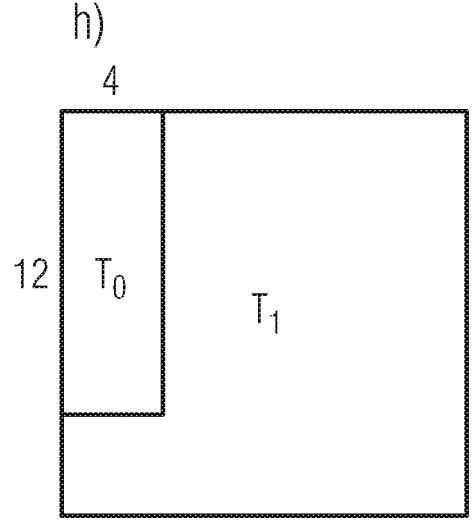
Figure 4:
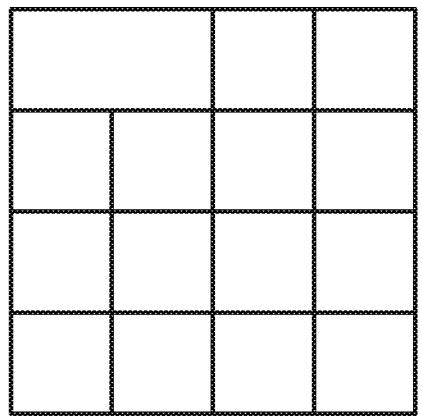
Figure 5:
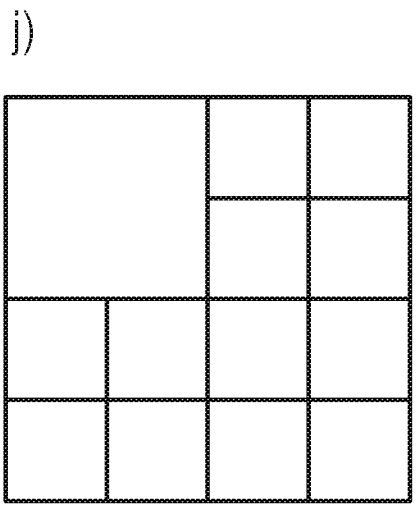
FIG. 5 shows some further examples of partitioning a residual block into groups and subgroups of transform coefficients upon exploitation of a transform.
Figure 5:
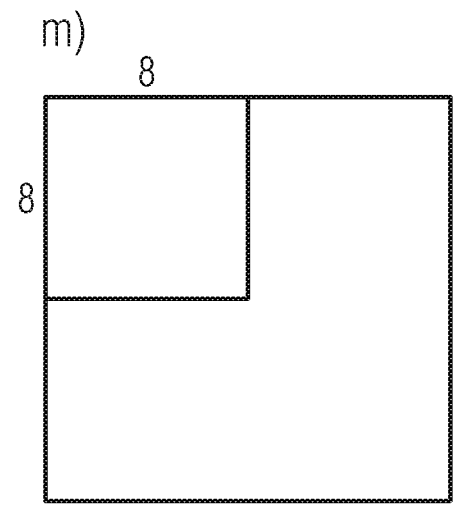
Figure 5:
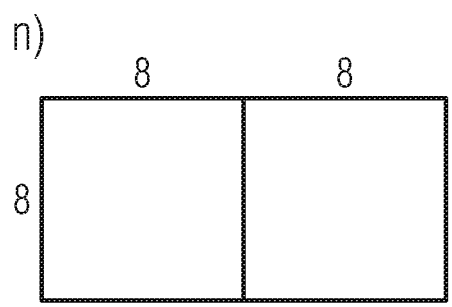
Figure 5:
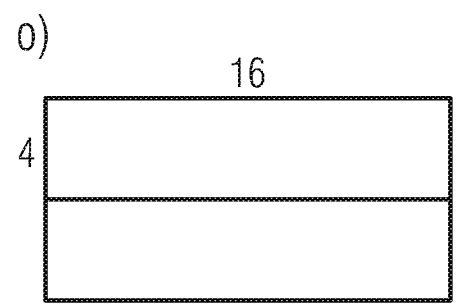
Figure 5:
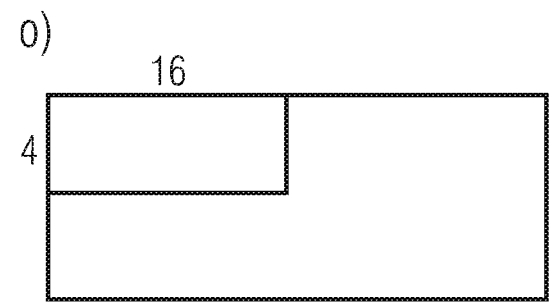

The complexity reduction of the multi-stage transforms as described above stems from the fact that each sub-group transform can be applied independently of each other, has a limited dimension and/or can be applied using an efficient algorithm. Hence, each sub-group transform is one of the following types:

Sub-Group Transforms:
(identity)
transforms from the DCT/DST families
fully connected transforms, for sub-group sizes up to 64
(permutation+) pairwise Givens rotation
(permutation+) pairwise lifting scheme transformations
multi-stage transforms themselves The partitioning into sub-groups can be given by any of the following rules, wherein some of them are depicted in FIGS. 4 and 5, denoted by the following lowercase letters:
a) For each stage and position a label is stored in ROM which assigns a unique sub-group to it.
b) For each position a label is stored in ROM which assigns a unique sub-group to it. This partitioning is used for all stages of the transform.
c) Given a unique scan order of positions and a list of sub-group sizes D={d0,d1,dN}, the partitioning is done along this scan, by grouping consecutive positions, where the size of each group is given by the associated element of D.
d) Given a unique scan order of positions, the first d0 consecutive positions are taken as one sub-group, the remaining positions as a second sub-group.
e) The partitioning is done in horizontal or vertical direction, such that either each row or each column defines a sub-group.
f) The partitioning is done in horizontal direction, such that each row is further partitioned into sub-groups of sizes in {2, 4, 8, 16, 24, 48, 32, 64}
g) The partitioning is done in vertical direction, such that each column is further partitioned into sub-groups of sizes in {2, 4, 8, 16, 24, 48, 32, 64}
h) The partitioning is done by taking the sub-block which contains the first position (left-top) and has either of the shapes {4×4, 4×8, 4×12, 4×16, 8×4, 8×8, 12×4, 16×4} as one sub-group. The remaining positions form a second group.
i) The partitioning is done by taking the sub-block which contains the first position (left-top) and has either of the shapes {4×4, 4×8, 4×12, 4×16, 8×4, 8×8, 12×4, 16×4} as one sub-group. The remaining positions are partitioned into groups of sizes {1×2, 2×1, 2×2, 4×4}.
j) The partitioning is done into subgroups with shapes 4×4 and/or 2×2.
k) Sub-group transforms of dimension in {2, 4, 8, 16}
l) Sub-group transforms of dimension in {24, 32, 48, 64}
m) The partitioning is done into subgroups with shape sizes in {2×2, 4×4, 4×8, 4×12, 4×16, 8×4, 8×8, 12×4, 16×4}
n) The partitioning is derived from the width and height of the residual block, by taking the sub-group of size min(8,width)×min(8,height) which contains the first position as one group, the remaining positions form a second group.
o) The partitioning is derived from the width (W) and height (H) of the residual block, by taking the sub-group which contains the first position and is of size in {4×4, 4×8, 4×12, 4×16, 8×4, 8×8, 12×4, 16×4}, by applying the following rules: If W==H then the shape of the sub-group is D×D where D=min(W,8). If W>H the height of the sub-group is set to 4. Its width is chosen by taking the largest size in {8, 12, 16} which is not larger than W. If H>W the width of the sub-group is set to 4. Its height is chosen by taking the largest size in {8, 12, 16} which is not larger than H.
p) Permutation stored in ROM+Pairwise partitioning.
q) Deriving from prediction mode
r) Hierarchical Structure:
   1) N horizontal transforms (fully connected: dim M)
   2) M vertical transforms (fully connected: dim N)
Transform Classes:

Structured transforms help reducing the complexity on the one hand, but also allow the grouping of transforms by their induced constraints. This classification can be beneficial for comparing transforms and defining dependency models for the quantization and/or entropy coding stage.

Figure 6:
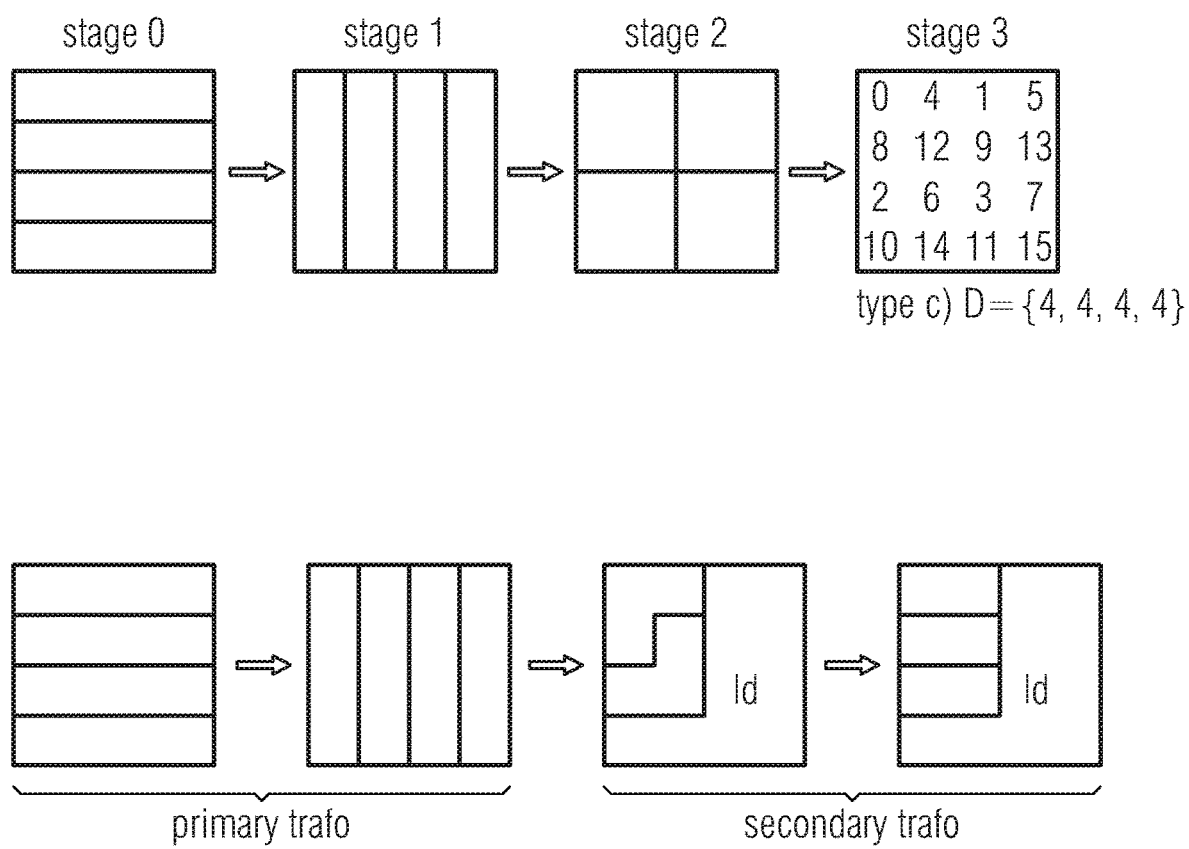
FIG. 6 shows some examples of different stages of a multi-stage transform comprising a primary transformation and a secondary transformation.

As one class of transforms, as exemplarily shown in FIG. 6, consider a multi stage transform that factorizes into two transforms, henceforth referred to as primary and secondary transform, respectively. The naming arises from the encoder perspective, as the primary transform is applied directly to the prediction residual in spatial domain yielding the primary transform coefficients, while the secondary transform is applied to a subset of the primary transform coefficients.

Note, both the primary and secondary transform can themselves be defined as multi stage transforms, and the secondary transform is of reduced dimension compared to the primary transform.

If a transform does not factorize into two transforms, such that the second transform is applied to a sub-set of the coefficients of the first transform only, this transform is referred to as primary only transform.

A further transform class is given by the fact that transforms may factorize into a vertical and a horizontal transform and referred to as separable transforms. This is an especially simple form of a multi-stage transform. In the first stage, transforms are applied row-wise and in the second stage, transforms are applied column-wise to the output (coefficients) of the first transform stage (or vice versa). Typically, per each stage, the same transform is applied to each row (column).

A special class of transforms is given by their dimension-reduction character, i.e., if the dimension is explicitly reduced by the transform and which precise coefficient positions are assumed to be zero in that case.

Assuming the reconstruction of the residual signal from the coefficients as coded in the bitstream contains an inverse transform as part of the entropy coding stage, which is applied to the coefficients (possibly of different residual blocks) before they are de-quantized, lossless transforms are used which do not introduce rounding errors. Whether a transform is lossless or not can be also a classification property.

A further classification of transforms can be done by differentiating between transforms that are constructed analytically such as the transforms from the DCT/DST family, and those that are trained on a specific set of examples. For analytical transforms, the classification can be done precisely by its construction rule. This construction rule can be applied with different transform sizes, hence, they also allow a comparison between transforms even when their sizes differ. This can be helpful for exploring inter block dependencies for example for the derivation of context models depending on transform decisions of neighboring blocks.

But also the data driven transforms can be further classified depending on their specialization. Concretely, training a transform for intra predicted residuals is more general, while training a transform precisely for one specific intra mode, for example given by a precise intra-direction, results in a more specialized transform. This specialization can be even increased further by clustering the data for a given prediction mode.

3.1 Exemplary Embodiments of Primary and Secondary Transforms

Some examples and embodiments for primary and secondary transforms may be listed in the following non-exhaustive list:
Primary Transforms:
A)
1. Stage: partition into rows, dedicated transform for each row
2. Stage: partition into columns, dedicated transform for each column.
Where each sub-group transform can be of any type, as mentioned above.
In particular:
A.1)
1. stage: partition into rows, same transform for each sub-group (row).
2. stage: partition into columns, same transform for each sub-group (column).
A.2)
1. stage: partition into rows, same DCT/DST transform for each sub-group (row).
2. stage: partition into columns, same DCT/DST transform for each sub-group (column).
A.3)
1. stage: partition into rows, same DCT/DST transform with dimension reduction for each sub-group (row).
2. stage: partition into columns, same DCT/DST transform for each sub-group (column).
A.4)
1. stage: partition into rows, same DCT/DST transform for each sub-group (row).

2. stage: partition into columns, same DCT/DST transform with dimension reduction for each sub-group (column).

A.5)
1. stage: partition into rows, same DCT/DST transform with dimension reduction for each sub-group (row).
2. stage: partition into columns, same DCT/DST transform with dimension reduction for each sub-group (column).

A.6)
1. stage: partition into rows, identity "transform" for each sub-group (row).
2. stage: partition into columns, same DCT/DST transform for each sub-group (column).

A.7)
1. stage: partition into rows, same DCT/DST transform for each sub-group (row).
2. stage: partition into columns, identity "transform" for each sub-group (column).

A.8)
1. stage: partition into rows, identity "transform" for each sub-group (row).
2. stage: partition into columns, identity "transform" for each sub-group (column). (Equivalent to not applying any transform at all.)

A.9)
1. stage: partition into rows, same fully connected transform for each sub-group (row).
2. stage: partition into columns, same fully connected transform for each sub-group (column).

A.10)
1. stage: partition into rows, dedicated fully connected transform for each sub-group (row).
2. stage: partition into columns, dedicated fully connected transform for each sub-group (column).

B)
1. stage: partition along rows into sub-groups of size S (e.g. 8)
2. stage: partition along columns into sub-groups of size S (e.g. 8)

Where each sub-group transform can be of any type, as mentioned above.

Especially:

B.1)
1. stage: partition along rows into sub-groups of size S, being half the block width.
2. stage: partition into columns, same transform for each sub-group (column).

B.2)
1. stage: partition into rows, same transform for each sub-group (row).
2. stage: partition along columns, into sub-groups of size S, being half the block height.

B.3)
1. stage: partition along rows into sub-groups of size S, being half the block width.
2. stage: partition along columns, into sub-groups of size S, being half the block height.

B.4)
1. stage: partition along rows into sub-groups of size S.
2. stage: partition along columns, into sub-groups of size S.

First sub-group transform being of a DCT/DST type, the second sub-group is set to zero.

B.5)
1. stage: partition along rows into sub-groups of size S.
2. stage: partition along columns, into sub-groups of size S.

First sub-group is set to zero, the second sub-group transform being of a DCT/DST type.

C)
1. stage: partition along rows into sub-groups of size S (e.g. 8)
2. stage: partition along columns into sub-groups of size S (e.g. 8)
3. stage: hierarchical structure with bypassing (equivalent to sub-group with identity transform)

Where each sub-group transform can be of any type, as mentioned above.

Especially:

C.1)
1. stage: partition into rows, same transform for each sub-group (row).
2. stage: partition into columns, same transform for each sub-group (column).
3. stage: transform with dimension-reduction.

C.2)
1. stage: partition into rows, same DCT/DST transform for each sub-group (row).
2. stage: partition into columns, same DCT/DST transform for each sub-group (column).
3. stage: transform with dimension-reduction.

Secondary Transforms:

A)
Sub-group of primary coefficients, used for secondary transform derived from min(8,W), min(8,H). Secondary transform is of full connected transform type.

A.1)
Sub-group of primary coefficients, used for secondary transform derived from min(8,W), min(8,H). Secondary transform is of full connected transform type with dimension reduction.

B)
Partitioning of primary coefficients into 4×4 sub-groups. Fully connected transforms are applied to a sub-set of sub-groups and combined in a hierarchical structure.

B.1)
Partitioning of primary coefficients into 4×4 sub-groups. Fully connected transforms with dimension-reduction are applied to a sub-set of sub-groups and combined in a hierarchical structure.

C)
Partitioning of primary coefficients into sub-groups. Secondary transforms are applied to a sub-set of those sub-groups. The transform type (i.e. connectivity) of the secondary transform depends on the position of the sub-group within the full transform block.

4. Set of Transform Candidates

The decoding process of the selected transform may consist of the following steps:

First, a candidate list may be constructed utilizing already decoded syntax elements.

Knowledge about the selected transform can support the process of decoding the coefficients from the bitstream. Hence, if the candidate list contains more than one transform, it might be beneficial to reduce the candidate list (or even identify the selected one) by explicitly signaling information about the selected transform before the coefficient decoding process.

On the other hand, already decoded information about the coefficients can be utilized for determining the selected transforms among the candidates. During the coefficient decoding process the candidate list can be iteratively reduced by removing those transforms that conflict with already obtained information about the coefficients. When all coefficients are decoded and more than one transform candidate is left, an index into the remaining candidate list has to be signaled.

4.1 Construction of Candidate List

The transform candidate list for a residual block is constructed by utilizing already decoded syntax elements. These might include transform block parameters, such as its total size, shape (width and height) and color channel type (luma or chroma), but also information about the prediction method that is used for the current block. Having different transform types for different transform sizes can already be motivated by the complexity considerations in section 3.

Figure 12:
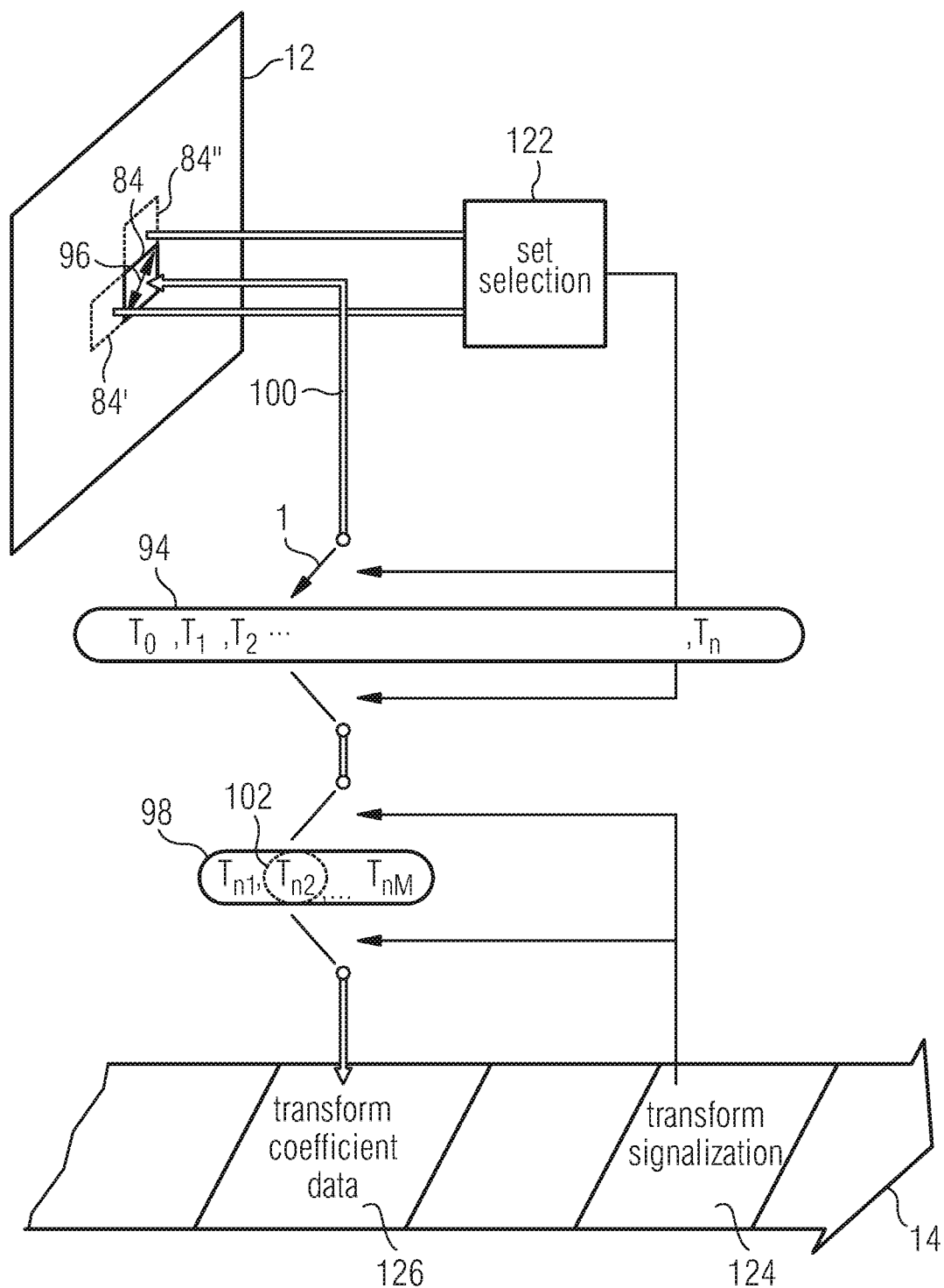
FIG. 12 shows a schematic block diagram of a block-based residual coding scheme using a set of transforms and a selectable set of transforms according to an embodiment of the present invention.

FIG. 12 shows a non-limiting example for encoding a picture 12 having multiple residual blocks 84, 84', 84". As exemplary shown for residual block 84, each residual block comprises a certain block dimension 96 that may be defined by the width and height of the respective block 84. According to this non-limiting example, the construction of the transform candidate list may be described with reference to the respective block dimensions 96 as an example.

Accordingly, an encoder 10 and a decoder 20 may be provided for encoding/decoding a picture 12 into/from a data stream 14 using block-based prediction and block-based residual coding, the encoder 10 and decoder 20 supporting a set 94 of transforms for the block-based residual coding. The encoder 10 and decoder 20 may be configured to determine 122 a transform candidate list 98 of transforms for a current residual block 84 out of the set 94 of transforms based on a size 96, e.g. height and a width, of the current residual block 84. The encoder 10 may be configured to encode a prediction residual 100 within the residual block 84 using one selected transform 102 out of the selectable list 98 of transforms and selectively signal the selected transform 102 in the data stream 14. The decoder 20, in turn, may be configured to decode a prediction residual 100 within the residual block 84 in a domain of one selected transform 102 out of the selectable list 98 of transforms with selectively deriving the selected transform 102 from the data stream 14.

Figure 16:
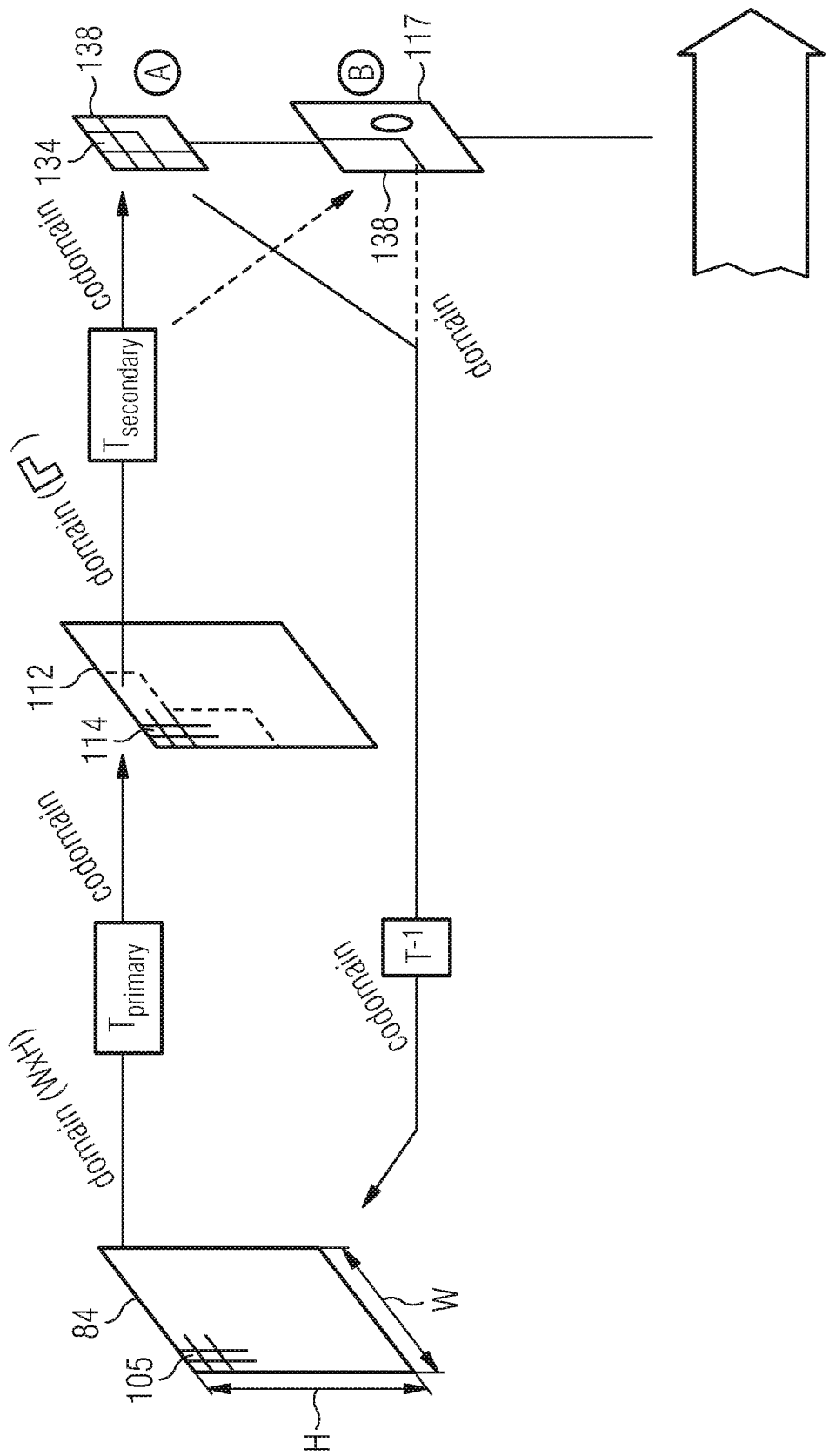
FIG. 16 shows a schematic block diagram of a block-based residual coding scheme in which some transform coefficients are set to zero according to an embodiment of the present invention.

As to the terms 'domain' and codomain' it shall be referred to FIG. 16 which shows a detailed depiction of the above mentioned residual block 84 comprising multiple samples 105. The number of samples 105 may determine the block dimension 96, e.g. the width and height of the residual block 84, for example an 4×4, 8×8 block and so on. The residual block 84, or the samples 105 respectively, may be subjected to the primary transform, wherein the block dimension 96 and samples 105 correspond to the domain of the primary transform. The samples 105 are transformed into primary transform coefficients 114, wherein one or more primary transform coefficients 114 may be contained in a sub-group 112 of primary transform coefficients. The output of the primary transform, i.e. the codomain of the primary transform corresponds to the size of the sub-group 112 defined by the number of primary transform coefficients 114.

In the non-limiting example shown in FIG. 16, the sub-group 112 may comprise one or more zero-valued primary transform coefficients 114 and one or more significant (i.e. non-zero valued) primary transform coefficients 114. Some particular examples in which one or more primary transforms may be set to zero will be described somewhat later in section 5 below.

For the moment, the general principle shall be further described with continued reference to FIG. 16. As can be seen, the sub group 112 in this non-limiting example has a shape of an inverted 'L', i.e. the left column and the top row which comprise significant coefficients 114, are maintained while the remaining primary transform coefficients 114 outside the inverted 'L' may be set to zero, at least from an encoder perspective. In more general terms, which do also apply to the decoder, the domain of the secondary transform is reduced compared to the domain of the primary transform.

The sub-group 112 of primary transform coefficients 114 may then be subjected to the secondary transformation leading to a secondary sub-group 138 of secondary transform coefficients 134. The size of the sub-group 112, i.e. the number of primary transform coefficients 114, (which corresponds to the domain of the secondary transformation) may be larger than the size of the secondary sub-group 138, i.e. the number of the secondary transform coefficients 119 (which corresponds to the codomain of the secondary transformation).

FIG. 16 shows a first alternative A in which only the significant primary transform coefficients 114 are transformed by the secondary transform and the zero-valued primary transform coefficients are implicitly reduced and not signaled, i.e. only the transformed significant transform coefficients (secondary subgroup 138) may be coded in this case. FIG. 16 shows (in dashed lines) a second alternative B in which the entire subblock 117 including the secondary subgroup 138 and zero-valued coefficients outside the subgroup 138 may be present, i.e. all coefficients are coded in this case.

As also shown in FIG. 16, the encoder 10 and the decoder 20 may inverse-transform the secondary transform coefficients 134, wherein a domain of the inverse-transform may correspond to the codomain of the secondary transform.

As mentioned above, the transform candidate list 98 for a residual block may be constructed by utilizing already decoded syntax elements, e.g. transform block parameters, such as its total size, shape (width and height), or stated differently based on the domain/codomain of the respective transform.

Accordingly, the encoder 10 of this aspect may support a plurality of block dimensions 96 (i.e. height and width). For each block dimension the set 94 of transforms may comprise a subset of transforms, a domain of which corresponds to the respective block dimension 96. For each transform of the set 94 of transforms, the encoder 10 may support a reverse transform (note that not necessarily $T*T^{-1}=1$ such as for those transforms T with dimension reduction), a domain of which coincides with a codomain of the respective transform, wherein the encoder 10 may use the reverse transform to fill a decoded picture buffer at residual blocks for which the respective transform has been selected. The encoder 10 may further be configured to, in determining the transform candidate list 98, exclusively populate the transforms with transforms out of the subset of transforms, the domain of which corresponds to the height and the width of the current residual block 84.

Accordingly, the decoder 20 of this aspect may support a plurality of block dimensions (i.e. height and width). For each block size, the set 94 of transforms comprises a subset of transforms, a codomain of which corresponds to the respective block dimension. Note that the transforms mentioned here are reverse transforms relative to the transforms occurring at the encoder 10. The decoder 20 may further be configured to, in determining the transform candidate list 98, exclusively populate the transforms with transforms out of the subset of transforms, the codomain of which corresponds to the height and the width of the current residual block 84.

Summarizing, each transform (primary or secondary) may comprise a domain that is comparable to its input, and a codomain that is comparable to its output, wherein the respective codomains of the first and secondary transforms may differ from another. A reduced codomain may be achieved, for example, by setting some primary and/or secondary coefficients to zero, which will be explained in more detail below.

As initially mentioned above, the computational complexity may increase with the transform size. Thus, it is helpful to restrict the transform candidates of transform blocks with sizes above a threshold, to simpler transform types in return. Simple examples are given by considering separable transforms, defined by one horizontal and one vertical transform type, for the moment. Next to the identity "transform", which has no additional computational complexity, the DCT-II is considered as a computational simple transform type, due to efficient algorithms exploiting its butterfly structure.

As stated in section 3, the complexity of each transform type can be reduced by introducing transform candidates which implicitly reduce the number of dimensions by forcing specific coefficients to be zero, and hence reduce the number of needed multiplications.

In the following, some exemplary embodiments of encoders 10 and decoders 20 will be described which are configured to set one or more of the primary transform coefficients and/or one or more of the secondary transforms to zero, which will also be referred to as 'zeroing'. Setting coefficients to zero may be applied at the encoder end, while the decoder may refrain from decoding coefficients that are zero.

For example, let's define three thresholds (T1, T2, T3). T1 follows section 2.3, and is defined by the size, (width or height), such that DCT-II is a candidate for vertical (horizontal) transforms of blocks only if its height (width) is less than T1. Otherwise, DCT-II with dimension-reduction is a candidate, where the last height (width)–T1 high-frequency coefficients are set to zero. In addition to that, T2 defines the threshold size for other transform types (like DST-VII, DCT-III, etc.) such that the full-size transform is a candidate only if its size is less than T2. Otherwise, its corresponding transform with dimension-reduction is candidate. Finally, T3 defines the threshold size for identity "transforms", they are candidates only if their size is less than T3.

According to an example, the encoder 10 may be configured to, in determining the transform candidate list 98:
  if the height and width of the current residual block 84 fulfills a first criterion (e.g. T1 and T2), populate the transform candidate list 98 with one or more transforms out of the subset of transforms, the domain of which corresponds to the height and width of the current residual block 84, and the codomain of which is smaller than the domain thereof (e.g. transforms with "width dimension-reduction"), or
  if the height and width of the current residual block 84 does not fulfill a first criterion, exclude from the transform candidate list 98 the one or more transforms out of the subset of transforms, the domain of which corresponds to the height and width of the current residual block 84, and the codomain of which is smaller than the domain thereof.

The decoder 20, in turn, may be configured to, in determining the transform candidate list 98:
  if the height and width of the current residual block 84 fulfills a first criterion (e.g. T1 and T2), populate the transform candidate list 98 with one or more transforms out of the subset of transforms, the codomain of which corresponds to the height and width of the current residual block 84, and the domain of which is smaller (e.g. comprises less samples/coefficients) than the codomain thereof (i.e. reverse transforms of transforms with "width dimension-reduction"), or
  if the height and width of the current residual block 84 does not fulfill a first criterion, exclude from the transform candidate list 98 the one or more transforms out of the subset of transforms, the codomain of which corresponds to the height and width of the current residual block 84, and the domain of which is smaller than the domain thereof.

The above mentioned one or more transforms may be one or more of a DCT-II, DST-VII and DCT-III.

According to a further example, the encoder 10 and decoder 20 may be configured to, in determining the transform candidate list 98:
  if the height and width of the current residual block 84 fulfills a second criterion (e.g. T3), populate the transform candidate list 98 with an identity transform out of the subset of transforms, the domain of which corresponds to the height and width of the current residual block 84, or
  if the height and width of the current residual block 84 does not fulfill a second criterion, exclude from the transform candidate list 98 the identity transform out of the subset of transforms, the domain of which corresponds to the height and width of the current residual block 84.

The encoder 10 and decoder 20 may be configured to check the first and/or second criterion by checking whether the height, the width, both of the height and the width and/or the product of height and width exceeds a certain threshold.

In addition to defining constraints by the width and the height of a residual block independently, rules can be applied by examining the relative shape. For example, allow a candidate only, if either of its width or height exceeds the other. For separable transform candidates this can be done by assigning one transform type to the larger transform dimension and another to the smaller direction. For transforms with dimension-reduction, this information can be used to decide which coefficients are set to zero.

According to a yet further example, the encoder 10 and decoder 20 may be configured to, in determining the transform candidate list,
  if the height and width of the current residual block fulfills a third criterion (e.g. ratio of the height and the width exceeds a certain threshold?), populate the transform candidate list with a separable spectrally decomposing transform out of the sub-set of transforms, the domain of which corresponds to the size of the current residual block (84),
  if the height and width of the current residual block does not fulfill a third criterion, exclude from the transform candidate list the separable spectrally decomposing transform out of the subset of transforms, the domain of which corresponds to the size of the current residual block (84).

According to this example, the encoder 10 and decoder 20 may be configured to check the third criterion by checking whether a ratio of the height and the width exceeds a certain threshold. For secondary transforms, the width and the height of the residual block can be used to decide which coefficients are transformed in a further transform step. Following the complexity argumentation from above, more flexible (than separable transforms) transform structures should also be constrained depending on the transform block size. While the transform stages of smaller block sizes could be defined such that the full outcome (all coefficients) of a previous transform stage are further transformed in the following stages (in section 3 referred to as primary only transforms), multi-stage transforms consisting of primary+ secondary transforms could be used for larger block sizes.

By assuming for example that a secondary transform is applicable up to a dimension of 64 (coefficients of primary transform), the construction rule for the secondary input can be formulated as the sub-group defined by min(8, width)× min(8, height). In order to reduce the total number of defined transforms, one can restrict the shapes of the secondary transform sub-group. For example, by only defining secondary transforms for the shapes 8×8 and 4×4, the secondary transform sub-group is chosen by the larger shape (width*height) which is applicable for a given transform block size.

For exemplification, a transform block of size (4×32) has a secondary transform shape of (4×4) while a transform block of size (8×16) has a secondary transform shape of (8×8) in this case. Also the structure of the secondary transform itself should be defined with complexity constraints depending on its own size and or the size of the full transform block. To give an example, 4×4 secondary transforms can be defined by full connected transforms, while larger secondary transforms should be constrained in their complexity by any method described in section 3, for example by restricting the number of further transform stages or by reducing their dimension by forcing specific coefficients to be zero.

Accordingly, the encoder 10 and decoder 20 may be configured to, in determining the transform candidate list (98), populate the transform candidate list (98) with transforms depending on the block sizes and shapes, wherein a scaling of blocks, as exemplarily described in the passage above, may be used. As mentioned above, for instance, a first transform block of size (4×32) has a secondary transform shape of (4×4) while a second transform block of size (8×16) has a secondary transform shape of (8×8). That is, the rows of the first and second transform block may comprise a scaling ration of 1:2 while the columns of the first and second transform block may comprise a scaling ration of 2:1.

Accordingly, if the height and width of the current residual block 84 corresponds to a first predetermined block dimension, the encoder 10 and decoder 20 may be configured to populate the transform candidate list 98 with first one or more transforms out of the subset of transforms, the codomain of which corresponds to the height and width of the current residual block 84, and which reverses a multi-stage transform 106 involving a primary transform 108 applied onto a prediction residual 100 within the current residual block 84 and a secondary transform 110 applied onto a first sub-group 112 of primary transform coefficients 114 of the primary transform 108.

Alternatively, if the height and width of the current residual block 84 corresponds to a second predetermined block dimension, the encoder 10 and decoder 20 may be configured to populate the transform candidate list 98 with second one or more transforms out of the sub-set of transforms, the codomain of which corresponds to the height and width of the current residual block 84, and which reverses a multi-stage transform 106 involving a primary transform 108 applied onto a prediction residual 100 within the current residual block 84 and a secondary transform 110 applied onto a second sub-group 112 of primary transform coefficients 114 of the primary transform 108.

In either case, a scaling that images a first codomain of the primary transform 108 of the first one or more transforms onto the second codomain of the primary transform 108 of the first one or more transforms does not image a circumference of the first sub-group within the first codomain onto a circumference of the second sub-group within the second codomain.

Regarding the above mentioned height/width ratios of the blocks being subjected to primary and secondary transforms, it may be possible that a circumference of the first sub-group 112 within the first codomain does not image onto a circumference of the second sub-group, e.g. even if the height/width ratio (aspect ratio) of the codomain of the primary transform as well as the height/width ratio of the first and second predetermined dimensions is the same.

Accordingly, the encoder 10 and decoder 20 may be configured to, in determining the transform candidate list, if the height and width of the current residual block corresponds to a first predetermined block dimension, populate the transform candidate list with first one or more transforms out of the subset of transforms, the domain of which corresponds to the height and width of the current residual block 84, and which is a multi-stage transform 106 involving a primary transform 108 applied onto a prediction residual 100 within the current residual block and a secondary transform 110 applied onto a first sub-group 112 of primary transform coefficients 114 of the primary transform. Alternatively, if the height and width of the current residual block corresponds to a second predetermined block dimension, the encoder 10 and decoder 20 may be configured to populate the transform candidate list with second one or more transforms out of the subset of transforms, the domain of which corresponds to the height and width of the current residual block 84, and which is a multi-stage transform 106 involving a primary transform 108 applied onto a prediction residual 100 within the current residual block and a secondary transform 110 applied onto a second sub-group 112 of primary transform coefficients 114 of the primary transform. In this example, a scaling that images a first codomain of the primary transform of the first one or more transforms onto the second codomain of the primary transform of the first one or more transforms may not image a circumference of the first sub-group within the first codomain onto a circumference of the second sub-group within the second codomain.

Considering the relative complexity overhead of transform stages to their full transform block size (e.g. by counting multiplications per pixel in the full transform block), the structure of transform stages should be further constrained by their relative size. Here, the worst case applies for primary only multi stage transforms, where, by definition (c.f. section 3), all coefficients (or all sub-groups) of a former transform stage are input to the next transform stage. Again, all methods of section 3 are applicable.

In addition to the transform block shape, also the prediction method used for obtaining the residual block gives insight about the characteristics of the residual signal and hence, can be used for selecting appropriate transform candidates.

Transform candidates lists can also be adapted to the color channel by having different transform candidates defined for chroma and luma residual blocks. While having a dedicated set of chroma transforms gives a higher flexibility it also increases the amount of memory needed for storing the additional transform cores. Hence, it is desirable to have a joint set of transform structures/cores to choose the candidates from. If a chroma residual block is associated with a luma transform block (e.g. belonging to the same CU, no dualtree), it is also desirable to share the same transform index (has to be signaled only once) or to derive the selected chroma transform from the selected luma transform. For allowing unique identification, the chroma candidate list has to be carefully chosen and adapted to the luma candidate list. Mainly, chroma sub-sampling is used in video coding, hence the chroma residual block size and hence also the chroma transform size differ from the selected luma transform size. In order to identify the chroma candidate, the properties of the selected luma transform have to be matched to the transform classes in the candidate list of the chroma block. Having a transform from the DCT/DST class, this is straight forward as they are defined for different sizes. Hence, the candidate list of chroma transform blocks can be populated with the same transform types (DCT/DST) as the associated luma block, but smaller sizes, and the selected transform is uniquely identifiable, knowing the selected luma candidate. By allowing for example only one candidate to have a secondary+transform, also this property, allows a unique identification. Furthermore, the property of dimension reduction can be used to identify the associated chroma transform candidate. If the selected luma transform reduces the dimension, by setting pre-defined coefficient positions to zero, the chroma transform can be identified by taking that candidate that enforces the same relative positions to zero. Here relative positions refer for example to the first half of the block, or the first row of the block etc. If the same property is shared among the same number of candidates, in the luma and in the chroma list, the order within the list and the selected luma transform index can be used to identify the chroma transform.

It can be helpful to add specific transforms only to the candidate list if the quantization parameter is within a specific range. This is especially helpful for transforms with dimension reduction, but also specialized transforms could be trained depending on the quantization parameter.

Given these properties, a transform candidate list can be derived by construction rules or obtained by a table lookup. Here having a lookup table of transform candidate lists for all possible property combinations is the most flexible and therefore advantageous variant.

The following sections provide rules for constructing the transform candidate list.

4.1.1 Large Residual Blocks

Large residual blocks with width or height larger than 64 may be transformed using DCT-II with high frequency zeroing as described in section 2.3 above 0.

4.1.2 Inter-Predicted Residual Blocks

For inter predicted residual blocks the transform and signaling scheme of AMT may be used, i.e. the candidate list may comprise:
{[DCT-II, DCT-II], [DST-VII, DST-VII], [DST-VII, DCT-VIII], [DCT-VIII, DST-VII], [DCT-VIII, DCT-VIII]}
With: [vertical transform, horizontal transform]

4.1.3 Intra-NN Predicted Residual Blocks

Intra-NN Transforms
For Intra-NN (Neural Network) a dedicated set of transforms for the use with intra-NN predicted blocks is provided. In the following, these transforms are referred to as the intra-NN transforms.

Figure 7:
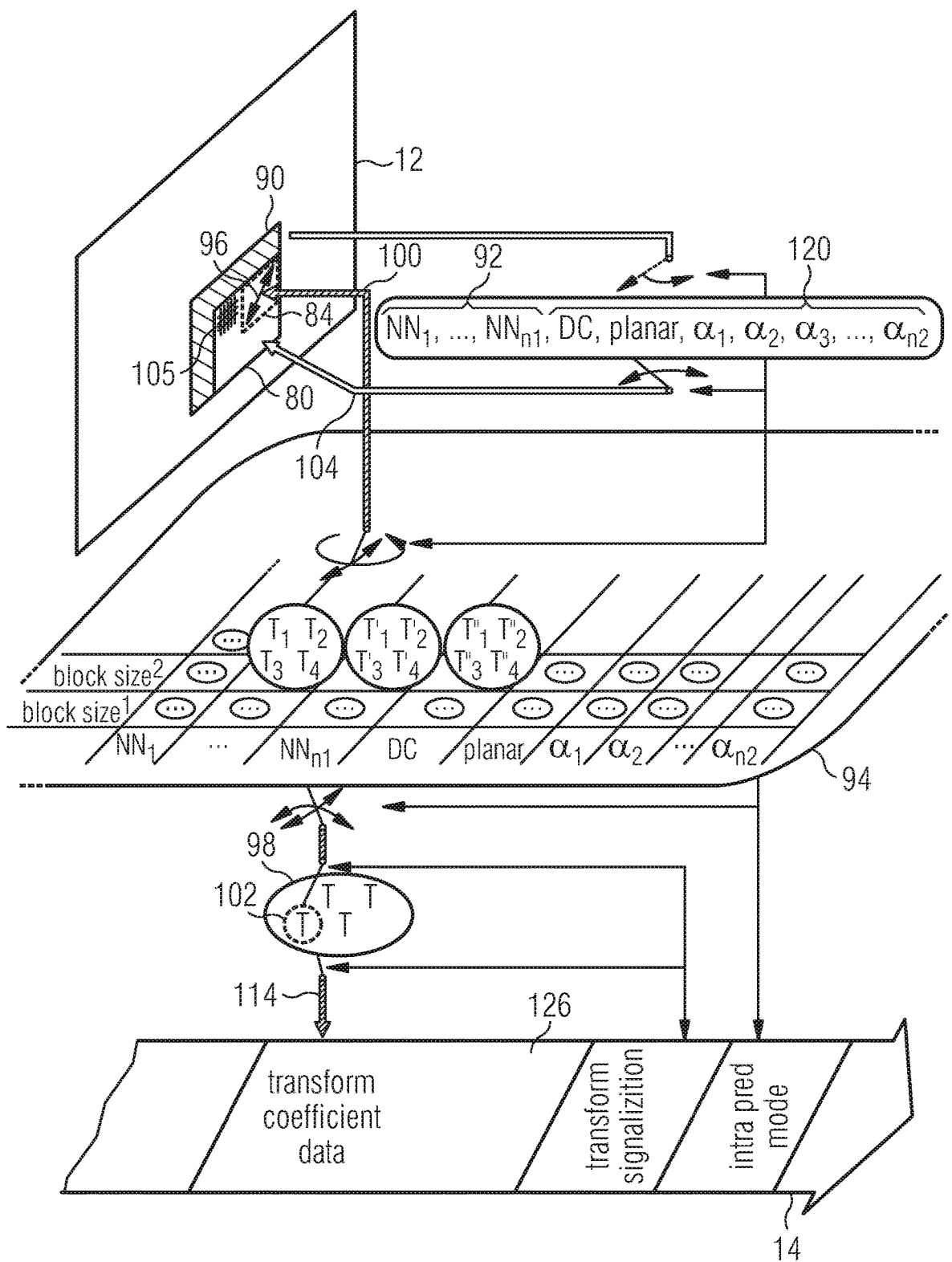
FIG. 7 shows a schematic block diagram of block-based residual coding using a set of transforms comprising one or more neural networks according to an embodiment of the present invention.

With reference to FIG. 7, an encoder 10 (similar to the one described above with reference to FIG. 1) and a decoder 20 (similar to the one described above with reference to FIG. 2) may be provided for encoding/decoding a picture 12 into/from a data stream 14 using block-based prediction and block-based residual coding. The encoder 10 and decoder 20 support a set 94 of transforms for the block-based residual coding, wherein one or more different transforms may be available inside the set 94. The encoder 10 and decoder 20 are configured to predict an intra-predicted block 80 by applying a spatial neighborhood 90 of the intra-predicted block 80 onto a selected neural network out of a plurality 92 of neural networks to obtain a prediction 104 of the intra-predicted block 80. The encoder 10 and decoder 20 may determine, for a residual block 84 covering the intra-predicted block 80, a selectable set 98 of transforms out of the set 94 of transforms based on the selected neural network and based on a block size 96 of the residual block 84. The encoder 10 may further encode a prediction residual 100, which is associated with the prediction of the intra-predicted block 80 within the residual block 84, using one selected transform 102 out of the selectable set 98 of transforms and signal the selected transform in the data stream 14. The decoder 20, in turn, may decode a prediction residual 100 associated with the prediction 104 of the intra-predicted block 80 within the residual block 84 from the data stream 14 in a domain of one selected transform 102 out of the selectable set 98 of transforms with deriving the selected transform from the data stream 14.

Accordingly, a set 94 of transforms may be provided including one or more selectable sets 98 that may be selected out of the set 94. The selectable sets 98 may include one or more transforms 102, wherein one transform 102 may be selected out of the selectable set 98. The encoder 10 may encode the prediction residual 100 using the one selected transform 102. The decoder 20 may decode the prediction residual 100 using the one selected transform 102.

These transforms are trained for the specific characteristics of the prediction residuals, when conditioned on the different intra-NN modes. The set 98 of intra-NN transforms include primary only transforms for small block sizes (e.g. block sizes below a predetermined threshold) and primary+secondary transforms for larger block sizes (e.g. block sizes above a predetermined threshold): For example, FIGS. 7 to 10 show a residual block 84 comprising multiple samples 105.

The residual block 84 may comprise a prediction residual 100 that may be encoded and decoded, respectively. The samples 105 may be subjected to one or more transforms, for example a primary-only transform 118 (FIG. 10), or a multi-stage transform 106 (FIG. 8) comprising a primary transform 108 and a subsequent secondary transform 110.

The samples 105 may be subjected to a primary transform 108 such that the samples 105 may be transformed from the spatial domain into the transform domain. In result, the transformed block may comprise one or more primary transform coefficients 114. Multiple primary transform coefficients 114 may be arranged together in a primary subgroup 112 of primary transform coefficients 114. As can be seen for example in FIG. 9, the primary transform 108 may transform one or more rows of the residual block 84 from the spatial domain into the transform domain, while the columns of the residual block 84 are not transformed and therefore remain in the spatial domain.

In some examples, the primary transform coefficients 114 may be further transformed by means of a secondary transformation 110 such that the primary transform coefficients 114 may be transformed into the respective secondary transform domain. In result, the again transformed block 117 (due to secondary transformation 110) may comprise one or more secondary transform coefficients 134. Multiple secondary transform coefficients 134 may be arranged together in a secondary subgroup 138 of secondary transform coefficients 134. As can be seen for example in FIG. 9, the secondary transform 110 may transform one or more columns of the block from the spatial domain into the transform domain. As mentioned above, the rows of the block may have been already transformed by means of the primary transform 108. In result, rows and columns may have been transformed by means of the multi-stage transform, i.e. by applying a primary transform and a subsequent secondary transform. However, transform coefficients are not restricted to rows and columns since this is only one non-limiting examples.

As mentioned previously, a predetermined set 94 of transforms may be available from which the encoder 10 and decoder 20 may choose from. For example, with reference to FIGS. 7 and 8, the encoder 10 and decoder 20 may be configured to perform the determination of the selectable set 98 so that for block sizes above a predetermined threshold, the selectable set 98 of transforms is populated by a first number of one or more multi-stage transforms 106, each involving a primary transform 108 applied onto the prediction residual 100 and a secondary transform 110 applied onto a sub-group 112 of primary transform coefficients 114 of the primary transform 108, the secondary transform 110 being non-separable and depending on the selected neural network. The sub-group 112 represents a low-frequency portion of the primary transform 108.

For example, for each block size in S={4, 8, 16, 32}×{4, 8, 16, 32} and each intra-NN prediction mode, there is a set of 4 intra-NN transforms. More generally, a number of multi-stage transforms may be 2 to 6, both inclusively. For block sizes other than those in S, the intra-NN transforms for a derived size s' are used. The size s' is obtained by taking the size in S which is in each, the vertical and horizontal dimension, the smallest in S, but has at least the size of the block.

Figure 10:
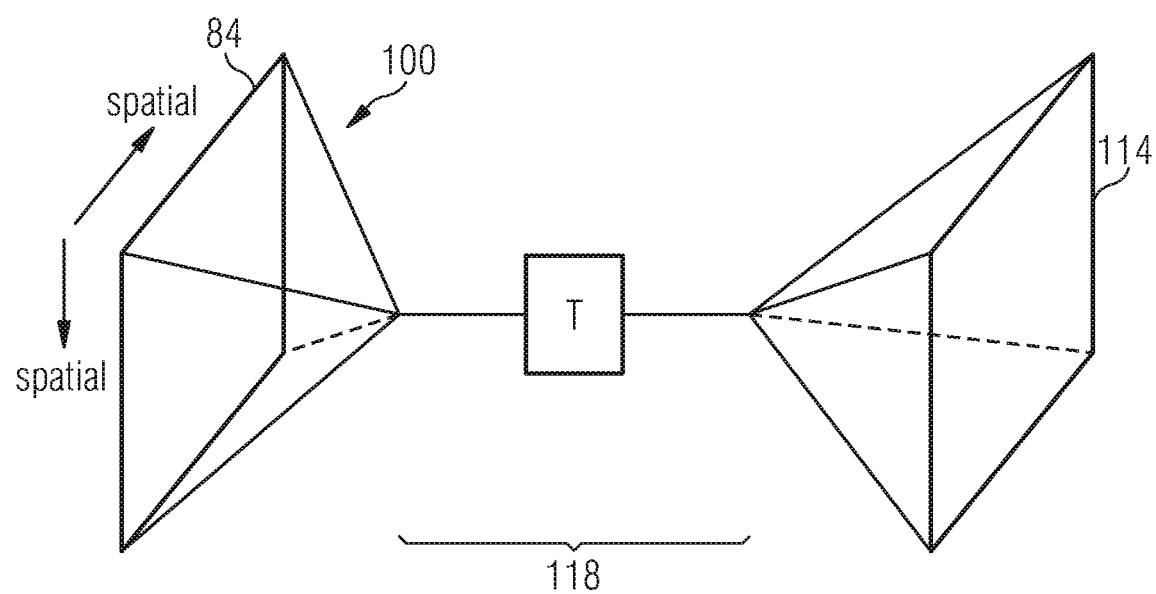
FIG. 10 shows a concept of a primary-only transform according to an embodiment of the present invention.

With reference to FIG. 10, additionally or alternatively, the encoder 10 and decoder 20 may be configured to perform the determination of the selectable set 98 such that for block sizes below the predetermined threshold, the selectable set 98 of transforms is populated by a second number of one or more non-separable transforms 118. The first number of multi-stage transforms 106 (FIG. 8) and the second number of non-separable transforms 118 (FIG. 10) may be equal.

The Intra-NN transforms for sizes with neither block height (H) nor block width (W) larger than 8 are defined as primary only transforms. For complexity reasons, larger transforms are defined as primary+secondary transform, having a low complex separable primary transform and a secondary transform applied to the primary coefficient sub-block only, which contains the first coefficient and has a size min(8, W)×min(8, H).

Figure 9:
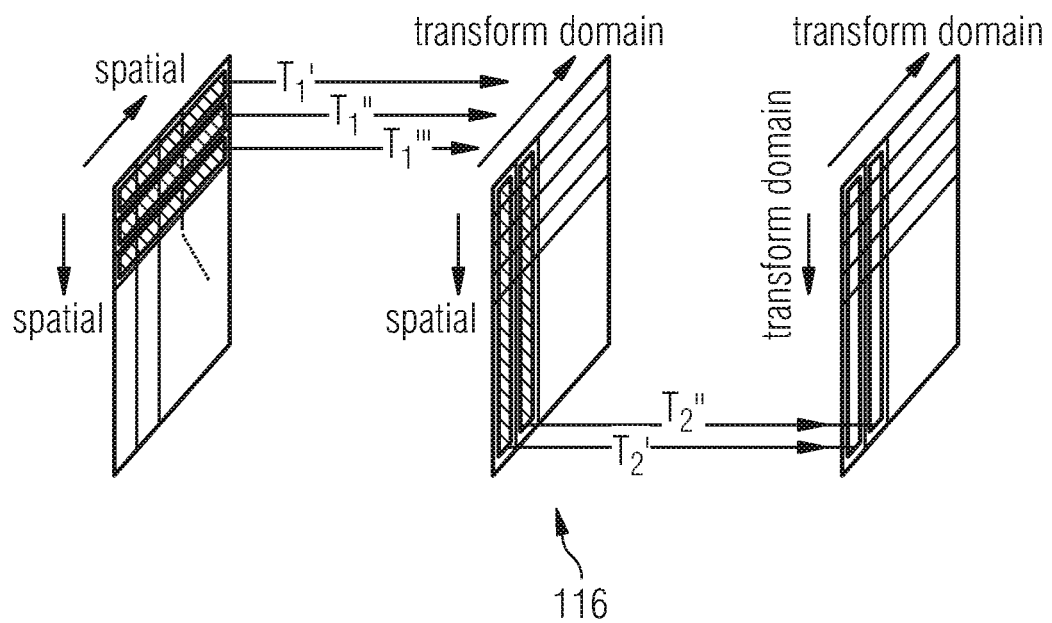
FIG. 9 shows a concept of a multi-stage transform comprising a primary transform and a secondary transform in the spatial domain exploiting a coding order in rows and columns according to an embodiment of the present invention.

Version 1:

With reference to FIG. 9, and further additionally or alternatively to the Intra-NN transforms, the encoder 10 and decoder 20 may be configured to perform the determination of the selectable set 98 such that the selectable set 98 of transforms is further populated by a third number (e.g. 1 or 5) of one or more separable two-dimensional transforms 116, i.e. the transform candidate lists for Intra-NN predicted residual blocks may include the following 5 separable (primary only) transforms from the DCT/DST family:

{[DCT-II, DCT-II], [DST-VII, DST-VII], [DST-VII, DCT-VIII], [DCT-VIII, DST-VII], [DCT-VIII, DCT-VIII]}

With: [vertical transform, horizontal transform]

Version 2:

Further additionally or alternatively to the Intra-NN transforms, the transform candidate lists for Intra-NN predicted residual blocks may include the separable (primary only) {DCTII,DCT-II} transform.

Version 3:

The Intra-NN prediction may be defined such that the prediction is given in a transform domain representation instead of in spatial domain representation. Hence, the prediction residual is given as the coefficients of a certain transform stage. In this case the first stages of the effectively applied transform are already explicitly defined by the used prediction.

For example, the encoder 10 and decoder 20 may be configured to perform the prediction so that the prediction of the intra predicted block 80 is obtained in a domain 118 of a primary transform 108. The encoder 10 and decoder 20 may further be configured to perform the determination of the selectable set 98 such that the selectable set 98 of transforms is populated by a fourth number of one or more multi-stage transforms 106, each involving the primary transform 108 and a secondary transform 110 applied onto a sub-group 112 of the primary transform coefficients 114 of the primary transform 108, wherein the secondary transform 110 may be non-separable and depending on the selected neural network.

As an example, the prediction residual may be given as the coefficients in DCT-II domain, i.e. the primary transform 108 may be a separable two-dimensional transform 116 (FIG. 9). In the case of primary+secondary transforms the primary transform is taken as the transform defined by the prediction mode (here, DCT-II). Hence, the secondary transform is defined on a sub-set of DCT-II coefficients. Here, it is defined on the sub-set of coefficients with lowest frequency of size min(8, W)×min(8, H), i.e. the sub-group 112 represents a low-frequency portion of the primary transform 108.

In this version, all transform candidates of an intra-NN predicted residual block have the same first transform stages, explicitly given by the intra mode. Additional to the 4 (e.g. between 2 and 6) trained Intra-NN transforms constructed on top of the given transform stages, the explicitly given transform itself is also added as a primary only transform to the candidate list (here DCT-II for all Intra-NN modes), i.e. the selectable set 98 of transforms may further be populated by the primary transform 108.

Figure 11:
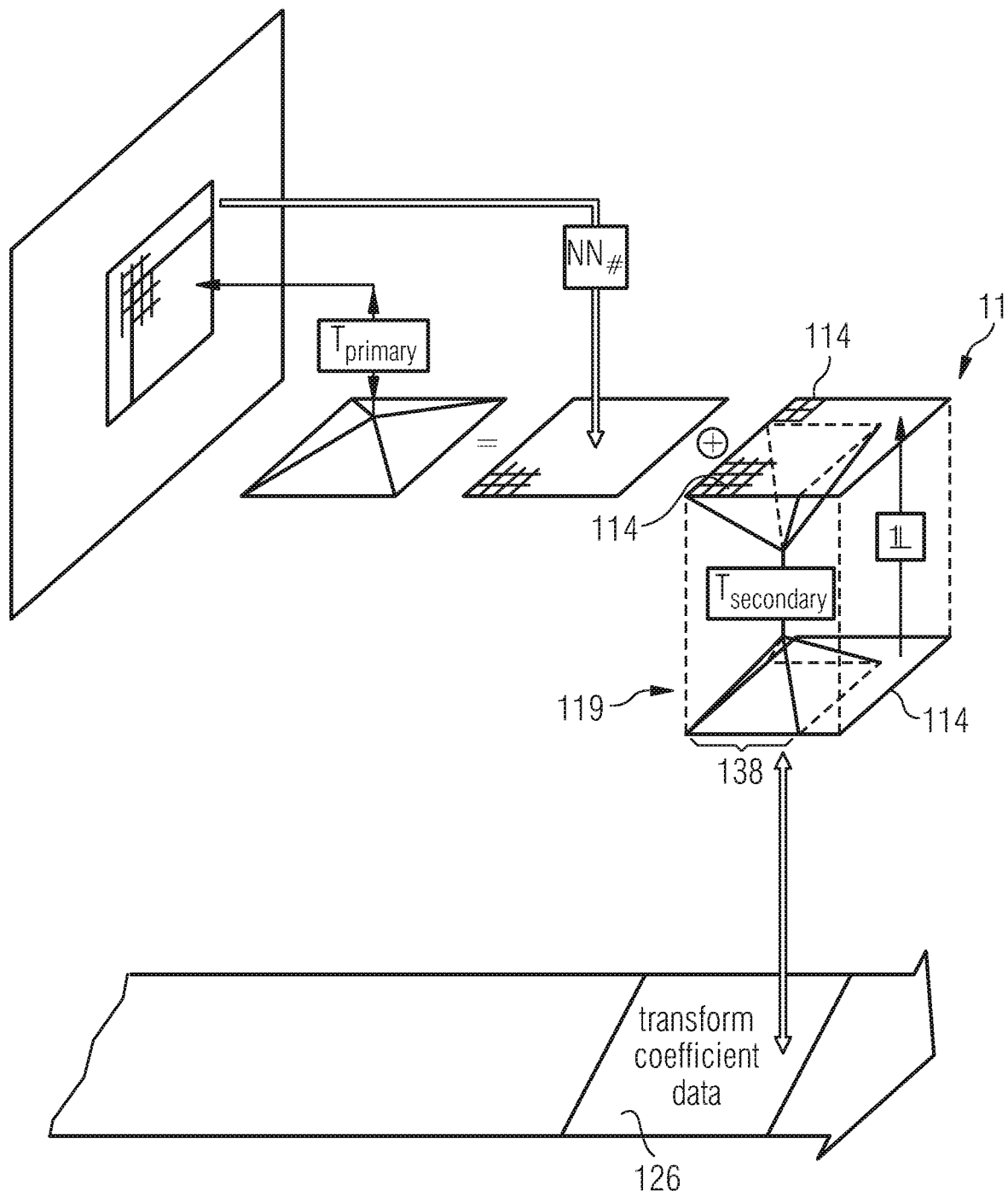
FIG. 11 shows a schematic block diagram of a block-based residual coding scheme using a multi-stage transform comprising a neural network according to an embodiment of the present invention.

A further example of an encoder 10 and a decoder 20 for intra-NN transforms is shown in FIG. 11. This example may be similar to the one described above with reference to FIGS. 7 and 10, which shall therefore also serve for the description of the following example.

The encoder 10 of this example may be configured to predict an intra-predicted block 80 by applying a spatial neighborhood 90 of the intra-predicted block 80 onto a neural network NN, to obtain a prediction 104 of the intra-predicted block 80 in a domain 118 (FIGS. 10, 11) of a primary transform 108. The encoder 10 may be configured to encode a prediction residual 100 associated with the prediction 104 of the intra-predicted block 80 within a residual block 84 using one selected transform 102 out of a selectable set 98 of transforms and signal the selected transform 102 in the data stream 14. In this example, the selectable set 98 of transforms is populated by at least one multi-stage transform 106 involving the primary transform 108 and a secondary transform 110 applied onto a sub-group 112 (FIG. 8) of primary transform coefficients 114 of the primary transform 108.

The corresponding decoder 20 may be configured to predict an intra-predicted block 80 by applying a spatial neighborhood 90 of the intra-predicted block 80 onto a neural network NN, to obtain a prediction 104 of the intra-predicted block 80 in a domain 118 (FIGS. 10, 11) of a primary transform 108. The decoder 20 may be configured to decode from the data stream 14 a prediction residual 100 associated with the prediction 104 of the intra-predicted block 80 within a residual block 84 in a further domain 119 of one selected transform 102 out of a selectable set 98 of transforms with deriving the selected transform 102 from the data stream 14. The selectable set 98 of transforms is populated by at least one multi-stage transform 106 involving the primary transform 108 and a secondary transform 110 applied onto a sub-group 112 (FIG. 8) of primary transform coefficients 114 of the primary transform 108.

The encoder 10 and decoder 20 may be configured to populate the selectable set 98 of transforms by a number of multi-stage transforms 106, each involving the primary transform 108 and a secondary transform 110 applied onto a sub-group 112 of primary transform coefficients 114 of the primary transform 108, the secondary transforms 110 being non-separable.

The number of multi-stage transforms may be between 2 and 6, both inclusively. Additionally or alternatively, the primary transform 108 may be a separable two-dimensional transform. Additionally or alternatively, the sub-group 112 may represent a low-frequency portion of the primary transform.

The encoder 10 and decoder 20 may be configured to perform the determination of the selectable set 98 so that the selectable set 98 of transforms is further populated by the primary transform.

4.1.4 Intra Predicted Residual Block (DC, Planar, Angular)

For intra predicted residual blocks, a dedicated set of transforms is defined, trained for the specific characteristics of the residual signal when its actual applied intra mode and block size are given. These transforms include primary only transforms and also, for complexity reasons, primary+secondary transforms where the primary transform has an especially low-complex implementation.

Again with reference to FIG. 7, an encoder 10 (similar to the one described above with reference to FIG. 1) and a decoder 20 (similar to the one described above with reference to FIG. 2) may be provided for encoding/decoding a picture 12 into/from a data stream 14 using block-based prediction and block-based residual coding. The encoder 10 and decoder 20 may be configured to predict an intra-predicted block 80 based on a spatial neighborhood 90 of the intra-predicted block 80 using a selected one of out of a set 120 of intra prediction modes to obtain a prediction 104 of the intra-predicted block 80. The encoder 10 and decoder 20 may be further configured to determine a selectable set 98 of transforms for a residual block 84 covering the intra-predicted block 80 out of the set 94 of transforms based on the selected intra prediction mode and a block size 96 of the residual block 84. The encoder 10 may further be configured to encode a prediction residual 100 associated with the prediction 104 of the intra-predicted block 80 within residual block 84 using one selected transform 102 out of the selectable set 98 of transforms and signal the selected transform 102 in the data stream 14. The decoder 20, in turn, may be configured to decode from the data stream 14 a prediction residual 100 associated with the prediction 104 of the intra-predicted block 80 within the residual block 84 in a domain of one selected transform 102 out of the selectable set 98 of transforms with deriving the selected transform 102 from the data stream (14).

Among the primary transforms are the transforms of the DCT/DST family as defined by AMT, which can be combined with the transforms defined by NSST to construct primary only and primary+secondary transforms, respectively. In other words, the primary transform 108 may depend on the selected intra-prediction mode and may be a separable two-dimensional transform 116. Accordingly, and again with reference to FIG. 8, the encoder 10 and decoder 20 may be configured to perform the determination of the selectable set 98 so that for block sizes of a first predetermined set of predetermined block sizes, the selectable set 98 of transforms is populated by a number of one or more multi-stage transforms 106, each involving a primary transform 108 applied onto the prediction residual 100 and a secondary transform 110 applied onto a sub-group 112 of primary transform coefficients 114 of the primary transform 108, the secondary transform 110 being non-separable and depending on the selected intra prediction mode.

Additional transforms may have been trained, which include fully-connected transform stages up to dimension 64 and intra mode dependent partitioning (e.g. the sub-group 112 may depend on the selected intra-prediction mode) of transform stage coefficients, especially, of primary transform coefficients. Which of these transforms are suitable for a residual block depending on its already decoded syntax elements has been found experimentally and is given by a look up table together with the following construction rules for the candidate lists.

Accordingly, and again with reference to FIG. 10, the encoder 10 and decoder 20 may be configured to perform the determination of the selectable set 98 such that for block sizes of a second predetermined set of predetermined block sizes smaller than the first predetermined set of predetermined block sizes, the selectable set 98 of transforms is populated by a second number of one or more non-separable transforms 118.

When constructing multi-stage transforms with the complexity constraints of using the sub-groups to be rectangular, dense and low-dimensional, one still has the freedom of selecting the shape of the sub-groups. Precisely, the shape can be quadratic or have a dominant dimension in either vertical or horizontal direction. It is dependent on the selected primary transform and the actual intra prediction mode, if either of those is of advantage. For example, if the DCT-II is the primary transform and the residual block was predicted with one of the horizontal directional modes, the residual primary coefficients are expected to be concentrated on the left side of the block, hence, the sub-group can be chosen to have a larger height than width. The contrary can be chosen for vertical intra directions.

Luma Component
Version 1

For generation of transform candidate lists for intra predicted luma residual blocks a lookup table may be used. This table holds the transform candidate list for the combination of sizes in $S3=\{64\times64\}+\{4, 8, 16, 32\}\times\{4, 8, 16, 32\}+\{4\times 12, 12\times4\}$ and intra mode indices in $I0=\{0, \ldots, 34\}$. As mentioned above, the encoder 10 and decoder 20 may be configured to determine the selectable set 98 of transforms for the residual block 84 covering the intra-predicted block 80 out of the set 94 of transforms based on the selected intra prediction mode and based on the block size 96 of the residual block 84.

The actual rule for obtaining the candidate list for a residual block is as follows:

Given that the intra mode is specified by one of the intra directions in {DC,Planar}+33 directional modes), this intra direction is used as the intra mode index into the LUT.

Given that the intra mode is specified by one of the intra directions in {DC,Planar}+65 directional modes), the intra mode index into the LUT is obtained by the following mapping:

| 0  | 1  | 2  | 3  | 4  | 5  | 6  | 7  | 8  | 9  | 10 | 11 | 12 | 13 | 14 | 15 | 16 | 17 | 18 | 19 | 20 |
|----|----|----|----|----|----|----|----|----|----|----|----|----|----|----|----|----|----|----|----|----|
| 0  | 1  | 2  | 2  | 3  | 3  | 4  | 4  | 5  | 5  | 6  | 6  | 7  | 7  | 8  | 8  | 9  | 9  | 10 | 10 | 11 |
| 21 | 22 | 23 | 24 | 25 | 26 | 27 | 28 | 29 | 30 | 31 | 32 | 33 | 34 | 35 | 36 | 37 | 38 | 39 |    |    |
| 11 | 12 | 12 | 13 | 13 | 14 | 14 | 15 | 15 | 16 | 16 | 17 | 17 | 18 | 18 | 19 | 19 | 20 | 20 |    |    |
| 40 | 41 | 42 | 43 | 44 | 45 | 46 | 47 | 48 | 49 | 50 | 51 | 52 | 53 | 54 | 55 | 56 | 57 | 58 |    |    |
| 21 | 21 | 22 | 22 | 23 | 23 | 24 | 24 | 25 | 25 | 26 | 26 | 27 | 27 | 28 | 28 | 29 | 29 | 30 |    |    |
| 59 | 60 | 61 | 62 | 63 | 64 | 65 | 66 | 67 |    |    |    |    |    |    |    |    |    |    |    |    |
| 30 | 31 | 31 | 32 | 32 | 33 | 33 | 34 | 34 |    |    |    |    |    |    |    |    |    |    |    |    |

For residual blocks with sizes in S3, this size is used as input to the LUT, otherwise a second look up table is used, which defines for each intra mode index in I0 one set of fixed transform candidates.

Accordingly, the encoder 10 and decoder 20 may be configured such that a manner at which the secondary transform 110 depends on the selected intra prediction mode involves an intra prediction mode aggregation, e.g. a quantization of an intra prediction mode index or a quantization of an intra prediction direction of angular intra prediction modes among the set 120 of intra prediction modes.

Additionally or alternatively, the encoder 10 and decoder 20 may be configured such that a manner at which the primary transform 108 depends on the selected intra prediction mode involves an intra prediction mode aggregation, e.g. a quantization of an intra prediction mode index or a quantization of an intra prediction direction of angular intra prediction modes among the set 120 of intra prediction modes.

Version 2

Difference to Version 1 is the deviation of transform candidates for residual blocks with sizes not in S3. Here, the size s' is used to address the lookup table. Where, s' is the smallest size in S3 with each dimension being greater or equal than the corresponding dimension of s.

Chroma Components (No Chroma Dual-Tree)

Version 1

The transform candidates for chroma residual blocks are obtained from the same set of transforms as the luma transform candidates. Here, each transform-key can define two separate chroma transform candidates. If the prediction mode of a chroma component is equal to the luma mode, the first candidate is taken. Otherwise, the second candidate is taken.

Version 2

The transform candidates for chroma residual blocks are obtained from the same set of transforms as the luma transform candidates. Here, each transform-key can define two separate chroma transform candidates. If so, both transforms are added to the chroma candidate list.

4.1.5 Adding/Replacing and Re-Ordering Candidates Depending on Transform Decisions of Neighboring Transform Blocks Additional to the transform candidates derived from the properties of the transform block itself, such as prediction mode, block size etc., candidates can also be derived from neighboring transform blocks. Some examples shall be discussed in the following:

For example, FIG. 12 shows a picture 12 being partitioned into a current residual block 84 and spatially neighboring residual blocks 84', 84" which may be directly adjacent to the current residual block 84 or spatially distanced from the current residual block 84. Assuming that neighboring residual blocks 84', 84" are similar in various properties, such as residual energy and signal structure, this similarity can be exploited by including the information of selected neighboring transforms into the deviation process of candidates for the current block 84.

With reference to FIG. 12, an encoder 10 (similar to the one described above with reference to FIG. 1) and a decoder 20 (similar to the one described above with reference to FIG. 2) may be provided for encoding/decoding a picture 12 into/from a data stream 14 using block-based prediction and block-based residual coding.

The encoder 10 and decoder 20 may be configured to determine 122 a selectable list 98 of transforms for a current residual block 84 out of the set 94 of transforms based on a reference transform selected for a neighboring residual block 84', 84". The encoder 10 may be configured to encode a prediction residual 100 within the residual block 84 using one selected transform 102 out of the selectable list 98 of transforms and signal the selected transform 102 in the data stream 14. The decoder 20, in turn, may be configured to decode a prediction residual 100 within the residual block 84 in a domain of one selected transform 102 out of the selectable list 98 of transforms with deriving the selected transform 102 from the data stream 14.

Generally, if a neighboring transform block 84', 84" has the same size and prediction mode as the current block 84, the selected transform of the neighboring transform block 84', 84" is also a candidate of the current block 84, provided the list is constructed as described above. In such cases, the current candidate list can be re-ordered such, that the candidate which has been selected before is put at one of the first positions in the candidate list. Accordingly, the encoder 10 and decoder 20 may be configured to order 122 the selectable list 98 using the reference transform.

For example, the encoder 10 and decoder 20 may be configured to order 122 the selectable list 98 by positioning the reference transform or a transform corresponding to the reference transform (e.g. with respect to being one-stage, signaled by a high transform index 124 and thus being likely very specialized transform, analytical transform type for different sized neighboring block) at a rank (# in "n,") associated with a most probable selection (e.g. first position, or position associated with lowest index value of index 124 or with index value associated with shortest VLC). Alternatively, the encoder 10 and decoder 20 may order 122 the selectable list 98 by positioning the reference transform or a transform corresponding to the reference transform at a rank (# in "n,") associated with a second most probable selection.

This can improve the signaling of the candidate and also allows an efficient fast search mode for testing the transform candidates at the encoder, by skipping the testing of following candidates.

If the transform decision of more than one neighboring block 84', 84" is available, the actual position of each candidate in the current list can be conditioned on how often it was selected in neighboring blocks 84', 84", by putting candidates which have been selected more frequently to the front of the list. It might be beneficial to keep the first candidate in list unchanged and putting the most frequent selected candidate as second position, as the first transform is often most probable, even when conditioned on neighboring decisions.

Accordingly, the encoder 10 and decoder 20 may be configured to determine 122 a selectable list 98 of transforms for a current residual block 84 out of the set 94 of transforms based on reference transforms selected for a set of neighboring residual blocks 84', 84".

Furthermore, the encoder 10 and decoder 20 may be configured to order 122 the selectable list 98 by positioning the reference transforms mutually at an order corresponding to a frequency at which the reference transforms are selected for the set of neighboring residual blocks 84', 84".

When the neighboring residual block 84', 84" differs in prediction mode or block size, the selected neighboring transform is not necessarily already a candidate of the current block 84. In such cases, the selected transform can be added to current transform list if it is also defined for the current block size. Accordingly, the encoder 10 and decoder 20 may be configured to populate 122 the selectable list 98 with the reference transform.

If a transform is actually added to a candidate list it should be conditioned on the similarity of selected prediction mode of both blocks. For example, if both blocks are predicted using a directional mode and their direction indices differ in more than 2 and the selected transform of the neighboring block is a transform specifically trained for that mode, it is unlikely that this transform is a promising candidate for the current block. If on the other hand both prediction modes are similar or a general-purpose transform (such as DCT or DST) has been selected, it can be also added to the current candidate list. If both blocks differ only in their sizes and the already known selected transform is from an analytical defined transform, such as from the DCT/DST family, the corresponding transform for the current block size can be directly derived and added to the candidate list.

Accordingly, the encoder 10 and decoder 20 may be configured to perform the populating provided that one or more certain characteristics associated with the neighboring block 84', 84" and the current residual block 84 are sufficiently similar, and/or the reference transform is a separable spectrally decomposing transform. Said one or more characteristics may, e.g. comprise one or more of an intra prediction mode.

Additionally or alternatively, the reference transform may be an analytically definable separable spectrally decomposing transform (such as a DCT, DST, FFT or the like) and the encoder 10 and decoder 20 may be configured to populate 122 the selectable list 98 with a further transform derived by adapting the reference transform to a block size 96 of the current residual block 84.

Even when the selected transform of a neighboring block is not a candidate of the current list, knowing that transform can help predicting the best candidate of the current list and hence, the ordering of candidates can be conditioned on that transform. For example, let the primary transform of the neighboring block be from the DCT/DST family, all candidates that have the corresponding primary transform of the current size can be put to the front of the candidate list, as mentioned above.

Furthermore, assuming that the energy of neighboring blocks are correlated, it is likely that the number of significant coefficients of the current block will be high, when the neighboring residual block has a large number of significant coefficients. The same correlation can be assumed for the opposite case of few coefficients.

Accordingly, the encoder 10 and decoder 20 may be configured to order 122 the selectable list 98 by ranking transforms in the selectable set 98 of transforms according to a similarity to the reference transform in one or more certain characteristics and/or determine the selectable list 98 of transforms in a manner excluding transforms from the selectable list 98 which exceed a certain dissimilarity to the reference transform in one or more certain characteristics. For example, said one or more characteristics may comprise one or more of a primary transform (e.g. equality in primary transform is used).

This information can be used to re-order the candidates or to even remove unlikely transforms from the list. For example, having a transform candidate with a secondary transform defined on a sub-group of k coefficients, this candidate could be removed or put to last positions if the neighboring residual block 84', 84" has far less than k significant coefficients. Also, if it is expected that only few coefficients are significant, it is less likely to benefit from having transform candidates that share the same primary transform but differ only in their secondary transforms. If such transforms are among the candidates, the list can be reduced in such cases by only keeping the first of those transforms or by even replacing these transforms by the corresponding primary only transform.

According to an example, the encoder 10 may be configured to determine 122 a selectable list 98 of transforms for a current residual block out of the set of transforms based on a reference transform selected for a neighboring residual block, in a manner dependent on a number of, or a sum over, significant transform coefficients in one or more neighboring residual blocks 84', 84". If the number or sum is larger than a certain threshold, then the selectable list 98 of transforms for a current residual block is populated with at least one multi-stage transform involving a primary transform applied onto a prediction residual 100 of the current residual block and a secondary transform applied onto a sub-group of primary transform coefficients of the primary transform. If the number or sum is smaller than the certain threshold, then the selectable list of transforms for a current residual block is populated, in addition to or in place of the at least one multi-stage transform, with a modification of the at least one multi-stage transform wherein primary transform coefficients beyond the sub-group are zeroed. In either case, the encoder 10 may be configured to encode a prediction residual within the residual block using one selected transform out of the selectable list of transforms and signal the selected transform in the data stream.

The corresponding decoder 20 may be configured to determine 122 a selectable list 98 of transforms for a current residual block out of the set of transforms based on a reference transform selected for a neighboring residual block 84', 84", in manner dependent on a number of, or a sum over, significant transform coefficients in one or more neighboring residual blocks 84', 84". If the number or sum is larger than a certain threshold, then the selectable list 98 of transforms for a current residual block is populated with at least one multi-stage transform involving a primary transform applied onto a prediction residual 100 of the current residual block and a secondary transform applied onto a sub-group of primary transform coefficients of the primary transform. If the number or sum is smaller than the certain threshold, then the selectable list of transforms for a current residual block is populated, in addition to or in place of the at least one multi-stage transform, with a modification of the at least one multi-stage transform wherein primary transform coefficients beyond the sub-group are zeroed. In either case, the decoder 20 may be configured to decode a prediction residual within the residual block in a domain of one selected transform out of the selectable list of transforms with deriving the selected transform from the data stream.

Additionally or alternatively, the encoder 10 and decoder 20 may be configured to order 122 the selectable list 98 by ranking transforms in the selectable set 98 of transforms depending on one or more certain characteristics of the neighboring block 84' and/or determine the selectable list 98 of transforms in a manner excluding transforms from the selectable list 98 depending on one or more certain characteristics of the neighboring block 84'. For example, said one or more characteristics may comprise one or more of a number of significant transform coefficients.

Additionally or alternatively, said one or more characteristics may comprise one or more of a number of significant transform coefficients with ranking transforms less probable or excluding same which are of a multi-stage type with a sub-group 112 of primary transform coefficients subject to a secondary transform if the number of significant transform coefficients is below a certain threshold (e.g. depending on the number of coefficients in sub-group 112).

4.1.6 Providing Transform Candidates Adapted to the Quantization Parameter

Transforms can be optimized for different reconstruction points of the quantization stage, and hence for different quantization parameters (QP). If a QP adaptive set of transforms is defined for a prediction mode, the candidate list is constructed by one of the following rules:

If a transform is defined for the current QP, this transform is added to the candidate list.

The transform defined for a QP which is closest to the current QP is added to the candidate list.

Two transforms are added to the candidate list. First the transform defined for the next smaller QP than the current QP, second the transform defined for the next larger QP than the current QP.

Accordingly, with reference to FIG. 7, the encoder 10 and decoder 20 may be configured to check whether a quantization parameter of the residual block 84 is included in a set of one or more predetermined quantization parameters. If the answer is 'yes', the encoder 10 and decoder 20 may perform the determination of the selectable set 98 so that the selectable set 98 of transforms is further populated by a set of one or more predetermined transforms associated with the set of one or more predetermined quantization parameters.

Additionally or alternatively, the encoder 10 and decoder 20 may be configured to check whether a quantization parameter of the intra-predicted block is included in a set of one or more predetermined quantization parameters. If the answer is 'yes', the encoder 10 and decoder 20 may perform the determination of the selectable set 98 such that the selectable set 98 of transforms is further populated by a set of one or more predetermined transforms associated with the set of one or more predetermined quantization parameters.

Further additionally or alternatively, the encoder 10 and decoder 20 may be configured to check whether a quantization parameter of the residual block 84 is included in a set of one or more predetermined quantization parameters. If the answer is 'yes', the encoder 10 and decoder 20 may perform the determination of the selectable set 98 such that the selectable set 98 of transforms is further populated by a set of one or more predetermined transforms associated with the set of one or more predetermined quantization parameters.

Still further additionally or alternatively, the encoder 10 and decoder 20 may be configured to check whether a quantization parameter of the current block is included in a set of one or more predetermined quantization parameters. If the answer is 'yes', the encoder 10 and decoder 20 may perform the determination of the selectable set 98 such that the selectable set 98 of transforms is further populated by a set of one or more predetermined transforms associated with the set of one or more predetermined quantization parameters.

Adding/Replacing Candidates by Transforms with Dimension-Reduction

Depending on the transform block size and the quantization parameter (QP) it can be beneficial to include transform candidates which explicitly reduce the dimension of the prediction residual, and hence allow an efficient coding of coefficients and an implementation with reduced complexity. Per definition, these transforms only lead to an error free representation for a certain sub-class of residual signals. On the other hand, this resembles the quantization of coefficients to zero and can allow an efficient coding of non-significant coefficient positions.

One of the following rules may be applied:

If the candidate list contains at least one primary+secondary transform, and the current QP is larger than a threshold Tqp, the primary+secondary transforms are replaced by a corresponding transform with dimension-reduction characteristics.

These transforms are constructed from the corresponding original candidate in the list by forcing those coefficients to be zero which do not belong to the sub-group of coefficients which are further transformed by the secondary transform.

If the candidate list contains at least one primary+secondary transform, and the current QP is larger than a threshold Tqp, for each primary+secondary transform a transform with dimension-reduction is added to the list. These transforms are constructed from the original candidates in the list by forcing those coefficients to be zero which do not belong to the sub-group of coefficients which are further transformed by the secondary transform.

If the candidate list contains at least one primary+secondary transform, and the sum of significant coefficients of the neighbouring transform blocks is less than a threshold T, the primary+secondary transforms are replaced by a corresponding transform with dimension-reduction characteristics. These transforms are constructed from the corresponding original candidate in the list by forcing those coefficients to be zero which do not belong to the sub-group of coefficients which are further transformed by the secondary transform.

If the candidate list contains at least one primary+secondary transform, and the sum of significant coefficients of the neighbouring transform blocks is less than a threshold T, for each primary+secondary transform a transform with dimension-reduction is added to the list. These transforms are constructed from the original candidates in the list by forcing those coefficients to be zero which do not belong to the sub-group of coefficients which are further transformed by the secondary transform.

According to an example, the encoder 10 may be configured for encoding a picture 12 into a data stream 14 using block-based prediction and block-based residual coding, the encoder supporting a set 94 of transforms for the block-based residual coding. The encoder 10 may be configured to determine a selectable list 98 of transforms for a current residual block 84 out of the set of transforms, in a manner dependent on a quantization parameter of the current block so that if the quantization parameter corresponds to a quantization finer than a certain threshold, the selectable list 98 of transforms for a current residual block is populated with at least one multi-stage transform 106 involving a primary transform 108 applied onto a prediction residual 100 within the current residual block and a secondary transform 110 applied onto a sub-group 112 of primary transform coefficients 114 of the primary transform. If the quantization parameter corresponds to a quantization coarser than a certain threshold, then the selectable list of transforms for a current residual block is populated, in addition to or in place of the at least one multi-stage transform 106, with a modification of the at least one multi-stage transform wherein the primary transform coefficients 114 beyond the sub-group 112 are zeroed. In either case, the encoder 10 may be configured to encode the prediction residual 100 within the residual block 84 using one selected transform 102 out of the selectable list 98 of transforms and signal the selected transform in the data stream 14.

Furthermore, a corresponding decoder 20 may be provided for decoding a picture 12 from a data stream 14 using block-based prediction and block-based residual decoding, the decoder supporting a set 94 of transforms for the block-based residual decoding. The decoder 20 may be configured to determine a selectable list 98 of transforms for a current residual block 84 out of the set of transforms, in manner dependent on a quantization parameter of the current block so that, if the quantization parameter corresponds to a quantization finer than a certain threshold, the selectable list 98 of transforms for a current residual block is populated with at least one multi-stage transform 106 involving a primary transform 108 applied onto a prediction residual 100 within the current residual block and a secondary transform 110 applied onto a sub-group 112 of primary transform coefficients 114 of the primary transform. If the quantization parameter corresponds to a quantization coarser than a certain threshold, the selectable list of transforms for a current residual block populated, in addition to or in place of the at least one multi-stage transform 106, with a modification of the at least one multi-stage transform wherein the primary transform coefficients 114 beyond the sub-group 112 are zeroed. In either case, the decoder 20 may be configured to decode the prediction residual 100 within the residual block 84 in a domain of one selected transform 102 out of the selectable list 98 of transforms with deriving the selected transform from the data stream 14.

4.2 Reduction of Transform Candidate List

During the decoding process of the residual coefficients the transform candidate list can be reduced subsequently if the newly obtained information doesn't meet the constraints of specific transforms in the list. This helps reducing the coding costs of the selected candidate and also allows a conditioning of following syntax elements on the specific properties of the remaining transform candidates, and hence increases the coding efficiency. It might be beneficial to increase the number of syntax elements affected by the reduced candidate list by explicitly coding information about the selected transform beforehand.

Figure 14:
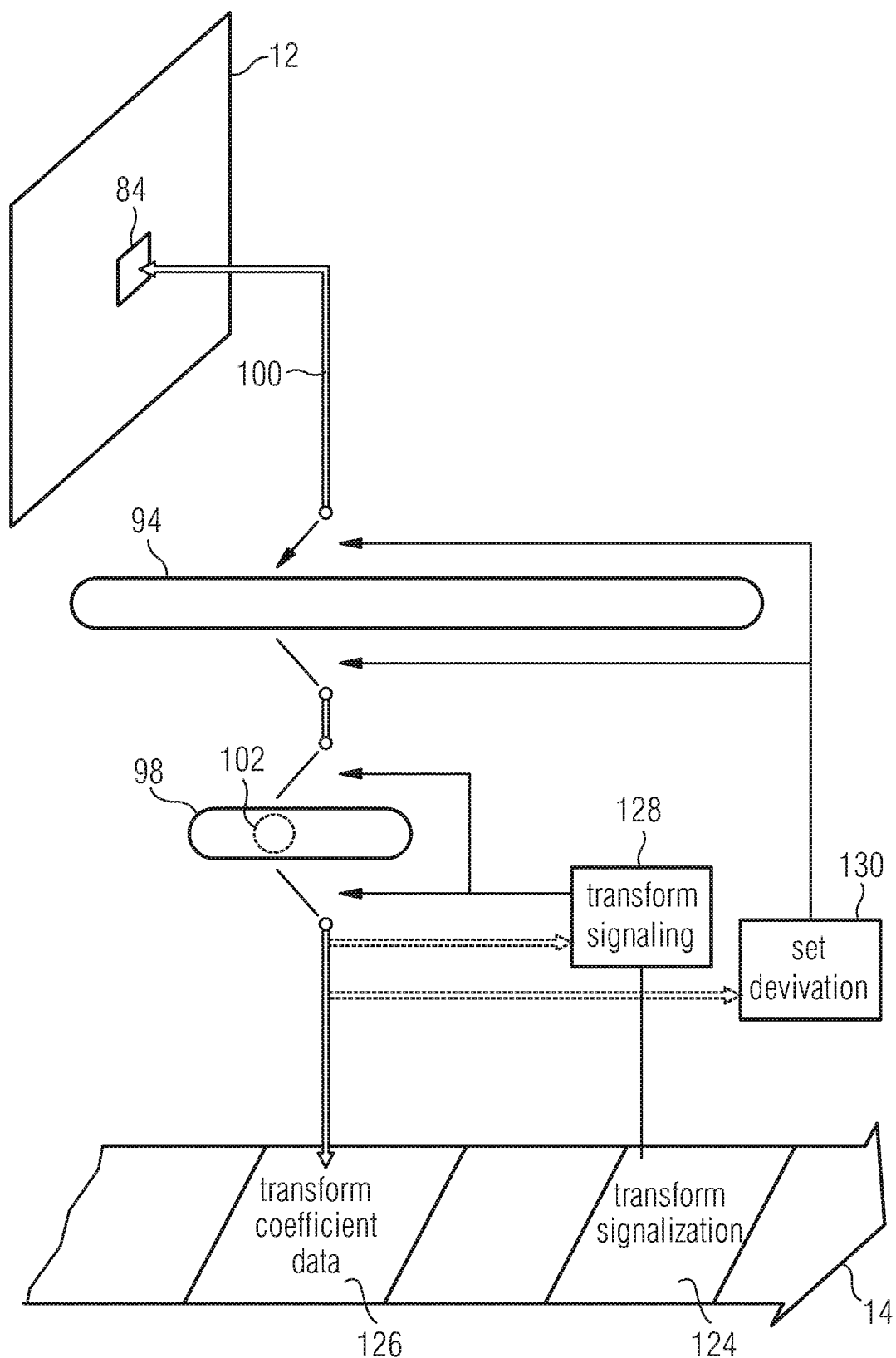
FIG. 14 shows a schematic block diagram of a block-based residual coding scheme using a set of transforms and a selectable set of transforms and using transform signaling according to an embodiment of the present invention.

With reference to FIG. 14, an encoder 10 and a decoder 20 may be provided for encoding/decoding a picture 12 into/from a data stream 14 using block-based prediction and block-based residual coding. The encoder 10 and decoder 20 may support a set 94 of transforms for the block-based residual coding in a way similar as explained above. However, according to this example, the encoder 10 and decoder 20 may be configured to determine 130 a selectable list 98 of transforms for a current residual block out of the set 94 of transforms. The encoder 10 may be configured to encode transform coefficient data 126 into the data stream 14 which represents a prediction residual 100 within the residual block 84 using one selected transform 102 out of the selectable list 98 of transforms. The encoder 10 may further be configured to signal 128 the selected transform 102 in the data stream 14, and/or to perform the determination 130 of the selectable list 98, in a manner depending on the transform coefficient data 126 or on a portion of the transform coefficient data 126. The decoder 20, in turn, may be configured to decode the transform coefficient data 126 from the data stream 14 which represents a prediction residual 100 within the residual block 84 using one selected transform 102 out of the selectable list 98 of transforms. The decoder 20 may further be configured to derive 128 the selected transform 102 from the data stream 14, and/or to perform the determination 130 of the selectable list 98, in a manner depending on the transform coefficient data 126 or a portion of the transform coefficient data 126.

For example, the encoder 10 and decoder 20 may be configured to determine 130 the selectable list 98 of transforms, by populating the selectable list 98 with a number of transforms out of the set 94 of transforms which number depends on the transform coefficient data 126, or a portion of the transform coefficient data, and to perform the signaling 128 the selected transform 102 in the data stream 14 in a manner so that a code rate spent in the data stream 14 for the signaling the selected transform 102 is the lower the lower the number is.

Additionally or alternatively, the encoder 10 and decoder 20 may be configured to determine 130 the selectable list 98 of transforms, by ordering the selectable list 98 of transforms depending on the transform coefficient data 126, or a portion of the transform coefficient data 126, and to perform the signaling 128 of the selected transform 102 in the data stream 14 using a variable length code, codewords of which are assigned to the transforms of the selectable list 98 of transforms depending on an order of the transforms in the selectable list 98 of transforms.

Figure 15:
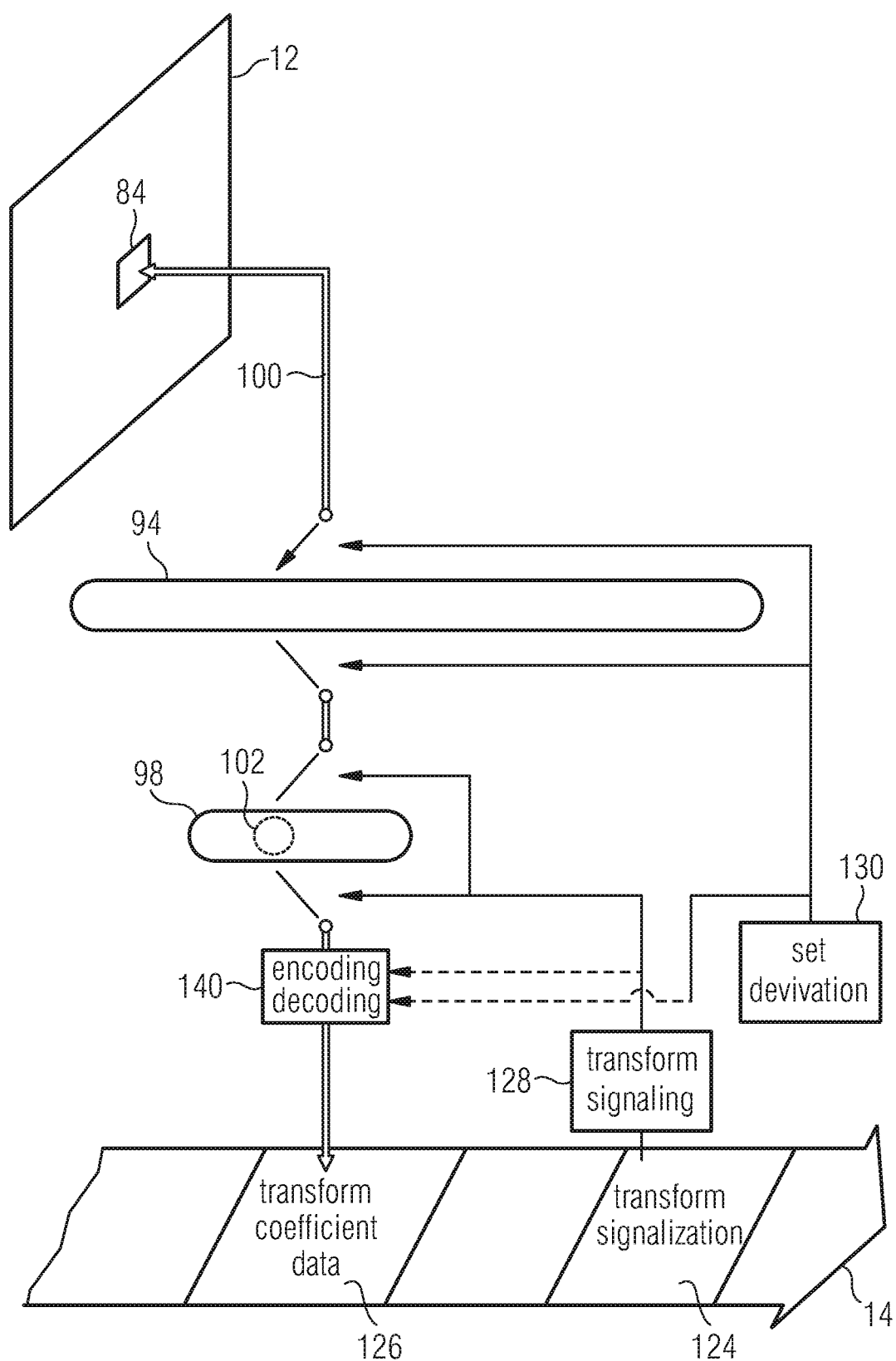
FIG. 15 shows a schematic block diagram of block-based residual coding scheme using a set of transforms and a selectable set of transforms and using transform signaling according to an embodiment of the present invention.

FIG. 15 shows a further example of an encoder 10 and decoder 20 for encoding/decoding a picture 12 into/from a data stream 14 using block-based prediction and block-based residual coding, the encoder 10 and decoder 20 both supporting a set of transforms for the block-based residual coding. The encoder 10 and decoder 20 of this example may be configured to determine 130 a selectable list 98 of transforms for a current residual block out of the set of transforms. The encoder 10 may be configured to signal 128 the selected transform in the data stream 14 and to encode 140 transform coefficients, which represent a prediction residual within the residual block using one selected transform out of the selectable list of transforms, in a manner dependent on the selected transform 102 or the selectable list 98 of transforms. The decoder 20, in turn, may be configured to derive 128 the selected transform from the data stream 14, and to decode 140 from the data stream 14 transform coefficients, which represent a prediction residual within the residual block using one selected transform out of the selectable list of transforms, in a manner dependent on the selected transform 102 or on the selectable list 98 of transforms.

Figure 13:
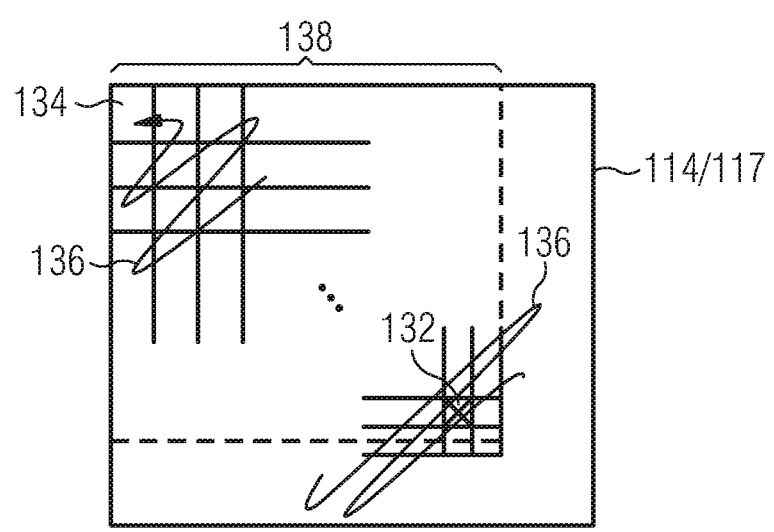
FIG. 13 shows a schematic block diagram of a residual block comprising a plurality of significant and non-significant transform coefficients which are coded in a predetermined coding order according to an embodiment of the present invention.

For example, FIG. 13 shows a block 114 having multiple values of transform coefficients 134 of the selected transform, which values of transform coefficients 134 may be traversed in a predetermined scan order 136. One exemplary significant (i.e. non-zero valued) transform coefficient position 132, which may be the last significant transform coefficient position in this example, is marked with an 'x' in FIG. 13.

The possible constraints on the transform candidate list may include that at least a specific number of significant (i.e. non-zero valued) coefficients 134 is needed in order to compensate for the additional signaling cost of the transform candidate. While this constraint can be fulfilled by reducing the candidate list after the exact number of significant coefficients 134 has been obtained, it is also possible to remove transform candidates indicated by the position of the last significant coefficient 132. This increases the number of syntax elements possibly affected by the reduced list, as the last position is usually coded beforehand.

According to an example (c.f. FIGS. 13 and 14), the encoder 10 and decoder 20 may be configured such that the transform coefficient data 126 comprises an indication of a significant transform coefficient position 132 of the selected transform 102 and values of transform coefficients 134 of the selected transform which are traversed from the significant transform coefficient position 132 onwards by a predetermined scan order 136 which sequentially traverses coefficient positions of the selected transform, wherein the determination 130 of the selectable list 98 is dependent on the indication, i.e. the indication is the "portion" of the transform coefficient data 126.

According to a further example, the encoder 10 and decoder 20 may be configured to count a number of significant transform coefficients 134 of the selected transform 102, wherein the determination 130 of the selectable list 98 is dependent on the count.

For multi-stage transform candidates which only apply further transform stages to a specific subset of their primary transform coefficients, constraints can be defined based on that sub-set. This includes that at least a specific number of significant positions have to fall into this subset. This constraint could be already violated by the maximum number of possibly significant positions, which is known after decoding the last significant position or as soon as the exact number of significant positions is known. As soon as a constraint is violated the corresponding transform candidates are removed from the list and the following decoding process can benefit from a reduced set of transform candidates.

Accordingly, the encoder 10 and decoder 20 may be configured to evaluate the transform coefficient data 126 with respect to whether a number of significant transform coefficients 134 of the selected transform 102 within a sub group 138 (FIG. 13) of the transform coefficients 134 of the selected transform 102 exceeds a certain threshold or not, and performing the determination 130 of the selectable list 98 may be dependent on the count, i.e. on the number of significant transform coefficients 134 as follows:

1) if the number is larger than the certain threshold, then the selectable list 98 of transforms for the current residual block 84 is populated with at least one multi-stage transform 106 involving a primary transform applied onto the prediction residual 100 of the current residual block and a secondary transform applied onto a sub-group 112 of primary transform coefficients 114 of the primary transform 106 to result into the sub group 138 of the transform coefficients of the selected transform 102.
2) if the number is smaller than the certain threshold, then the selectable list of transforms for a current residual block is not populated with any multi-stage transform 106 involving a primary transform applied onto the prediction residual 100 of the current residual block and a secondary transform applied onto the sub-group of primary transform coefficients of the primary transform.

Furthermore, the reduction of the chroma candidate lists can depend on the actual transform decision of the luma component. Different candidate lists (e.g. luma and chroma), can also share one transform index, in such cases the second list is reduced to the selected transform given by the transform index already decoded for the first list.

EXEMPLARY EMBODIMENTS

In the following, some exemplary embodiments are given in order to concretize the above general description:

If the number of significant coefficients is less than a threshold T0 (e.g. 3), the list of transform candidates is reduced to its first two entries.

If the number of significant coefficients is less than a threshold T1 (e.g. 3), the list of transform candidates is reduced to its first entry.

If luma and chroma share the same coding structure and the total number of significant coefficients (of all TUs in a CU), including luma and chroma components, is less than a threshold T0, the candidate list of all TUs in that CU is reduced to their first entry.

If the total number of significant coefficients (of all TUs in a CU), including luma and chroma components, is less than a threshold T0, the candidate lists of all TUs in that CU are reduced to their first two entries. Otherwise, if the total number of significant luma coefficients of a single TU is less than a threshold T1, the candidate list is reduced to its first 5 entries.

Given the number of significant coefficients and a table which maps thresholds to the number of candidates to keep, the candidate list is reduced accordingly to its first entries.

Given the number of significant coefficients and a table which maps thresholds and the prediction mode to the number of candidates to keep, the candidate list is reduced accordingly to its first entries.

Given the number of significant coefficients and a table which maps thresholds and the QP to the number of candidates to keep, the candidate list is reduced accordingly to its first entries.

If luma and chroma share the same coding structure and no residual signal is coded for the luma component, the candidate lists of the aligned chroma components are reduced to their first entries.

If luma and chroma share the same coding structure and a total sum of significant coefficients including luma and chroma components of a transform unit is less than a threshold T3 (e.g. 3), the candidate list of all TUs in that CU is reduced to their first candidate.

If luma and chroma share the same coding structure and the luma transform is already decoded, chroma transform candidates are kept only if they are of the same class as the luma transform.

If luma and chroma share the same coding structure and the luma transform is already decoded, chroma transform candidates are kept only if they are of the same class as the luma transform or if they are first in the list.

Given the positions of significant coefficients of a transform block, it is checked for each multi stage transform candidate if the input to the secondary transform includes at least K significant coefficients. If not, the transform is removed from the candidate list.

Given the position of the last significant position it is counted how many coefficients are possibly significant. Given a table which maps thresholds to the number of candidate to keep, the candidate list is reduced accordingly to its first entries.

Given the position of the last significant position of a transform block and the scan order, it is checked for each multi stage transform candidate whether the input to the secondary transform includes at least K positions that might be significant. If not, the transform is removed from the candidate list.

Thus, according to an embodiment, an encoder and a respective decoder are suggested, both of which being configured to code the transform coefficients 134 of the current residual block 84 by traversing a predetermined scan order 136 and determine a last significant transform coefficient 132 in said scan order. The encoder and decoder are further configured to perform the determination 130 based on the position of the determined last coded significant transform coefficient 132 such that if the position of the determined last coded significant transform coefficient 132 indicates a first number of available significant transform coefficients ("first number"=enough significant coefficients available for performing multi-stage transform), the selectable list 98 of transforms for the current residual block 84 is populated with at least one multi-stage transform 106 involving a primary transform applied onto the prediction residual 100 of the current residual block and a secondary transform applied onto a sub-group 112 of primary transform coefficients 114 of the primary transform 106 to result in a sub group 138 of the transform coefficients of the selected transform 102, and if the position of the determined last coded significant transform coefficient 132 indicates a second number of available significant transform coefficients ("second number"=not enough significant coefficients available for performing multi-stage transform), the selectable list 98 of transforms for a current residual block 84 is not populated with any multi-stage transform 106 involving a primary transform applied onto the prediction residual 100 of the current residual block 84 and a secondary transform applied onto the sub-group 112 of primary transform coefficients of the primary transform.

Given the position of the last significant position of a transform block and the scan order, for each secondary transform the number of possibly significant input coefficients is counted.

The transform with the largest value is kept, all other secondary transforms are removed.

All embodiments can be conditioned on the prediction mode and QP.

4.3 Signaling

As mentioned above, reducing the transform candidate list by utilizing already decoded information about the transform block coefficients reduces the costs needed for signaling the actual selected transform. On the other hand, this dependency can also be exploited by conditioning the coefficient decoding process on properties of the selected transform. Both approaches use a specific coding order of syntax elements and can be applied jointly in an interleaved manner. As special cases, the transform index into the list of candidates can be signaled completely either in the very beginning of the coding process of a transform block or at the end, when all coefficients are already known. In the latter case, the information about all coefficients can be used to reduce the candidate list, whereas in the former case, no prior reduction of candidates is possible, but the decoding of each coefficient can benefit from the full knowledge about the used transform.

While it is obvious that reducing the candidate list also reduces the actual signaling cost for the selected candidate, the conditional coding of coefficients on the selected transform is less straight forward and it depends on the actual selected transform, the candidate list and the residual signal itself, if it can take profit with reasonable complexity.

If the selected candidate is a transform with dimension reduction, there is no need for signaling significance information for a whole sub-group of coefficients at all. This also allows for an efficient signaling of the last position on a smaller set of remaining positions, which could be even omitted completely by setting the possibly last significant position to the last position given by the transform. In such cases a significance flag may be coded for each possibly significant position as defined by the transform, while the concept of signaling a significance group flag for a whole group of positions first, is also applicable here. In order to make use of this dependencies, it can be beneficial to check whether a transform with dimension reduction is among the candidates before coding the coefficients, and if so, to signal if and where applicable which of those candidates is selected, first.

As an example, and again with reference to FIGS. 13 and 15, the selectable list of transforms may comprise transforms of differing number of transform coefficients 134. The encoder 10 and decoder 20 may be configured to encode/decode said different number of transform coefficients 134, wherein the step of encoding/decoding the transform coefficients 134 comprises encoding an indication (e.g. a significance flag) of a significant transform coefficient position 132 of the selected transform 102 and values of transform coefficients 134 of the selected transform which are traversed from the significant transform coefficient position onwards by a predetermined scan order 136 which sequentially traverses coefficient positions of the selected transform. The encoder 10 and decoder 20 of this example may be configured to encode/decode the transform coefficients 134 in a manner so that a code rate spent in the data stream 14 for the encoding the indication is the lower the lower the number of transform coefficients 134 of the selected transform is.

As a further example, the encoder 10 and decoder 20 may be configured to selectively encode/decode the transform coefficients 134 depending on whether transforms with or without dimension reduction may be used, i.e. whether the selectable list of transforms comprises transforms of a first number of transform coefficients 134 (e.g. a transform with dimension reduction) and transforms of a second number of transform coefficients 134 larger than the first number:

In case of the number of transform coefficients 134 of the selected transform being the second number, the encoder 10 and decoder 20 may be configured to encode/decode an indication of a significant transform coefficient position 132 of the selected transform and values of transform coefficients 134 of the selected transform which are traversed from the significant transform coefficient position 132 onwards by a predetermined scan order 136 which sequentially traverses coefficient positions of the selected transform.

In case of the number of transform coefficients 134 of the selected transform being the first number, the encoder 10 and decoder 20 may be configured to encode/decode values of all of the first number of transform coefficients 134 of the selected transform.

Another example where the knowledge of the selected transform can be used for coding the coefficients more efficiently is the case where more than one transform candidates are defined by a primary+secondary transform, whereas the sub-groups of positions to which the secondary transforms are applied, differ. In such cases it can be beneficial to code the selected transform, or at least the used partitioning, first. With this knowledge, a dedicated set of context models can be used for coding those coefficients at positions which undergo the primary transform only, and those that are transformed by the secondary transform.

This knowledge can also be used for coding the last significant position as following: First a flag is decoded which indicates whether the last significant position lies within the positions which are input to the secondary transform, then the exact position is coded as difference to either the last possibly significant position as defined by the transform, or to the position of the first coefficient of the particular sub-group.

In more general terms, and still with reference to FIGS. 13 and 15, the selectable list of transforms 134 may comprise at least one multi-stage transform, each involving a primary transform applied onto the current residual block and a secondary transform applied onto a sub-group 138 of primary transform coefficients 134 of the primary transform coefficients 134, wherein the sub-group 138 differs for different ones of the at least one multi-stage transforms.

According to a first alternative, the encoder 10 and decoder 20 may be configured to encode/decode the transform coefficients 134 by encoding/decoding an indication of a significant transform coefficient position 132 of the selected transform and values of transform coefficients 134 of the selected transform which are traversed from the significant transform coefficient position 132 onwards by a predetermined scan order 136 which sequentially traverses coefficient positions of the selected transform. Said indication may depend on whether the selected transform is a multi-stage transform or not. If the selected transform is a multi-stage transform, the indication comprises a flag whether the significant transform coefficient position 132 is within the sub-group 138 of transform coefficients 134, and if the transform coefficient position 132 is within the sub-group 138 of transform coefficients 134, the indication indicates the significant transform coefficient position 132 relative to a position traversed last among all transform coefficients 134 of the selected transform in the predetermined scan order 136 and if the transform coefficient position 132 is not within the sub-group 138 of transform coefficients 134, relative to a position traversed last among all transform coefficients 134 not within the sub-group 138 in the predetermined scan order 136, wherein the predetermined scan order 136 traverses all transform coefficients 134 within the sub-group 138 after having traversed all transform coefficients 134 not within the sub-group 138.

According to a second alternative, the encoder 10 and decoder 20 may be configured to encode/decode the transform coefficients 134 by encoding, if the selected transform is of the multi-stage type, a value of transform coefficients 134 of the selected transform using entropy coding using a probability estimation which depend on whether the transform coefficient 134 is within the sub-group 138 of transform coefficients 134 of the selected transform.

According to a third alternative, the encoder 10 and decoder 20 may be configured to encode/decode the transform coefficients 134 by encoding, if the selected transform is of the mufti-stage type, a value of transform coefficients 134 of the selected transform using entropy coding using a probability estimation which depends on one or more neighboring transform coefficients 134 in a manner dependent on whether the transform coefficient 134 is within the sub-group 138 of transform coefficients 134 of the selected transform.

Let's assume that the index into the transform candidate list is coded such that the signaling costs of candidates depends on their position in the list, with increasing costs per position. This could be done by coding the transform index with a truncated unary code.

Additionally, the transform candidate list is constructed in the way that the candidates are sorted by their specialization. For example the first transform is the most universal separable transform [DCT-II,DCT-II] followed by [DST-VII, DST-VII] and then by a transform especially trained for the specific intra mode of the current residual block. The list is filled up by additional transforms, where each is specialized for a particular property of the residual signal that may occur with that intra mode. This specialization can be trained by including a clustering method, such as fitting a Gaussian-Mixture-Model, to the data examples and train a separate transform for each obtained cluster. Under this assumption of a sorted candidate list, knowing the selected transform gives an insight into the characteristics of the actual residual signal and hence the expected coefficients distribution. Especially, for small transform indices a low signal energy is expected as the coding cost of a higher the transform index could not be justified by coding gain by using a more specialized transform.

This can be exploited by deriving the context models for coding the coefficients depending on the transform index itself. When using a Golomb-Rice code for coding the coefficients levels, the actual rice parameters can be also derived from the selected transform index.

According to an example, the encoder 10 may be configured to signal the selected transform using an index, and to encode the transform coefficients 134 by encoding a value of a transform coefficient 134 of the selected transform using binarization and binary entropy coding, wherein a probability estimation used in binary entropy coding depends on the index, and/or wherein the binarization depends on the index.

The respective decoder 20 may be configured to derive the selected transform using an index, decode the transform coefficients 134 by decoding a value of a transform coefficient 134 of the selected transform using binarization and binary entropy decoding, wherein a probability estimation used in binary entropy coding depends on the index, and/or wherein the binarization depends on the index.

The index may be a variable length coding (VLC) index.

A more complex example of exploiting information from the selected transform for the coefficient coding, assumes that there are remaining dependencies of transform coefficients which can be modelled by the correlation of their variances. Taking two coefficients and assume their mean to be zero, the correlation of variances simply assumes that knowing that one of the coefficients is large, the probability model of the other is chosen to have a high variance, and hence the probability of the second coefficient to be significant as well increases. This assumed variance correlation model can be included in the process of training transforms such that given a transform, a specific correlation model is assumed at the decoder. The actual correlation model can also be dependent on the actual coefficient position or sub-group of a mufti-stage transform. One specific model defines which coefficients are assumed to have a variance correlation and how strong this correlation is. This can be used to adapt the context model selection for a specific coefficient position on already decoded coefficients. More precisely, when decoding a coefficient at a specific position, it is checked which correlation model has been defined for that position by the selected transform. If already decoded coefficients are among the energy correlated positions given by that model, the levels of those coefficients are comparted to the given thresholds, also defined by the model, and a specific set of context models is derived for decoding the significance flag and the level of the current coefficient.

The above mentioned correlation may be derived from neighboring transform coefficients. As an example, the encoder 10 and decoder 20 may be configured to encode/decode the transform coefficients 134 by encoding a value of a transform coefficient 134 of the selected transform using entropy coding, wherein the entropy coding depends on one or more neighboring transform coefficients 134 in a manner dependent on the selected transform.

As a further example, the encoder 10 and decoder 20 may be configured to encode/decode the transform coefficients 134 by encoding/decoding a value of a transform coefficient 134 of the selected transform using entropy coding by selecting a local template of one or neighboring transform coefficients 134 in a manner dependent the transform coefficient's position in the selected transform, further by determining, using a mapping of a domain of possible values of the one or neighboring transform coefficients 134 to a set of one or more contexts for the transform coefficient 134, a selected context for the transform coefficient 134, and by using a probability estimation associated with the selected context for entropy coding the value of the transform coefficient 134, wherein at least one of the selection of the local template and the mapping is dependent on the selected transform.

As one concrete example assume that it is already known at the decoder that a primary+secondary transform is used and which positions undergo the secondary transform. Also, two different variance correlation models are assumed, one for the primary only transform coefficients and one for the remaining coefficient positions. For both models 4 sets of context models and 3 thresholds are given. When decoding a coefficient, it is checked first, which of both context model groups apply for the current position. Then, the average of the last 4 already decoded coefficient levels is taken and compared to the thresholds. The results uniquely define a set of context models used for decoding the current coefficient.

As can be seen by the provided examples different information about the selected transform can be beneficial for specific parts of the decoding process of the coefficients. This motivates to split the information needed for identifying the selected transform among the candidates into specific transform properties and to signal them separately interleaved with the coefficient coding. In doing so, already decoded information about the transform can be used to decode information about the coefficients, whereas the newly obtained information about the coefficients can be used to reduce the transform candidate list and consequently, less information needs to be signaled for identifying the selected candidate.

Which transform properties should be coded in which order also depends on the available candidates in the list and the already obtained information about the residual signal, and could be chosen adaptively. For example, only if a transform with dimension reduction is among the candidates the transform index is coded beforehand. Also, as soon as at least one coordinate of the last position has been decoded, the further decoding of the selected transform can be conditioned on that coordinate. Already the knowledge of one coordinate gives some evidence on the maximal energy to be expected in the residual signal, and given for example by counting the maximal number of possibly significant positions. Only if this expected value is above a threshold, the transform index is decoded next, and the decoding of the second coordinate can be conditioned on the structure of the selected transform.

According to this example, the encoder 10 and decoder 20 may be configured to perform the signaling the selected transform in the data stream 14 in a manner so that a relative positioning of a signaling of the selected transform with respect to the transform coefficient data, and/or a decomposition of the signaling into syntax elements, depends on the selectable list of transforms.

Otherwise, the decoding of the transform is postponed or can be even skipped, as soon as the actual number of significant positions is known and violates the constraint of minimum coefficients.

In either case, whether a transform index is signaled at the beginning, interleaved, or at the end of a transform block, a splitting of the information about the selected transform into its properties and signaling them separately can be beneficial when dependency of these properties exists between neighboring transform blocks. Then, this dependency can be exploited by using a dedicated set of context model for each transform property. In doing so, the selected context models can also be dependent on the selected transforms of already decoded neighboring residual blocks.

According to this aspect, and with reference to FIGS. 13 and 14, an encoder 10 and a decoder 20 are provided for encoding/decoding a picture 12 into/from a data stream 14 using block-based prediction and block-based residual coding, the encoder 10 and decoder 20 supporting a set 94 of transforms for the block-based residual coding. The encoder 10 and decoder 20 may be configured to determine 122 a selectable list 98 of transforms for a current residual block 84 out of the set of transforms 94 and to encode/decode a prediction residual within the residual block using one selected transform out of the selectable list of transforms. The encoder 10 may be configured to signal 128 the selected transform in the data stream 14 using a transform indicator 124, and the decoder 20 may be configured to derive the selected transform from the data stream 14 by using said transform indicator 124.

Said transform indicator 124 may be signaled in the data stream 14 using a code with one or more digits, wherein each of a set of the one or more digits is uniquely associated with a respective transform property. The code may comprise bins of the transform indicator 124 subject to binary arithmetic coding or syntax elements which the transform indicator 124 is composed of and which may be parsed from the data stream 14.

Generally, knowing only the indices of already selected transform candidates of neighboring blocks do not give much insights about the selected transform of the current block. One exception is that the candidates are ordered such, that a high index indicates a high specialization or a high residual energy. Also, if the actual selected neighboring transforms are highly specialized to their prediction mode, a comparison to the current candidates is only meaningful if they share the same mode. On the other hand, knowing for example that mainly transforms from the DCT/DST family have been selected in the neighborhood, this information can be exploited by signaling first whether the current transform is from the same family and reducing the candidate list accordingly.

According to an example, each transform property may be one of whether the selected transform is a multi-stage transform, or whether the selected transform is a transform having less transform coefficients than a predetermined number of transform coefficients.

Another advantage of splitting the coding of the selected candidate and explicitly reducing the candidate list step by step by signaling transform properties, is the possibly simplification of exploiting the dependencies among the different candidates in the list. For example, the binarization and context model deviation of the transform index can be depending on the transform candidates in the list as following. Assume one of the candidates (advantageously the first) is associated with the highest probability, then a flag is coded first, indicating whether this transform is used, otherwise it is removed from the list. If the remaining transform candidates are of different transform classes, the transform class can be decoded first. This allows a transform class depending context model deviation for the remaining transform index signaling.

Assuming the (the remaining) candidates in the list are ordered with respect to their expected probability, with the most probable candidate being the first in list. Then a context modelled truncated unary code can be used to binarize the transform index.

According to an example, the encoder 10 and decoder 20 may be configured to encode/decode at least one of the set of at least one digit using entropy coding using a probability estimation which depends on a transform indicator 124 of a neighboring residual block.

4.11 Exemplary Embodiments

In the following, some concrete but non-limiting examples are given in order to concretize the above generalized description by one or more exemplary embodiments.

Coding Order:

When it is known that a residual signal is coded for a block, this is the case, when a Coding Block Flag (CBF) has been decoded and it is equal to one, the Index Into the candidate list may be decoded first followed by the decoding of the actual transform coefficients.

When it is known that a residual signal is coded for a block, this is the case, when a Coding Block Flag (CBF) has been decoded and it is equal to one, all coefficients of that block may be decoded first. If the candidate list has more than one transform, after all candidates have been removed that violate with the decoded coefficients, an index into the candidate list may be coded.

When it is known that a residual signal is coded for a block, this is the case, when a Coding Block Flag (CBF) has been decoded and it is equal to one, and the candidate list contains transforms with differing primary transform classes (such as non-separable transform and transform from the DCT/DST family), the primary transform class may be decoded first and the candidate list may be reduced accordingly. The decoding of all transform coefficients of that block may be done afterwards. If the candidate list has more than one transform, after all candidates have been removed that violate with the decoded coefficients, an index into the candidate list may be decoded.

When it is known that a residual signal is coded for a block, this is the case, when a Coding Block Flag (CBF) has been decoded and it is equal to one, and the candidate list contains primary only and primary+secondary transforms, it may be signaled first whether a secondary transform is applied. The decoding of all transform coefficients of that block may be done afterwards. If the candidate list has more than one transform, after all candidates have been removed that violate with the decoded coefficients, an index into the candidate list may be decoded.

When it is known that a residual signal is coded for a block, this is the case, when a Coding Block Flag (CBF) has been decoded and it is equal to one, and the candidate list contains at least one transform with dimension reduction, it may be decoded first whether a transform with dimension reduction is used. If this is the case and more than one candidate have the dimension-reduction property with differing positions that are set to zero, an index may be signaled next, in order to uniquely define which positions are set to zero. The decoding of all transform coefficients of that block may be done afterwards. If the candidate list has more than one transform, after all candidates have been removed that violate with the decoded coefficients, an index into the candidate list may be decoded.

When it is known that a residual signal is coded for a block, this is the case, when a Coding Block Flag (CBF) has been decoded and it is equal to one, the position of the last significant coefficient may be decoded first. If a transform with dimension reduction is among the candidates it is removed if it conflicts with the last significant positions. Depending on the quantization parameter (QP) also transforms with secondary transforms, where the number of possibly further transformed coefficients given by the last significance position, is less than a threshold, are either removed or put further back in the candidate list. If more than one transform candidate is left, an index into the list is decoded. The coefficients are decoded afterwards.

When it is known that a residual signal is coded for a block, this is the case, when a Coding Block Flag (CBF) has been decoded and it is equal to one, the positions of all significant coefficients may be decoded first. If a transform with dimension reduction is among the candidates it may be removed if it conflicts with the significant positions. Depending on the quantization parameter (QP) also transforms with secondary transforms, where the number of possibly further transformed coefficients given by the last significance position, is less than a threshold, may either be removed or put further back in the candidate list. If more than one transform candidate is left, an index into the list may be decoded. The remaining coefficient levels and signs may be decoded afterwards.

When it is known that a residual signal is coded for a block, this is the case, when a Coding Block Flag (CBF) has been decoded and it is equal to one, and the candidate list contains transforms of different classes, such that each class give evidence to expect the last significant position to lie in different regions, this transform class may be decoded first, followed by the last significant position. If applicable, a transform index may be signaled next, followed by the coefficients. For example, especially for high QPs, transforms with secondary transforms give evidence to expect the last positions to lie within the region of coefficients that are further transformed by the secondary transform.

Signaling of Transform Index:

The transform index may be coded using a truncated unary code, where each bin may use a dedicated context model. A different context model set may be used depending on the number of remaining transform candidates.

The transform index may be coded using a truncated unary code, where each bin may use a dedicated context model. The context model selection for each bin may depend on the transform decision of neighboring residual blocks. Depending on the number of remaining transform candidates, a set of context models consisting of k context models for each bin of the truncated unary code may be selected. The transform indices of the neighboring blocks may be summed up, and the sum may be compared to k−1 thresholds, which define the actual context models to use.

The transform index may be coded by coding a flag first, which may indicate if the first candidate is chosen. The context model selection for this flag may depend on the transform decision of neighboring residual blocks. Depending on the number of remaining transform candidates a set of context models consisting of k context models may be selected. The transform indices of the neighboring blocks may be summed up, and the sum may be compared to k−1 thresholds, which define the actual context models to use. The remaining part of the index may be coded by a fix length code.

The transform index is coded by first coding a flag, indicating whether the first candidate is chosen. A fixed length code may be used for the remaining part otherwise. The flag may be coded using a dedicated context model, selected by the size of the residual block.

Given that the partitioning into blocks comprises a division into coding units (CUs), which can be further divided into transform blocks (TUs), and at least one residual may be coded such that its coding block flag is 1, one extra flag may be coded at CU level. If this flag is zero, all residual blocks may take the first candidate in their lists. Otherwise, the first candidate of each list may be put at the end of the list and the transform index for each residual block may be coded.

The number of transform candidates may be 5. A flag may be coded first, indicating whether the first candidate is chosen. Otherwise, a second flag may be coded, indicating, that either the second or third candidate is chosen. The final decision may be coded by a third flag. All flags may be coded using a dedicated context model.

The transform Index may be coded by first coding a flag, indicating whether the first candidate is chosen. If the remaining transform candidates are associated to different transform classes, a truncated unary code may be used to code the transform class. Here, primary only transforms may form one class, and primary+secondary transforms may form the second class. Finally, if applicable, a truncated unary code may be used to code the remaining index by utilizing a dedicated context model set depending on the transform class.

The transform Index is coded by first coding a flag, indicating whether the first candidate is chosen. If the remaining transform candidates are associated to different transform classes, a truncated unary code may be used to code the transform class. Here, primary only transforms may form one class, and primary+secondary transforms may form the second class. The context model may be chosen by counting the occurrence of transform classes of already decoded neighboring transforms. If the first class occurred more often a first context model may be used, if the second class occurred more often, a second context model may be used, if the number of each class is equal a third context model may be used. Finally, if applicable, a truncated unary code may be used to code the remaining index by utilizing a dedicated context model set depending on the already decoded transform class.

The transform Index is coded by first coding a flag, indicating whether the first candidate is chosen. If the remaining transform candidates are associated to different transform classes, a truncated unary code may be used to code the transform class. Here, transforms from the DCT/DST family form a first class, non-separable primary only transforms form a second class and primary+secondary transforms form a third class. Finally, if applicable, a truncated unary code may be used to code the remaining index by utilizing a dedicated context model set depending on the transform class.

Given that one coordinate of the last significant position has already been decoded, and that coordinate is at least 2, the transform index may be decoded next, otherwise the decoding of the transform index (if applicable) may be postponed to the last step, when the coefficients are already known and the candidate list has already been reduced. If the transform is already known when decoding the second coordinate of the last position and it is a primary+secondary transform, the context model selection for the truncated unary code part may be such that the bins associated to positions that fall in the region of the secondary transform may use a different context model set than the others.

Context Model Deviation for Coefficients Coding:

(c.f. FIGS. 13,14 15)

It is assumed that the transform index into the list of candidates is directly related to the expected energy of the residual signal, hence it is used for the context model selection for coding the last significant position. Each transform index value defines its own dedicated set of context models.

It is assumed that the transform index into the list of candidates is directly related to the expected energy of the residual signal, hence it is used for the context model selection for coding the last significant position. The transform indices 0 and 1 have their own dedicated set of context models, while the remaining indices share one set of context models.

Given that the transform class is already known, the coefficient coding utilizes a dedicated context model set for each transform class. Possible transform classes with dedicated context models sets are the transforms from the DCT/DST family and non-separable transforms.

Given that a partitioning of coefficient positions is defined by the transform, and that portioning is already known, the coefficient coding utilizes a dedicated set of context models for each sub-group. One possible partitioning is given by the coefficients that are further transformed by a secondary transform. Another partitioning is given by the number of following transform stages.

Each defined transform is associated to one set of context model and known by the decoder.

Given that the transform is already uniquely identified, a mapping from transform to context model set is used for deriving the set of context models used for the coefficient decoding.

Given that the coefficient coding comprises a context model selection based on already decoded coefficients, such that, the (already known) coefficient levels are weighted depending on their relative position and accumulated. The actual used context model set is selected by comparing the sum against a predefined threshold. The weights and the thresholds used are given by the selected transform.

Special Coding Mode

It may be coded first whether the first candidate in the list is used, if not, it may be checked if at least one of the remaining transform candidates is a transform with dimension reduction. In this case, it may be coded whether the selected transform is one of those transforms. If this is the case and all other candidates have been removed from the list, it may be checked whether the remaining transforms differ in their positions that are explicitly set to zero. If applicable, an index may be signaled which uniquely identifies which dimension reduction has been chosen. Hence, even if still more than one candidate is left, it is exactly known which coefficient positions remain to be possibly significant. If applicable, the index for the selected transform may be decoded after the coefficients have been decoded.

Given that a transform with dimension reduction is used and the positions that are explicitly set to be zero are already known, the signaling of the last significant coefficient position may be skipped. Given a scan order of coefficients, the last position may be set to that position that is possibly significant and last in scan order. In this case a significance flag should be signaled also for the last position.

Given that a transform with dimension reduction is used and the positions that are explicitly set to be zero by the transform are already known, all remaining coefficient group significant flags may be set to one, and hence don't need to be coded.

Given that a transform with dimension reduction is used and knowing the positions that are set to be zero, a dedicated set of context models may be used for decoding the remaining coefficients.

Given that a transform with dimension reduction is used and knowing the positions that are set to be zero, a dedicated set of context models may be used for decoding the last coefficient position in the block.

Given that a transform with dimension reduction is used, a dedicated deviation of the rice parameter for coding the coefficient levels may be used.

Given that a transform with dimension reduction is used, a dedicated template for context selection based on neighboring coefficients may be used.

All embodiments can be conditioned on the prediction mode and QP.

5. Primary Transforms Set to Zero

In section 4.1 a general description was given, wherein in the following some examples are given in which one or more primary only coefficients are zeroed, i.e. are set to zero (see section 5.1 below). Further examples are given in which one or more coefficients at certain positions are zeroed, i.e. are set to zero (see section 5.2 below). Coefficients which may have the potential to be subjected to zeroing may also be referred to as 'candidates' for zeroing.

Generally, with reference to FIG. 12, this aspect of the invention provides an encoder 10 and a decoder 20 for encoding/decoding a picture 12 into/from a data stream 14 using block-based prediction and block-based residual coding, the encoder 10 and the decoder 20 supporting a set 94 of transforms for the block-based residual coding. The encoder 10 and decoder 20 may be configured to determine 122 a transform candidate list 98 of transforms for a current residual block 84 out of the set 94 of transforms based on a size 96, e.g. a height and a width, of the current residual block 84. The encoder 10 may be configured to encode a prediction residual 100 within the residual block 84 using one selected transform 102 out of the selectable list 98 of transforms and selectively signal the selected transform 102 in the data stream 14. The decoder 20, in turn, decode a prediction residual 100 within the residual block 84 in a domain of one selected transform 102 out of the selectable list 98 of transforms with selectively deriving the selected transform 102 from the data stream 14.

5.1 Zeroing of Primary-Only Coefficients

Having a multi stage transform comprising a primary and a secondary transform, set primary only transform coefficients (i.e. the coefficients which are not further transformed) to zero.
 a. Secondary transform is full-size transform
 b. Secondary transform is a transform with dimension reduction (the number of possible significant coefficients is further reduced)

For example, having a transform candidate comprising a primary (separable) transform (e.g. [DCT-II, DCT-II] . . . ) for a residual block with width and height>=8, this transform combined with a secondary transform of input size (8×8) may also be a candidate. Applying the secondary transform implies that all coefficients that are not further transformed by the secondary transform are forced to be zero.

For example, having a transform candidate comprising a primary (separable) transform (e.g. [DCT-II,DCT-II] . . . ) for a residual block with either width or height (but not both) equal to 4, this transform combined with a secondary transform of input size (4×4) may also be a candidate. Applying the secondary transform implies that all coefficients that are not further transformed by the secondary transform are forced to be zero.

For example, having a transform candidate comprising a primary (separable) transform (e.g. [DCT-II,DCT-II] . . . ) for a residual block with width and height>=8, this transform combined with a secondary transform with input dimension 48 and output dimension 16, which is applied to the 3 left/top most coefficient sub-groups of size (4×4), may also be a candidate. Applying the secondary transform implies that all coefficients that are not further transformed by the secondary transform are set to zero, hence as additionally the secondary transform is a transform with dimension reduction to 16 coefficients, the last significant coefficient position is (3,3).

5.2 Zeroing of Coefficients at Crain Positions

Having a multi stage transform comprising a primary and a secondary transform, set coefficients with positions X>Tx or Y>Ty to zero (e.g Tx=Ty=8).
 a. Secondary transform is full-size transform
 b. Secondary transform is a transform with dimension reduction (the number of possible significant coefficients is further reduced)

Figure 17:
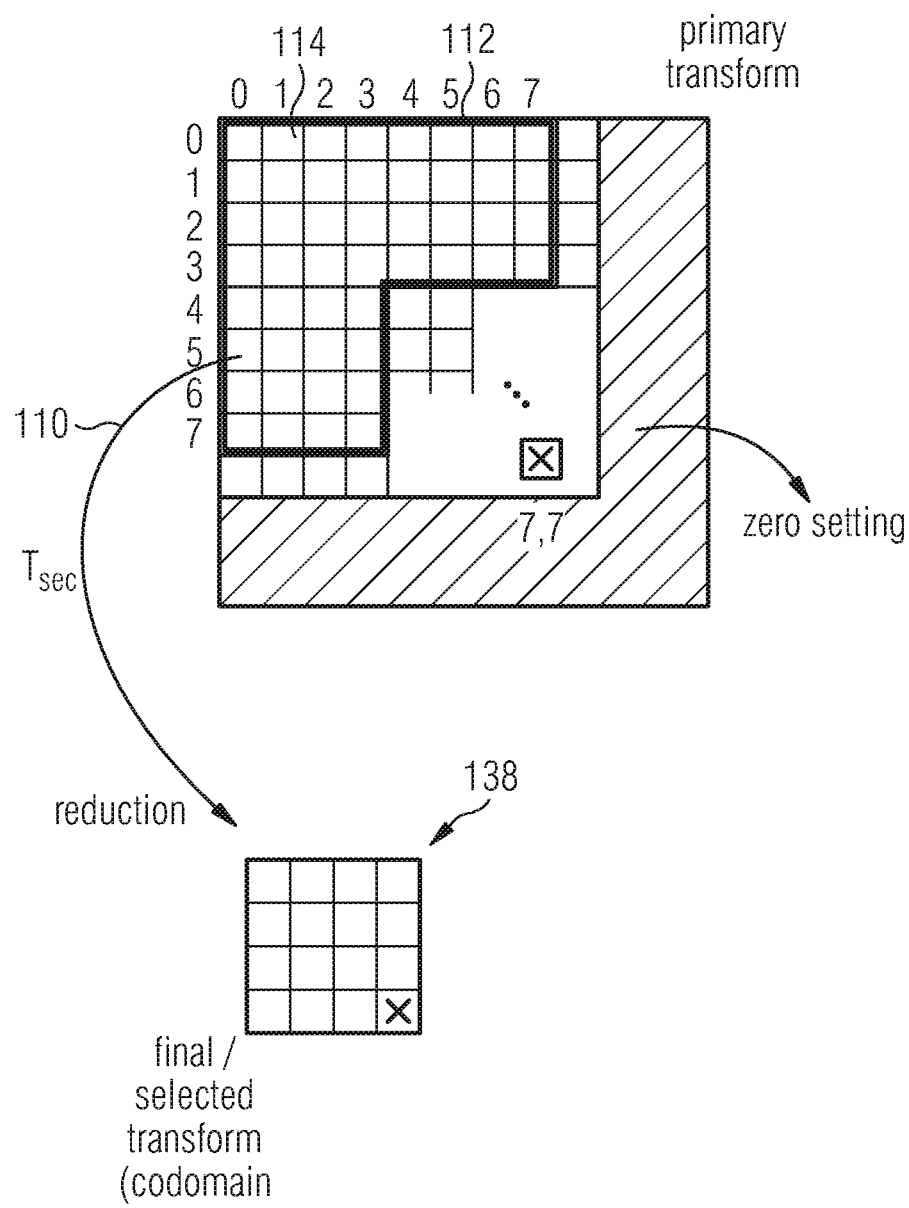
FIG. 17 shows a schematic residual block comprising a plurality of primary coefficients, wherein some of them are set to zero prior to subjecting the remaining non-zero valued primary coefficients to a secondary transformation according to an embodiment of the present invention.

FIG. 17 shows an example of a residual block with a size, e.g. width and height>8 that has been subjected to a primary transform. Thus a subgroup 112 with a plurality of primary coefficients 114 may be present. In this example, the subgroups 112 may comprise a size of 4×4 primary coefficients 114. Shown here are the three left/top most coefficient sub-groups of size 4×4. Accordingly, those three subgroups 112 together comprise 48 primary coefficients 114. They may be subjected to a secondary transform 110 of dimension 48×16, i.e. the coefficients are reduced from 48 to 16, wherein some primary coefficients may be candidates for zeroing.

For example, having transform candidate comprising a primary (separable) transform (e.g. [DCT-II,DCT-II] . . . ) for a residual block with width and height>=8, this transform combined with a secondary transform of dimension (48×16), which is applied to the 3 left/top most coefficient sub-groups 112 of size (4×4), is also candidate. Applying the secondary transform implies that the last significant coefficient position can be at maximum (7,7), hence the remaining primary only coefficients (hatched lines) are set to zero.

For example, having transform candidate comprising a primary (separable) transform (e.g. [DCT-II,DCT-II] . . . ) for a residual block with width and height>=8, this transform combined with a secondary transform of dimension (48×16), which is applied to the 3 left/top most coefficient sub-groups of size (4×4), is also candidate. Applying the secondary transform implies that the last significant coefficient position can be at maximum (3,3), hence the remaining primary only coefficients are set to zero Signaling for 1+2
a) Signal selected primary transform and coefficients first. If coefficients are significant (not zero) at positions that would validate the constraints given by the transform candidate with secondary transform, it is clear that the secondary transform was not used, hence can be removed from the candidate list and no extra signaling is used)
b) Signal selected primary transform first, if a corresponding primary+secondary transform is among candidates, signal if secondary transform was applied. Set maximum allowed last position accordingly and signal last position, followed by remaining coefficient information, potentially by using a dedicated set of context models if the secondary transform was applied.
New compared to state-of-the-art:
c) Signalling secondary transform flag/index, before/interleaved with last position
d) Secondary transform constraint by last position instead of number of minimum significant position. (explicit astPosX+astPosY>=T, e.g. 1 or 2)
e) Context modelling of coefficient sig flags depending on secondary transform flag Accordingly, the encoder 10 and decoder 20 may be configured to determine the transform candidate list so that the transforms of the transform candidate list coincide in codomain, i.e. the number and arrangement of transform coefficients is the same.

The transforms of the transform candidate list may comprise a first transform and a second transform which coincide in codomain, i.e. the number and arrangement of transform coefficients is the same. The second transform may correspond to a secondary transform being applied onto a sub-group 112 of primary transform coefficients 114 of the first transform 108 with further primary transform coefficients 114 of the first transform 108 outside the sub group 112 of primary transform coefficients of the first transform 108 being set to zero.

In this case, the encoder 10 may be configured to test coding the current residual block with respect to the second transform by setting to zero further primary transform coefficients 114 of the first transform 108 outside the sub group 112 of primary transform coefficients of the first transform 108.

Additionally or alternatively, the encoder 10 and decoder 20 may be configured to decide whether to populate the transform candidate list with, or exclude from the transform candidate list, at least one multi-stage transform 106 involving a primary transform applied onto the prediction residual 100 of the current residual block and a secondary transform applied onto a sub-group 112 of primary transform coefficients 114 of the primary transform 108 to result into the sub group 138 of the transform coefficients of the selected transform 102, or where in the transform candidate list the at least one multi-stage transform 106 is to be placed, depending on where according to the transform coefficient data 126 significant transform coefficients are positioned.

Additionally or alternatively, the encoder 10 and decoder 20 may be configured to decide whether to populate the transform candidate list with, or exclude from the transform candidate list, at least one multi-stage transform 106 involving a primary transform applied onto the prediction residual 100 of the current residual block and a secondary transform applied onto a sub-group 112 of primary transform coefficients 114 of the primary transform 108 to result into the sub group 138 of the transform coefficients of the selected transform 102, or where in the transform candidate list the at least one multi-stage transform 106 is to be placed, depending on whether according to the transform coefficient data 126 any transform coefficient outside the sub group 138 of the transform coefficients is significant.

Additionally or alternatively, the encoder 10 and decoder 20 may be configured to encode/decode the transform coefficients by encoding/decoding a value of a transform coefficient of the selected transform using binarization and binary entropy coding, wherein a probability estimation used in binary entropy coding depends on the selected transform, and/or wherein the binarization depends on the selected transform.

Said dependency on the selected transform may be a dependency on whether the selected transform is a multi-stage transform or not.

Still further additionally or alternatively, the encoder 10 and decoder 20 may be configured to decide whether to populate the transform candidate list 98 with, or to exclude from the transform candidate list 98, at least one multi-stage transform 106 involving a primary transform applied onto the prediction residual 100 of the current residual block 84 and a secondary transform applied onto a sub-group 112 of primary transform coefficients 114 of the primary transform 106 to result into the sub group 138 of the transform coefficients of the selected transform 102, or where in the transform candidate list 98 the at least one multi-stage transform 106 is to be placed depending on whether according to the transform coefficient data 126 any transform coefficient inside the sub-group 112 but outside the sub group 138 of the transform coefficients is significant.

Still further additionally or alternatively, the encoder 10 and decoder 20 may be configured to decide whether to populate the transform candidate list 98 with, or to exclude from the transform candidate list 98, at least one multi-stage transform 106 involving a primary transform applied onto the prediction residual 100 of the current residual block 84 and a secondary transform applied onto a sub-group 112 of primary transform coefficients 114 of the primary transform 106 to result into transform coefficients of the multi-stage transform 106 being lower in number than residual samples within the prediction residual 100 of the current residual block 84, and corresponding in transform coefficient position to a subset 138 of transform coefficients of a further transform in the transform candidate list 98 equaling the primary transform, wherein the primary transform coefficients 114 of the primary transform 106 either equals the samples 105 within the prediction residual 100 of the current residual block 84, or wherein the primary transform coefficients 114 of the primary transform 106 are greater in number than the transform coefficients of the multi-stage transform 106. Additionally or alternatively, the encoder 10 and decoder 20 may be configured to decide where in the transform candidate list 98 the at least one multi-stage transform 106 is to be placed relative to the further transform, wherein the decision depends on:
  a) where according to the transform coefficient data 126 significant transform coefficients are positioned, or
  b) whether according to the transform coefficient data 126 significant transform coefficients are positioned outside the subset 138 of transform coefficients, or
  c) whether according to the transform coefficient data 126 significant transform coefficients are positioned outside the sub-group 112 of primary transform coefficients 114.

Figure 8:
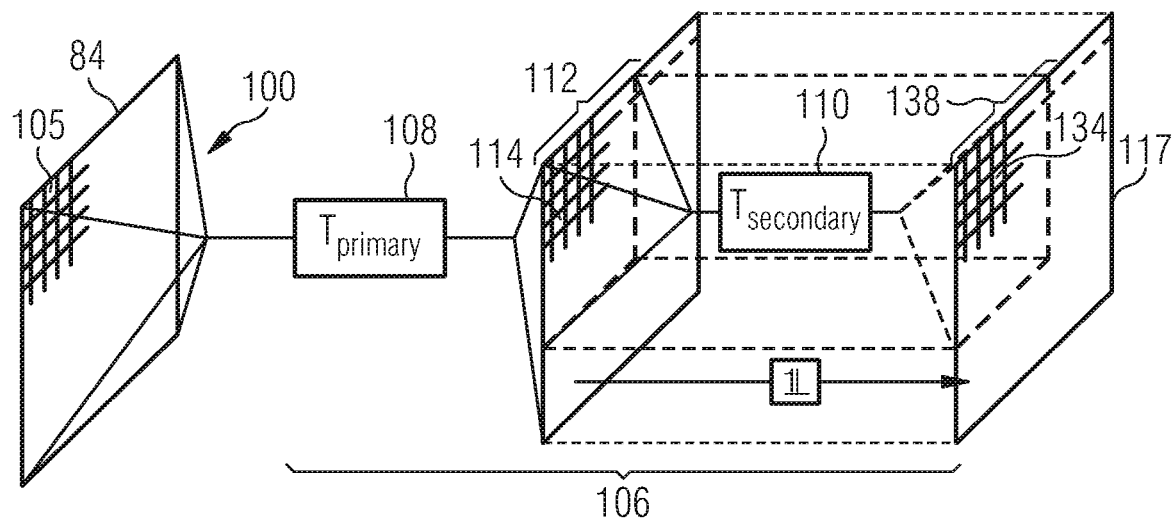
FIG. 8 shows a concept of a multi-stage transform comprising a primary transform and a secondary transform according to an embodiment of the present invention.

Some examples shall be explained with reference to FIGS. 8,18 and 19.

For example, as described above, the signaling may depend on the significant transform coefficient positions 132. FIGS. 18 and 19 exemplarily show transform coefficients 114, 134 and subgroups 112,138 of transform coefficients 114, 134 from a decoder perspective.

Figure 18:
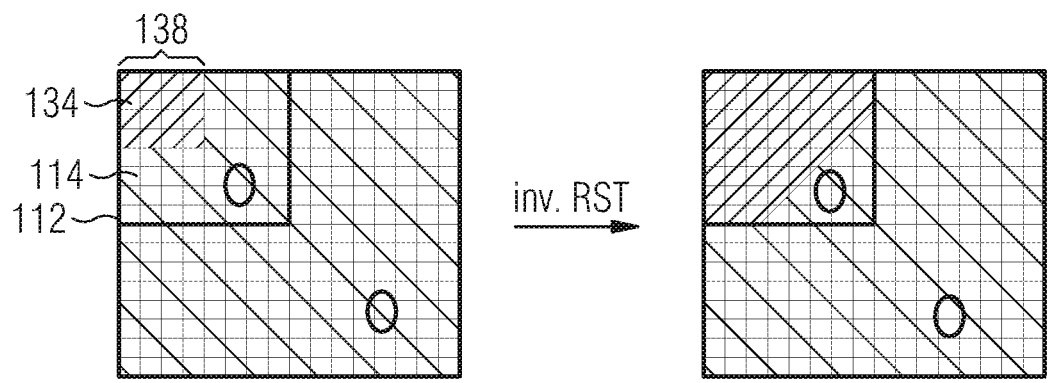
FIG. 18 shows, from a decoder perspective, a schematic block diagram of a transform block in which some transform coefficients may be zeroed according to an embodiment.

FIG. 18 shows one non-limiting example of a mufti-stage transform with zeroing, wherein a primary transform may lead to a primary subgroup 112 of primary transform coefficients 114 that may be subjected to a secondary transform that may lead to a secondary sub-group 138 of secondary transform coefficients 134. Some primary transform coefficients 114 and/or some secondary transform coefficients 134 may be zeroed, e.g. based on the significant transform coefficient positions 132.

For example, as depicted in FIG. 18, transform coefficients 134 outside the secondary subgroup 138, and hence transform coefficients 114 outside the primary subgroup 138, can be zero if a secondary transform may have been applied.

Figure 19:
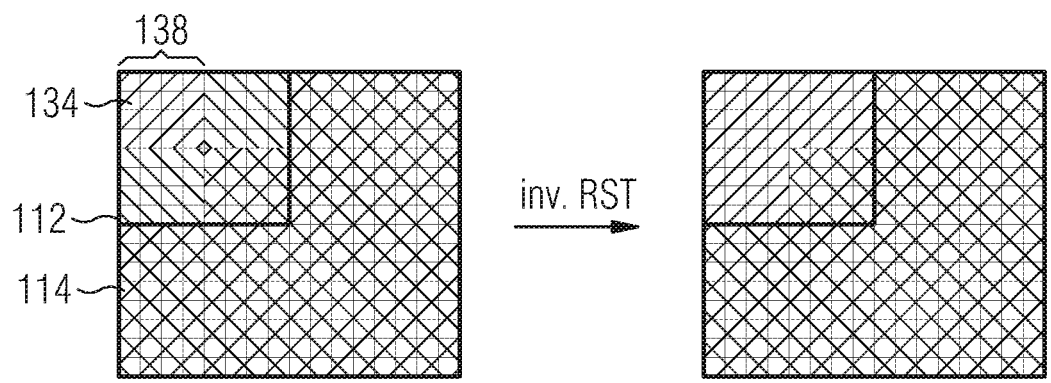
FIG. 19 shows, from a decoder perspective, a schematic block diagram of a transform block in which some transform coefficients may be zeroed according to a further embodiment.

FIG. 19 shows a further example in which secondary transform coefficients 134 may be zeroed, also viewed from a decoder perspective. The outlined 8×8 area represents the primary subgroup 112 of primary transform coefficients 114, as explained above. The transform coefficients inside the area marked in cross-hatched lines (green in the originally filed application) may represent primary-only transform coefficients. Transform coefficients inside the area marked with hatched lines from left top to bottom right (blue in the originally filed application) may represent transform coefficient positions that would have to be zero in case a secondary transform was applied. This means, in turn, if there are significant (non-zero valued) coefficients in the (blue) left-top-to-bottom-right-hatched area, the decoder 20 knows that it does not need to perform a secondary transform since otherwise these positions would have to be zero due to the secondary transform. Thus, there is no need to signal an index.

Regarding the signaling, some examples as mentioned above allow that it may be derived from the significant coefficient positions 132 whether signaling (e.g. of an index) is used or may be omitted. However, some examples may provide the possibility that the signaling may not be dependent from the significant coefficient positions 132 but the index may always be signaled. In the latter case, the primary transform coefficients 114 outside the primary subgroup 112 would have to be zero if a secondary transform was applied to the primary subgroup 112 (e.g. FIG. 19).

Accordingly, the decoder 20 may be configured to apply a multi-stage transform having a primary and a secondary transform, wherein primary transforms could be implemented with zeroing up to a dimension of the primary subgroup 112 only. That is, both the horizontal and the vertical primary transform may be implemented with zeroing, e.g. for an 8×8 (primary subgroup 112) and an 16×16 transform block:
  nonZeroW=8 if block has secondary transform index set; else 16
  nonZeroH=8 if block has secondary transform index set; else 16

5.3 Reduction of Transform Candidate List/Constraining the Application of Secondary Transform Minimum Last Position:
If CBF flag is set:
  a. signal first (by means of a coarse signaling) if last position is at least (e. g. X+Y>T, last position!=(0,0))
  b. signal first positions with max (i.e. exact position up to T, hence either known exactly or T or >T)
  if condition for secondary transform is fulfilled, signal if secondary transform/transform with dimension reduction
    a. is transform with dimension (secondary with dimension reduction primary transform enforced to zero) reduction, if applicable code exact last position (=refinement) while setting max last pos according to forced zero positions
      I. adapt context model for significant position coding
      II. adapt context model for grX coding
      III. adapt golomb rice parameter
    else, no zeroing can be inferred, if applicable continue to code exact last position.

Accordingly, and with reference to FIGS. 13 to 16, the encoder 10 and decoder 20 may be configured to encode/decode a coarse version of an indication of a significant transform coefficient position 132 of the selected transform 102. If the candidate list 98 does not comprise a multi-stage transform, then the exact last position, i.e. a refinement of the coarse version of the indication, may be coded and all coefficients are encoded/decoded (FIG. 16, case B). If the candidate list 98 comprises a multi-stage transform, it may be further decided if the actual transform is a multi-stage transform. If so, the exact last position, i.e. a refinement of the coarse version of the indication, may be coded and only the primary transform coefficients 112 are encoded/decoded (FIG. 16, case A). If not, the exact last position, i.e. a refinement of the coarse version of the indication, may be coded and all coefficients are encoded/decoded.

Accordingly, the encoder 10 and decoder 20 may be configured to encode/decode a coarse version of the indication into/from the data stream 14 prior to the signaling 128/deriving the selected transform 102 in/from the data stream 14, wherein the determination 130 of the selectable list 98 is dependent on the coarse version of the indication. The encoder 10 and decoder 20 may further be configured to encode/decode a refinement of the coarse version of the indication into/from the data stream 14 subsequent of the signaling/deriving and depending on the selected transform 102.

Additionally or alternatively, the encoder 10 and decoder 20 may be configured to encode/decode as the coarse version a hint revealing whether the significant transform coefficient position 132 is within the sub-group 138 or not. The encoder 10 and decoder 20 may further be configured to encode/decode as the refinement a relative position information discriminating the significant transform coefficient position 132 among positions within the sub-group 138 in case the significant transform coefficient position 132 being within the sub-group 138 and discriminating the significant transform coefficient position 132 among positions outside the sub-group 138 in case of the significant transform coefficient position 132 being outside the sub-group 138.

Still further additionally or alternatively, in case the hint reveals that the significant transform coefficient position 132 is within the sub-group 138, the encoder 10 and decoder 20 may be configured to determine the selectable list 98 to comprise at least one multi-stage transform 106 involving a primary transform applied onto the prediction residual 100 of the current residual block and a secondary transform applied onto a sub-group 112 of primary transform coefficients 114 of the primary transform 106 to result into the sub group 138 of the transform coefficients of the selected transform 102. In case the hint revealing that the significant transform coefficient position 132 is not within the sub-group 138, the encoder 10 and decoder 20 may be configure to determine the selectable list 98 so as to not comprise the at least one multi-stage transform 106.

in case the hint reveals that the significant transform coefficient position 132 is within the sub-group 138, the encoder 10 and decoder 20 may be configured to encode/decode the relative position information using a variable length coding—VLC—with a first maximum number of codes which corresponds to a number of coefficients within the sub-group 138.

In case the hint revealing that the significant transform coefficient position 132 is not within the sub-group 138, the encoder 10 and decoder 20 may be configured to encode/decode a second maximum number of codes which corresponds to a number of coefficients outside the sub-group 138.

In case the hint reveals that the significant transform coefficient position 132 is within the sub-group 138, the encoder 10 and decoder 20 may be configured to encode/decode after the coarse version but prior to the refinement, a secondary transform indicator indicating whether the selected transform is among the at least one multi-stage transform 106 and/or which among the at least one multi-stage transform 106 is the selected transform.

In case the hint reveals that the significant transform coefficient position 132 is within the sub-group 138, the encoder 10 and decoder 20 may be configured to use contexts which depend on the secondary transform indicator in order to context adaptively entropy encode the transform coefficients within the sub-group 138.

In case the hint reveals that the significant transform coefficient position 132 is not within the sub-group 138, the encoder 10 and decoder 20 may be configured to context adaptively entropy encode transform coefficients within and outside the sub-group 138.

5.4 (Encoder Only) Condition Encoder if Secondary Transform is Tested, on Last Position of Already Tested Transforms without Dimension Reduction 5.5 Chroma signal only once for luma and both chroma components:
a) signal for luma+once for both chroma components:
  signal in first component with fulfilled condition (lastPosX>0 or lastPosY>0)
  (allowed only if both components fulfill condition (uses interleaved coding of last pos of both components . . . )
b) signal for each component (if condition is fulfilled)

The present invention may further be realized by the following embodiments that may be combinable with any of the examples and embodiments as described and claimed herein:

1. Encoder for encoding a picture (12) into a data stream (14) using block-based prediction and block-based residual coding, the encoder supporting a set (94) of transforms for the block-based residual coding and configured to
   predict an intra-predicted block by applying a spatial neighborhood (90) of the intra-predicted block (80) onto a selected neural network out of a plurality (92) of neural networks to obtain a prediction (104) of the intra-predicted block (80), and
   determine a selectable set (98) of transforms for a residual block (84) covering the intra-predicted block (80) out of the set (94) of transforms based on the selected neural network and a block size (96) of the residual block (84),
   encode a prediction residual (100) associated with the prediction of the intra-predicted block (80) within the residual block (84) using one selected transform (102) out of the selectable set (98) of transforms and signal the selected transform in the data stream (14).

2. Encoder of embodiment 1, configured to
   perform the determination so that
     for block sizes above a predetermined threshold,
       the selectable set (98) of transforms is populated by a first number of one or more multi-stage transforms (106), each involving a primary transform (108) applied onto the prediction residual (100) and a secondary transform (110) applied onto a sub-group (112) of primary transform coefficients (114) of the primary transform (108), the secondary transform (110) being non-separable and depending on the selected neural network.

3. Encoder of embodiment 2, configured to
   Perform the determination so that
     the primary transform (108) depends on the selected neural network (102) and is a separable 2D transform (116).

4. Encoder of embodiment 3, wherein the sub-group (112) represents a low-frequency portion of the primary transform (108).

5. Encoder of any of embodiments 2 to 4, wherein the first number is between 2 and 6, both inclusively.

6. Encoder of any of embodiments 2 to 5, configured to perform the determination so that
for block sizes below the predetermined threshold, the selectable set (98) of transforms is populated by a second number of one or more non-separable transforms (118).
7. Encoder of embodiment 6, referring back to embodiment 4, wherein the first and second number are equal.
8. Encoder of any of embodiments 2 to 7, configured to Perform the determination so that
the selectable set (98) of transforms is further populated by a third number of one or more separable 2D transforms (116).
9. Encoder of embodiment 8, wherein the third number is 1 or 5.
10. Encoder of any of embodiments 1 to 9, configured to Perform the prediction so that the prediction of the intra predicted block (80) is obtained in a domain (118) of a primary transform (108),
Perform the determination so that
the selectable set (98) of transforms is populated by a fourth number of one or more multi-stage transforms (106), each involving the primary transform (108) and a secondary transform (110) applied onto a sub-group (112) of the primary transform coefficients (114) of the primary transform (108), the secondary transform (110) being non-separable and depending on the selected neural network.
11. Encoder of embodiment 10, configured to
Perform the determination so that
the primary transform (108) is a separable 2D transform (116).
12. Encoder of embodiment 10 or 11, wherein the sub-group (112) represents a low-frequency portion of the primary transform (108).
13. Encoder of any of embodiments 10 to 13, wherein the first number is between 2 and 6, both inclusively.
14. Encoder of any of embodiments 10 to 14, configured to
Perform the determination so that
the selectable set (98) of transforms is further populated by the primary transform (108).
15. Encoder of any of embodiments 1 to 14 configured to Check whether a quantization parameter of the residual block (84) is included in a set of one or more predetermined quantization parameters,
If yes, perform the determination so that
the selectable set (98) of transforms is further populated by a set of one or more predetermined transforms associated with the set of one or more predetermined quantization parameters.
21. Decoder for decoding a picture (12) from a data stream (14) using block-based prediction and block-based residual decoding, the decoder supporting a set (94) of transforms for the block-based residual decoding and configured to
predict an intra-predicted block by applying a spatial neighborhood (90) of the intra-predicted block (80) onto a selected neural network out of a plurality (92) of neural networks to obtain a prediction (104) of the intra-predicted block (80), and
determine a selectable set (98) of transforms for a residual block (84) covering the intra-predicted block (80) out of the set (94) of retransforms based on the selected neural network and a block size (96) of the residual block (84),
decode a prediction residual (100) associated with the prediction (104) of the intra-predicted block (80) within the residual block (84) from the data stream in a domain of one selected transform (102) out of the selectable set (98) of transforms with deriving the selected transform from the data stream (14).
22. Decoder of embodiment 21, configured to
perform the determination so that
for block sizes above a predetermined threshold,
the selectable set (98) of transforms is populated by a first number of one or more multi-stage transforms (106), each involving a primary transform (108) applied onto the prediction residual (100) and a secondary transform (110) applied onto a sub-group (112) of primary transform coefficients (114) of the primary transform (108), the secondary transform (110) being non-separable and depending on the selected neural network.
23. Decoder of embodiment 22, configured to
Perform the determination so that
the primary transform (108) depends on the selected neural network (102) and is a separable 2D transform (116).
24. Decoder of embodiment 23, wherein the sub-group (112) represents a low-frequency portion of the primary transform (108).
25. Decoder of any of embodiments 22 to 24, wherein the first number is between 2 and 6, both inclusively.
26. Decoder of any of embodiments 22 to 25, configured to
perform the determination so that
for block sizes below the predetermined threshold,
the selectable set (98) of transforms is populated by a second number of one or more non-separable transforms (118).
27. Decoder of embodiment 26, referring back to embodiment 24, wherein the first and second number are equal.
28. Decoder of any of embodiments 22 to 27, configured to
Perform the determination so that
the selectable set (98) of transforms is further populated by a third number of one or more separable 2D transforms (116).
29. Decoder of embodiment 28, wherein the third number is 1 or 5.
30. Decoder of any of embodiments 21 to 29, configured to
Perform the prediction so that the prediction (104) of the intra predicted block (80) is obtained in a domain (118) a primary transform (108),
Perform the determination so that
the selectable set (98) of transforms is populated by a fourth number of one or more multi-stage transforms (106), each involving the primary transform (108) and a secondary transform (110) applied onto a sub-group (112) of the primary transform coefficients (114) of the primary transform (108), the secondary transform (110) being non-separable and depending on the selected neural network.

31. Decoder of embodiment 30, configured to
Perform the determination so that
the primary transform (108) is a separable 2D transform (116).
32. Decoder of embodiment 30 or 31, wherein the sub-group (112) represents a low-frequency portion of the primary transform (108).
33. Decoder of any of embodiments 30 to 33, wherein the first number is between 2 and 6, both inclusively.
34. Decoder of any of embodiments 30 to 34, configured to
Perform the determination so that
the selectable set (98) of transforms is further populated by the primary transform (108).
35. Decoder of any of embodiments 21 to 34 configured to
Check whether a quantization parameter of the residual block (84) is included in a set of one or more predetermined quantization parameters,
If yes, perform the determination so that
the selectable set (98) of transforms is further populated by a set of one or more predetermined transforms associated with the set of one or more predetermined quantization parameters.
41. Encoder for encoding a picture (12) into a data stream (14) using block-based prediction and block-based residual coding, the encoder configured to
predict an intra-predicted block (80) by applying a spatial neighborhood (90) of the intra-predicted block (80) onto a neural network ($NN_\#$) to obtain a prediction (104) of the intra-predicted block (80) in a domain (118) of a primary transform (108), and
encode a prediction residual (100) associated with the prediction (104) of the intra-predicted block (80) within a residual block (84) using one selected transform (102) out of a selectable set (98) of transforms and signal the selected transform (102) in the data stream (14),
wherein the selectable set (98) of transforms is populated by at least one multi-stage transform (106) involving the primary transform (108) and a secondary transform (110) applied onto a sub-group (112) of primary transform coefficients (114) of the primary transform (108).
42. Encoder of embodiment 41, wherein
the selectable set (98) of transforms is populated by a number of multi-stage transforms (106), each involving the primary transform (108) and a secondary transform (110) applied onto a sub-group (112) of primary transform coefficients (114) of the primary transform (108), the secondary transforms (110) being non-separable.
43. Encoder of embodiment 41 or 42, wherein the number is between 2 and 6, both inclusively.
44. Encoder of any of embodiments 41 to 43, wherein the primary transform (108) is a separable 2D transform.
45. Encoder of any of embodiments 41 to 44, wherein the sub-group (112) represents a low-frequency portion of the primary transform.
46. Encoder of any of embodiments 41 to 45, configured to
Perform the determination so that
the selectable set (98) of transforms is further populated by the primary transform.
47. Encoder of any of embodiments 41 to 46, configured to
Check whether a quantization parameter of the intra-predicted block in included in a set of one or more predetermined quantization parameters,
If yes, perform the determination so that
the selectable set of transforms is further populated by a set of one or more predetermined transforms associated with the set of one or more predetermined quantization parameters.
51. Decoder for decoding a picture (12) from a data stream (14) using block-based prediction and block-based residual coding, the decoder configured to
predict an intra-predicted block (80) by applying a spatial neighborhood (90) of the intra-predicted block (80) onto a neural network ($NN_\#$) to obtain a prediction (104) of the intra-predicted block (80) in a domain (118) of a primary transform (108), and
decode from the data stream (14) a prediction residual (100) associated with the prediction (104) of the intra-predicted block (80) within a residual block (84) in a further domain (119) [which might get the same as domain 118 as described in embodiment 56] of one selected transform (102) out of a selectable set (98) of transforms with deriving the selected transform (102) from the data stream (14),
wherein the selectable set (98) of transforms is populated by at least one multi-stage transform (106) involving the primary transform (108) and a secondary transform (110) applied onto a sub-group (112) of primary transform coefficients (114) of the primary transform (108).
52. Decoder of embodiment 51, wherein
the selectable set (98) of transforms is populated by a number of multi-stage transforms (106), each involving the primary transform (108) and a secondary transform (110) applied onto a sub-group (112) of primary transform coefficients (114) of the primary transform (108), the secondary transforms (110) being non-separable.
53. Decoder of embodiment 51 or 52, wherein the number is between 2 and 6, both inclusively.
54. Decoder of any of embodiments 51 to 53, wherein the primary transform (108) is a separable 2D transform.
55. Decoder of any of embodiments 51 to 54, wherein the sub-group (112) represents a low-frequency portion of the primary transform.
56. Decoder of any of embodiments 51 to 55, configured to
Perform the determination so that
the selectable set (98) of transforms is further populated by the primary transform.
57. Decoder of any of embodiments 51 to 56, configured to
Check whether a quantization parameter of the intra-predicted block is included in a set of one or more predetermined quantization parameters,
If yes, perform the determination so that
the selectable set of transforms is further populated by a set of one or more predetermined transforms associated with the set of one or more predetermined quantization parameters.
61. Encoder for encoding a picture (12) into a data stream (14) using block-based prediction and block-based residual coding, the encoder supporting a set (94) of transforms for the block-based residual coding and configured to predict an intra-predicted block (80) based on a spatial neighborhood (90) of the intra-predicted block (80) using a selected one of out of a set (120) of intra prediction modes to obtain a prediction (104) of the intra-predicted block (80), and determine a selectable set (98) of transforms for a residual block (84) covering the intra-predicted block (80) out of the set (94) of transforms based on the selected intra prediction mode and a block size (96) of the residual block (84), encode a prediction residual (100) associated with the prediction (104) of the intra-predicted block (80) within the residual block (84) using one selected transform (102) out of the selectable set (98) of transforms and signal the selected transform (102) in the data stream (14).

62. Encoder of embodiment 61, configured to
  Perform the determination so that
    for block sizes of a first predetermined set of predetermined block sizes,
      the selectable set (98) of transforms is populated by a number of one or more multi-stage transforms (106), each involving a primary transform (108) applied onto the prediction residual (100) and a secondary transform (110) applied onto a sub-group (112) of primary transform coefficients (114) of the primary transform (108), the secondary transform (110) being non-separable and depending on the selected intra prediction mode.

63. Encoder of embodiment 62, configured to
  Perform the determination so that
    the primary transform (108) depends on the selected intra-prediction mode and is a separable 2D transform (116).

64. Encoder of embodiment 62 or 63, wherein the sub-group (112) depends on the selected intra-prediction mode.

65. Encoder of any of embodiments 62 to 64, configured to
  Perform the determination so that
    for block sizes of a second predetermined set of predetermined block sizes smaller than the first predetermined set of predetermined block sizes,
      the selectable set (98) of transforms is populated by a second number of one or more non-separable transforms (118).

66. Encoder of any of embodiments 62 to 65, configured so that a manner at which the secondary transform (110) depends on the selected intra prediction mode involves an intra prediction mode aggregation (e.g. a quantization of an intra prediction mode index or a quantization of an intra prediction direction of angular intra prediction modes among the set 120 of intra prediction modes).

66a. Encoder of any of embodiment 63, configured so that a manner at which the primary transform (108) depends on the selected intra prediction mode involves an intra prediction mode aggregation (e.g. a quantization of an intra prediction mode index or a quantization of an intra prediction direction of angular intra prediction modes among the set 120 of intra prediction modes).

67. Encoder of any of embodiments 61 to 66 configured to
  Check whether a quantization parameter of the residual block (84) is included in a set of one or more predetermined quantization parameters,
    If yes, perform the determination so that
      the selectable set (98) of transforms is further populated by a set of one or more predetermined transforms associated with the set of one or more predetermined quantization parameters.

71. Decoder for decoding a picture (12) from a data stream (14) using block-based prediction and block-based residual decoding, the decoder supporting a set (94) of transforms for the block-based residual decoding and configured to
  predict an intra-predicted block (80) based on a spatial neighborhood (90) of the intra-predicted block (80) using a selected one of out of a set (120) of intra prediction modes to obtain a prediction (104) of the intra-predicted block (80), and
  determine a selectable set (98) of transforms for a residual block (84) covering the intra-predicted block (80) out of the set (94) of transforms based on the selected intra prediction mode and a block size (96) of the residual block (84),
  decode from the data stream (14) a prediction residual (100) associated with the prediction (104) of the intra-predicted block (80) within the residual block (84) in a domain of one selected transform (102) out of the selectable set (98) of transforms with deriving the selected transform (102) from the data stream (14).

72. Decoder of embodiment 71, configured to
  Perform the determination so that
    for block sizes of a first predetermined set of predetermined block sizes,
      the selectable set (98) of transforms is populated by a number of one or more multi-stage transforms (106), each involving a primary transform (108) applied onto the prediction residual (100) and a secondary transform (110) applied onto a sub-group (112) of primary transform coefficients (114) of the primary transform (108), the secondary transform (110) being non-separable and depending on the selected intra prediction mode.

73. Decoder of embodiment 72, configured to
Perform the determination so that
  the primary transform (108) depends on the selected intra-prediction mode and is a separable 2D transform (116).

74. Decoder of embodiment 72 or 73, wherein the sub-group (112) depends on the selected intra-prediction mode.

75. Decoder of any of embodiments 72 to 74, configured to
  Perform the determination so that
    for block sizes of a second predetermined set of predetermined block sizes smaller than the first predetermined set of predetermined block sizes,
      the selectable set (98) of transforms is populated by a second number of one or more non-separable transforms (116).

76. Decoder of any of embodiments 72 to 75, configured so that a manner at which the secondary transform (110) depends on the selected intra prediction mode involves an intra prediction mode aggregation (e.g. a quantization of an intra prediction mode index or a quantization of an intra prediction direction of angular intra prediction modes among the set 120 of intra prediction modes).

77. Decoder of any of embodiments 71 to 76 configured to

Check whether a quantization parameter of the residual block (84) is included in a set of one or more predetermined quantization parameters, If yes, perform the determination so that the selectable set (98) of transforms is further populated by a set of one or more predetermined transforms associated with the set of one or more predetermined quantization parameters.

81. Encoder for encoding a picture (12) into a data stream (14) using block-based prediction and block-based residual coding, the encoder supporting a set (94) of transforms for the block-based residual coding and configured to determine (122) a selectable list (98) of transforms for a current residual block (84) out of the set (94) of transforms based on a reference transform selected for a neighboring residual block (84', 84") [e.g. also out of set 94 for sake of coding the latter's prediction residual], encode a prediction residual (100) within the residual block (84) using one selected transform (102) out of the selectable list (98) of transforms and signal the selected transform (102) in the data stream (14).

82. Encoder of embodiment 81, configured to

Order (122) the selectable list (98) using the reference transform.

83. Encoder of embodiment 81 or 82, configured to

Order (122) the selectable list (98) by positioning the reference transform or a transform corresponding to the reference transform [e.g. wrt being one-stage, signaled by an high transform index 124 and thus being likely very specialized transform, analytical transform type for different sized neighboring block] at a rank (# in "n,") associated with a most probable selection [e.g. first position, or portion associated with lowest index value of index 124 or with index value associated with shortest VLC], or a second most probable selection.

84. Encoder of any of embodiments 81 to 83, configured to determine (122) a selectable list (98) of transforms for a current residual block (84) out of the set (94) of transforms based on reference transforms selected for a set of neighboring residual blocks (84', 84").

85. Encoder of embodiment 84, configured to

Order (122) the selectable list (98) by positioning the reference transforms mutually at an order corresponding to a frequency at which the reference transforms are selected for the set of neighboring residual blocks (84', 84").

86. Encoder of any of embodiments 81 to 85, configured to populate (122) with the selectable list (98) with the reference transform.

87. Encoder of embodiment 86, wherein the reference transform is a analytically definable separable spectrally decomposing transform [such as a DCT, DST, FFT or the like] and the encoder is configured to populate (122) the selectable list (98) with a further transform derived by adapting the reference transform to a block size (96) of the current residual block (84).

88. Encoder of any of embodiments 86 or 87, configured to

Perform the populating provided that one or more certain characteristics associated with the neighboring block (84', 84") and the current residual block (84) are sufficiently similar, and/or the reference transform is a separable spectrally decomposing transform.

89. Encoder of embodiment 88, wherein the one or more characteristics comprise one or more of Intra prediction mode.

90. Encoder of any of embodiments 81 to 89, configured to

Order (122) the selectable list (98) by ranking transforms in the selectable set (98) of transforms according to a similarity to the reference transform in one or more certain characteristics and/or determine the selectable list (98) of transforms in a manner excluding transforms from the selectable list (98) which exceed a certain dissimilarity to the reference transform in one or more certain characteristics.

91. Encoder of embodiment 90, wherein the one or more characteristics comprise one or more of a primary transform [e.g. equality in primary transform is used].

92. Encoder of any of embodiments 81 to 91, configured to

Order (122) the selectable list (98) by ranking transforms in the selectable set (98) of transforms depending on one or more certain characteristics of the neighboring block (84') and/or determine the selectable list (98) of transforms in a manner excluding transforms from the selectable list (98) depending on one or more certain characteristics of the neighboring block (84').

93. Encoder of embodiment 93, wherein the one or more characteristics comprise one or more of a number of significant transform coefficients.

94. Encoder of embodiment 93 or 92, wherein the one or more characteristics comprise one or more of a number of significant transform coefficients with ranking transforms less probable or excluding same which are of a mufti-stage type with a sub-group 112 of primary transform coefficients subject to a secondary transform if the numner if significant transform coefficients is below a certain threshold (e.g. depending on the number of coefficients in sub-group 112).

95. Encoder of any of embodiments 81 to 94 configured to

Check whether a quantization parameter of the current block is included in a set of one or more predetermined quantization parameters, If yes, perform the determination so that the selectable set (98) of transforms is further populated by a set of one or more predetermined transforms associated with the set of one or more predetermined quantization parameters.

101. Decoder for decoding a picture (12) from a data stream (14) using block-based prediction and block-based residual decoding, the decoder supporting a set (94) of transforms for the block-based residual decoding and configured to determine (122) a selectable list (98) of transforms for a current residual block (84) out of the set (94) of transforms based on a reference transform selected for a neighboring residual block (84', 84") [e.g. also out of set 94 for sake of coding the latter's prediction residual], decode a prediction residual (100) within the residual block (84) in a domain of one selected transform (102) out of the selectable list (98) of transforms with deriving the selected transform (102) from the data stream (14).

102. Decoder of embodiment 101, configured to
    Order (122) the selectable list (98) using the reference transform.
103. Decoder of embodiment 101 or 102, configured to
    Order (122) the selectable list (98) by positioning the reference transform or a transform corresponding to the reference transform [e.g. wrt being one-stage, signaled by an high transform index 124 and thus being likely very specialized transform, analytical transform type for different sized neighboring block] at a rank (# in "n,") associated with
        a most probable selection [e.g. first position, or porition associated with lowest index value of index 124 or with index value associated with shortest VLC], or
        a second most probable selection.
104. Decoder of any of embodiments 101 to 103, configured to
    determine (122) a selectable list (98) of transforms for a current residual block (84) out of the set (94) of transforms based on reference transforms selected for a set of neighboring residual blocks (84', 84").
105. Decoder of embodiment 104, configured to
    Order (122) the selectable list (98) by positioning the reference transforms mutually at an order corresponding to a frequency at which the reference transforms are selected for the set of neighboring residual blocks (84', 84").
106. Decoder of any of embodiments 101 to 105, configured to
    populate (122) with the selectable list (98) with the reference transform.
107. Decoder of any of embodiment 106, wherein the reference transform is a analytically definable separable spectrally decomposing transform [such as a DCT, DST, FFT or the like] and the decoder is configured to
    populate (122) the selectable list (98) with a further transform derived by adapting the reference transform to a block size (96) of the current residual block (84).
108. Decoder of any of embodiment 106 or 107, configured to
    Perform the populating provided that
        one or more certain characteristics associated with the neighboring block (84', 84") and the current residual block (84) are sufficiently similar, and/or the reference transform is a separable spectrally decomposing transform.
109. Decoder of embodiment 108, wherein the one or more characteristics comprise one or more of
    Intra prediction mode.
110. Decoder of any of embodiments 101 to 109, configured to
    Order (122) the selectable list (98) by ranking transforms in the selectable set (98) of transforms according to a similarity to the reference transform in one or more certain characteristics and/or
    determine the selectable list (98) of transforms in a manner excluding transforms from the selectable list (98) which exceed a certain dissimilarity to the reference transform in one or more certain characteristics.
111. Decoder of embodiment 100, wherein the one or more characteristics comprise one or more of
    a primary transform [e.g. equality in primary transform is used].
112. Decoder of any of embodiments 101 to 111, configured to
    Order (122) the selectable list (98) by ranking transforms in the selectable set (98) of transforms depending on one or more certain characteristics of the neighboring block (84') and/or
    determine the selectable list (98) of transforms in a manner excluding transforms from the selectable list (98) depending on one or more certain characteristics of the neighboring block (84').
113. Decoder of embodiment 112, wherein the one or more characteristics comprise one or more of
    a number of significant transform coefficients.
114. Decoder of embodiment 113 or 112, wherein the one or more characteristics comprise one or more of
    a number of significant transform coefficients with ranking transforms less probable or excluding same which are of a mufti-stage type with a sub-group 112 of primary transform coefficients subject to a secondary transform if the numner if significant transform coefficients is below a certain threshold (e.g. depending on the number of coefficients in sub-group 112).
115. Decoder of any of embodiments 101 to 114 configured to
    Check whether a quantization parameter of the current block is included in a set of one or more predetermined quantization parameters,
    If yes, perform the determination so that
        the selectable set (98) of transforms is further populated by a set of one or more predetermined transforms associated with the set of one or more predetermined quantization parameters.
121. Encoder for encoding a picture (12) into a data stream (14) using block-based prediction and block-based residual coding, the encoder supporting a set (94) of transforms for the block-based residual coding and configured to
    determine a selectable list (98) of transforms for a current residual block (84) out of the set of transforms, in manner dependent on a quantization parameter of the current block so that
        if the quantization parameter corresponds to a quantization finer than a certain threshold,
            the selectable list (98) of transforms for a current residual block is populated with at least one multi-stage transform (106) involving a primary transform (108) applied onto a prediction residual (100) within the current residual block and a secondary transform (110) applied onto a sub-group (112) of primary transform coefficients (114) of the primary transform, and
        if the quantization parameter corresponds to a quantization coarser than a certain threshold,
            the selectable list of transforms for a current residual block populated, in addition to, or in place thereof, the at least one multi-stage transform (106), with a modification of the at least one multi-stage transform wherein the primary transform coefficients (114) beyond the sub-group (112) are zeroed, and encode the prediction residual (100) within the residual block (84) using one selected transform (102) out of the selectable list (98) of transforms and signal the selected transform in the data stream (14).

122. Encoder for encoding a picture into a data stream using block-based prediction and block-based residual coding, the encoder supporting a set of transforms for the block-based residual coding and configured to determine (122) a selectable list (98) of transforms for a current residual block out of the set of transforms based on a reference transform selected for a neighboring residual block, in manner dependent on a number of, or a sum over, significant transform coefficients in one or more neighboring residual blocks (84', 84") so that if the number or sum is larger than a certain threshold, the selectable list (98) of transforms for a current residual block is populated with at least one multi-stage transform involving a primary transform applied onto a prediction residual (100) of the current residual block and a secondary transform applied onto a sub-group of primary transform coefficients of the primary transform, and if the number or sum is smaller than the certain threshold, the selectable list of transforms for a current residual block is populated, in addition to, or in place thereof, the at least one multi-stage transform, with a modification of the at least one multi-stage transform wherein primary transform coefficients beyond the sub-group are zeroed, and encode a prediction residual within the residual block using one selected transform out of the selectable list of transforms and signal the selected transform in the data stream.

123. Decoder for decoding a picture (12) from a data stream (14) using block-based prediction and block-based residual decoding, the decoder supporting a set (94) of transforms for the block-based residual decoding and configured to determine a selectable list (98) of transforms for a current residual block (84) out of the set of transforms, in manner dependent on a quantization parameter of the current block so that if the quantization parameter corresponds to a quantization finer than a certain threshold, the selectable list (98) of transforms for a current residual block is populated with at least one multi-stage transform (106) involving a primary transform (108) applied onto a prediction residual (100) within the current residual block and a secondary transform (110) applied onto a sub-group (112) of primary transform coefficients (114) of the primary transform, and if the quantization parameter corresponds to a quantization coarser than a certain threshold, the selectable list of transforms for a current residual block populated, in addition to, or in place thereof, the at least one multi-stage transform (106), with a modification of the at least one mufti-stage transform wherein the primary transform coefficients (114) beyond the sub-group (112) are zeroed, and decode the prediction residual (100) within the residual block (84) in a domain of one selected transform (102) out of the selectable list (98) of transforms with deriving the selected transform from the data stream (14).

124. Decoder for decoding a picture from a data stream using block-based prediction and block-based residual decoding, the decoder supporting a set of transforms for the block-based residual decoding and configured to determine (122) a selectable list (98) of transforms for a current residual block out of the set of transforms based on a reference transform selected for a neighboring residual block, in manner dependent on a number of, or a sum over, significant transform coefficients in one or more neighboring residual blocks (84', 84") so that if the number or sum is larger than a certain threshold, the selectable list (98) of transforms for a current residual block is populated with at least one multi-stage transform involving a primary transform applied onto a prediction residual (100) of the current residual block and a secondary transform applied onto a sub-group of primary transform coefficients of the primary transform, and if the number or sum is smaller than the certain threshold, the selectable list of transforms for a current residual block is populated, in addition to, or in place thereof, the at least one multi-stage transform, with a modification of the at least one multi-stage transform wherein primary transform coefficients beyond the sub-group are zeroed, and decode a prediction residual within the residual block in a domain of one selected transform out of the selectable list of transforms with deriving the selected transform from the data stream.

131. Encoder for encoding a picture (12) into a data stream (14) using block-based prediction and block-based residual coding, the encoder supporting a set (94) of transforms for the block-based residual coding and configured to determine (130) a selectable list (98) of transforms for a current residual block out of the set (94) of transforms;

encode transform coefficient data (126) into the data stream (14) which represents a prediction residual (100) within the residual block (84) using one selected transform (102) out of the selectable list (98) of transforms;

signal (128) the selected transform (102) in the data stream (14), and/or perform the determination (130) of the selectable list (98), in a manner depending on the transform coefficient data (126) or a portion of the data transform coefficient data (126).

132. Encoder according to embodiment 131, configured to Determine (130) the selectable list (98) of transforms, by populating the selectable list (98) with a number of transforms out of the set (94) of transforms which number depends on the transform coefficient data (126), or a portion of the transform coefficient data, perform the signaling (128) the seleted transform (102) in the data stream (14) in a manner so that a code rate spent in the data stream (14) for the signaling the selected transform (102) is the lower the lower the number is.

133. Encoder according to embodiment 131, configured to
Determine (130) the selectable list (98) of transforms, by ordering the selectable list (98) of transforms depending on the transform coefficient data (126), or a portion of the transform coefficient data (126),
perform the signaling (128) the seleted transform (102) in the data stream using a variable length code, codewords of which are assigned to the transforms of the selectable list (98) of transforms depending on an order of the transforms in the selectable list (98) of transforms.

134. Encoder according to embodiment 132 or 133, configured
So that the transform coefficient data comprises an indication of a significant transform coefficient position (132) of the selected transform (102) and values of transform coefficients (134) of the selected transform which are traversed from the significant transform coefficient position onwards (132) by a predetermined scan order (136) which sequentially traverses coefficient positions of the selected transform;
Wherein the determination (130) is dependent on the indication.

135. Encoder according to embodiment 132 or 133 or 134, configured to
count a number of significant transform coefficients (134) of the selected transform (102);
Wherein the determination (130) is dependent on the count.

136. Encoder according to embodiment 134 or 135, configured to
Evaluate the transform coefficient data (126) with respect to whether a number of significant transform coefficients (134) of the selected transform (102) within a sub group (138) of the transform coefficients (134) of the selected transform (102) exceeds a certain threshold or not;
Perform the determination (130) dependent on the count such that
  if the number is larger than the certain threshold,
    the selectable list (98) of transforms for the current residual block (84) is populated with at least one mufti-stage transform (106) involving a primary transform applied onto the prediction residual (100) of the current residual block and a secondary transform applied onto a sub-group (112) of primary transform coefficients (114) of the primary transform (106) to result into the sub group (138) of the transform coefficients of the selected transform (102), and
  if the number is smaller than the certain threshold,
    the selectable list of transforms for a current residual block is not populated with any multi-stage transform (106) involving a primary transform applied onto the prediction residual (100) of the current residual block and a secondary transform applied onto the sub-group of primary transform coefficients of the primary transform.

201. Decoder for decoding a picture (12) from a data stream (14) using block-based prediction and block-based residual decoding, the decoder supporting a set (94) of transforms for the block-based residual decoding and configured to
determine (130) a selectable list (98) of transforms for a current residual block out of the set (94) of transforms;
decode transform coefficient data (126) into the data stream (14) which represents a prediction residual (100) within the residual block (84) using one selected transform (102) out of the selectable list (98) of transforms;
derive (128) the selected transform (102) from the data stream (14), and/or perform the determination (130) of the selectable list (98), in a manner depending on the transform coefficient data (126) or a portion of the data transform coefficient data (126).

202. Decoder according to embodiment 201, configured to
Determine (130) the selectable list (98) of transforms, by populating the selectable list (98) with a number of transforms out of the set (94) of transforms which number depends on the transform coefficient data (126), or a portion of the transform coefficient data,
perform the signaling (128) the seleted transform (102) in the data stream (14) in a manner so that a code rate spent in the data stream (14) for the signaling the selected transform (102) is the lower the lower the number is.

203. Decoder according to embodiment 201, configured to
Determine (130) the selectable list (98) of transforms, by ordering the selectable list (98) of transforms depending on the transform coefficient data (126), or a portion of the transform coefficient data (126),
perform the signaling (128) the selected transform (102) in the data stream using a variable length code, codewords of which are assigned to the transforms of the selectable list (98) of transforms depending on an order of the transforms in the selectable list (98) of transforms.

204. Decoder according to embodiment 202 or 203, configured
So that the transform coefficient data comprises an indication of a significant transform coefficient position (132) of the selected transform (102) and values of transform coefficients (134) of the selected transform which are traversed from the significant transform coefficient position onwards (132) by a predetermined scan order (136) which sequentially traverses coefficient positions of the selected transform;
Wherein the determination (130) is dependent on the indication.

205. Decoder according to embodiment 202 or 203 or 204, configured to
count a number of significant transform coefficients (134) of the selected transform (102);
Wherein the determination (130) is dependent on the count.

206. Decoder according to embodiment 204 or 205, configured to
Evaluate the transform coefficient data (126) with respect to whether a number of significant transform coefficients (134) of the selected transform (102) within a sub group (138) of the transform coefficients (134) of the selected transform (102) exceeds a certain threshold or not;

Perform the determination (130) dependent on the count such that
if the number is larger than the certain threshold,
the selectable list (98) of transforms for the current residual block (84) is populated with at least one multi-stage transform (106) involving a primary transform applied onto the prediction residual (100) of the current residual block and a secondary transform applied onto a sub-group (112) of primary transform coefficients (114) of the primary transform (106) to result into the sub group (138) of the transform coefficients of the selected transform (102), and
if the number is smaller than the certain threshold, the selectable list of transforms for a current residual block is not populated with
any multi-stage transform (106) involving a primary transform applied onto the prediction residual (100) of the current residual block and a secondary transform applied onto the sub-group of primary transform coefficients of the primary transform.

141. Encoder for encoding a picture into a data stream using block-based prediction and block-based residual coding, the encoder supporting a set of transforms for the block-based residual coding and configured to
determine (130) a selectable list (98) of transforms for a current residual block out of the set of transforms;
signal (128) the selected transform in the data stream,
encode (140) transform coefficients, which represent a prediction residual within the residual block using one selected transform out of the selectable list of transforms, in a manner dependent on the selected transform (102) or the sectable set (98) of transforms.

142. Encoder of embodiment 141,
Wherein the selectable list of transforms comprises transforms of differing number of transform coefficients,
perform the encoding the transform coefficients in a manner so that a code rate spent in the data stream for the encoding the transform coefficients is the lower the lower the number of transform coefficients of the selected transform is.

143. Encoder of embodiment 141 or 142
Wherein the selectable list of transforms comprises transforms of differing number of transform coefficients (134),
Wherein the encoding the transform coefficients comprises encoding an indication of a significant transform coefficient position (132) of the selected transform (102) and values of transform coefficients (134) of the selected transform which are traversed from the significant transform coefficient position onwards by a predetermined scan order (136) which sequentially traverses coefficient positions of the selected transform;
Wherein the encoder is configured to encode the transform coefficients in a manner so that
a code rate spent in the data stream for the encoding the indication is the lower the lower the number of transform coefficients (134) of the selected transform is.

144. Encoder of embodiment 141 or 142
Wherein the selectable list of transforms comprises transforms of a first number of transform coefficients (134) and transforms of a second number of transform coefficients (134) larger than the first number,
Wherein the encoding the transform coefficients comprises
In case of the number of transform coefficients of the selected transform being the second number,
encoding an indication of a significant transform coefficient position of the selected transform and values of transform coefficients of the selected transform which are traversed from the significant transform coefficient position onwards by a predetermined scan order which sequentially traverses coefficient positions of the selected transform;
In case of the number of transform coefficients of the selected transform being the first number,
encoding values of all of the first number of transform coefficients of the selected transform.

145. Encoder of any of embodiments 141 to 144,
Wherein the selectable list of transforms comprises at least one multi-stage transform, each involving a primary transform applied onto the current residual block and a secondary transform applied onto a sub-group of primary transform coefficients of the primary transform coefficients, wherein the sub-group differs for different ones of the at least one mufti-stage transforms,
Wherein the encoder is configured to encode the transform coefficients
By encoding an indication of a significant transform coefficient position of the selected transform and values of transform coefficients of the selected transform which are traversed from the significant transform coefficient position onwards by a predetermined scan order which sequentially traverses coefficient positions of the selected transform, wherein the indication comprises, if the selected transform is a multi-stage transform, a flag whether the significant transform coefficient position is within the sub-group of transform coefficients, and if the transform coefficient position is within the sub-group of transform coefficients, the indication indicates the significant transform coefficient position relative to a position traversed last among all transform coefficients of the selected transform in the predetermined scan order and if the transform coefficient position is not within the sub-group (138) of transform coefficients, relative to a position traversed last among all transform coefficients not within the sub-group in the predetermined scan order, wherein the predetermined scan order traverses all transform coefficients within the sub-group after having traversed all transform coefficients not within the sub-group, and/or
By encoding, if the selected transform is of the mufti-stage type, a value of transform coefficient of the selected transform using entropy coding using a probability estimation which depend on whether the transform coefficient is within the sub-group of transform coefficients of the selected transform.
By encoding, if the selected transform is of the mufti-stage type, a value of transform coefficient of the selected transform using entropy coding using a probability estimation which depends on one or neighboring transform coefficients in a manner dependent on whether the transform coefficient is within the sub-group of transform coefficients of the selected transform.

145a. Encoder of any of embodiments 141 to 145,
Wherein the selectable list of transforms comprises at least one mufti-stage transform, each involving a primary transform applied onto the current residual block and a secondary transform applied onto a sub-group of primary transform coefficients of the primary transform coefficients, wherein the selectable list comprises at least one transform of a primary transform only type,
Wherein the encoder is configured to encode the transform coefficients
By encoding an indication of a significant transform coefficient position of the selected transform and values of transform coefficients of the selected transform which are traversed from the significant transform coefficient position onwards by a predetermined scan order which sequentially traverses coefficient positions of the selected transform, wherein the indication is relative to a position traversed last among all transform coefficients of the selected transform in the predetermined scan order in case of the selected transform being of the primary transform only type, or relative to a position traversed last among all transform coefficients not within the sub-group in the predetermined scan order in case of the selected transform being a multi-stage transform (106), and/or
By encoding an indication of a significant transform coefficient position of the selected transform and values of transform coefficients of the selected transform which are traversed from the significant transform coefficient position onwards by a predetermined scan order which sequentially traverses coefficient positions of the selected transform, wherein the indication comprises, if the selected transform is a multi-stage transform, a flag whether the significant transform coefficient position is within the sub-group of transform coefficients, and if the transform coefficient position is within the sub-group of transform coefficients, the indication indicates the significant transform coefficient position relative to a position traversed last among all transform coefficients of the selected transform in the predetermined scan order and if the transform coefficient position is not within the sub-group of transform coefficients, relative to a position traversed last among all transform coefficients not within the sub-group in the predetermined scan order, wherein the predetermined scan order traverses all transform coefficients within the sub-group after having traversed all transform coefficients not within the sub-group, and/or
By encoding, if the selected transform is of the mufti-stage type, a value of transform coefficient of the selected transform using entropy coding using a probability estimation which depend on whether the transform coefficient is within the sub-group of transform coefficients of the selected transform.
By encoding, if the selected transform is of the mufti-stage type, a value of transform coefficient of the selected transform using entropy coding using a probability estimation which depends on one or neighboring transform coefficients in a manner dependent on whether the transform coefficient is within the sub-group of transform coefficients of the selected transform.

146. Encoder of any of embodiments 141 to 145,
Configured to signal the selected transform using a variable length coded index,
Configured to encode the transform coefficients by encoding a value of a transform coefficient of the selected transform using binarization and binary entropy coding wherein
a probability estimation used in binary entropy coding depends on the VLC index, and/or
the binarization depends on the VLC index.

147. Encoder of any of embodiments 141 to 146,
Configured to encode the transform coefficients by encoding a value of a transform coefficient of the selected transform using entropy coding wherein
in entropy coding depends on one or neighboring transform coefficients in a manner dependent on the selected transform.

148. Encoder of embodiment 147,
configured to encode the transform coefficients by encoding a value of a transform coefficient of the selected transform using entropy coding by
selecting a local template of one or neighboring transform coefficients in a manner dependent the transform coefficient's position in the selected transform,
determine, using a mapping of a domain of possible values of the one or neighboring transform coefficient to a set of one or more contexts for the transform coefficient, a selected context for the transform coefficient,
using a probability estimation associated with the selected context for entropy coding the value of the transform coefficient,
wherein at least one of the selection of the local template and the mapping is dependent on the selected transform.

149. Encoder of embodiment 148,
configured to perform the encoding the value of the transform coefficient of the selected transform using binary entropy coding a binarization of the value, wherein the probability estimation associated with the selected context is used for a bin of the binarization indicative of the value being zero or not.

150. Encoder according to any of embodiments 141 to 149, configured to
perform the signaling the selected transform in the data stream in a manner so that
a relative positioning of a signaling of the selected transform with respect to the transform coefficient data, and/or
a decomposition of the signaling into syntax elements,
depends on the selectable list of transforms.

161. Decoder for decoding a picture from a data stream using block-based prediction and block-based residual decoding, the decoder supporting a set of transforms for the block-based residual decoding and configured to
determine (130) a selectable list (98) of transforms for a current residual block out of the set of transforms;
derive (128) the selected transform from the data stream, decode (140) from the data stream transform coefficients, which represent a prediction residual within the residual block using one selected transform out of the selectable list of transforms, in a manner dependent on the selected transform (102) or the selectable set (98) of transforms.

162. Decoder of embodiment 161,
  Wherein the selectable list of transforms comprises transforms of differing number of transform coefficients,
  perform the decoding the transform coefficients in a manner so that a code rate spent in the data stream for the transform coefficients is the lower the lower the number of transform coefficients of the selected transform is.

163. Decoder of embodiment 161 or 162
  Wherein the selectable list of transforms comprises transforms of differing number of transform coefficients (134),
  Wherein the decoding the transform coefficients comprises decoding an indication of a significant transform coefficient position (132) of the selected transform (102) and values of transform coefficients (134) of the selected transform which are traversed from the significant transform coefficient position onwards by a predetermined scan order (136) which sequentially traverses coefficient positions of the selected transform;
  Wherein the decoder is configured to decode the transform coefficients in a manner so that
    a code rate spent in the data stream for the indication is the lower the lower the number of transform coefficients (134) of the selected transform is.

164. Decoder of embodiment 161 or 162
  Wherein the selectable list of transforms comprises transforms of a first number of transform coefficients (134) and transforms of a second number of transform coefficients (134) larger than the first number,
  Wherein the decoding the transform coefficients comprises
    In case of the number of transform coefficients of the selected transform being the second number,
      decoding an indication of a significant transform coefficient position of the selected transform and values of transform coefficients of the selected transform which are traversed from the significant transform coefficient position onwards by a predetermined scan order which sequentially traverses coefficient positions of the selected transform;
    In case of the number of transform coefficients of the selected transform being the first number,
      decoding values of all of the first number of transform coefficients of the selected transform.

165. Decoder of any of embodiments 161 to 164,
  Wherein the selectable list of transforms comprises at least one multi-stage transform, each involving a primary transform applied onto the current residual block and a secondary transform applied onto a sub-group of primary transform coefficients of the primary transform coefficients, wherein the sub-group differs for different ones of the at least one mufti-stage transforms,
  Wherein the decoder is configured to encode the transform coefficients
    By decoding an indication of a significant transform coefficient position of the selected transform and values of transform coefficients of the selected transform which are traversed from the significant transform coefficient position onwards by a predetermined scan order which sequentially traverses coefficient positions of the selected transform, wherein the indication comprises, if the selected transform is a multi-stage transform, a flag whether the significant transform coefficient position is within the sub-group of transform coefficients, and if the transform coefficient position is within the sub-group of transform coefficients, the indication indicates the significant transform coefficient position relative to a position traversed last among all transform coefficients of the selected transform in the predetermined scan order and if the transform coefficient position is not within the sub-group (138) of transform coefficients, relative to a position traversed last among all transform coefficients not within the sub-group in the predetermined scan order, wherein the predetermined scan order traverses all transform coefficients within the sub-group after having traversed all transform coefficients not within the sub-group, and/or
    By decoding, if the selected transform is of the multi-stage type, a value of transform coefficient of the selected transform using entropy coding using a probability estimation which depend on whether the transform coefficient is within the sub-group of transform coefficients of the selected transform.
    By decoding, if the selected transform is of the multi-stage type, a value of transform coefficient of the selected transform using entropy coding using a probability estimation which depends on one or neighboring transform coefficients in a manner dependent on whether the transform coefficient is within the sub-group of transform coefficients of the selected transform.

165a. Decoder of any of embodiments 161 to 165,
  Wherein the selectable list of transforms comprises at least one multi-stage transform, each involving a primary transform applied onto the current residual block and a secondary transform applied onto a sub-group of primary transform coefficients of the primary transform coefficients, wherein the selectable list comprises at least one transform of a primary transform only type,
  Wherein the decoder is configured to encode the transform coefficients
    By decoding an indication of a significant transform coefficient position of the selected transform and values of transform coefficients of the selected transform which are traversed from the significant transform coefficient position onwards by a predetermined scan order which sequentially traverses coefficient positions of the selected transform, wherein the indication is relative to a position traversed last among all transform coefficients of the selected transform in the predetermined scan order in case of the selected transform being of the primary transform only type, or relative to a position traversed last among all transform coefficients not within the sub-group in the predetermined scan order in case of the selected transform being a multi-stage transform (106), and/or
    By decoding an indication of a significant transform coefficient position of the selected transform and values of transform coefficients of the selected transform which are traversed from the significant transform coefficient position onwards by a predetermined scan order which sequentially traverses coefficient positions of the selected transform, wherein the indication comprises, if the selected transform is a multi-stage transform, a flag whether the significant transform coefficient position is within the sub-group of transform coefficients, and if the transform coefficient position is within the sub-group of transform coefficients, the indication indicates the significant transform coefficient position relative to a position traversed last among all transform coefficients of the selected transform in the predetermined scan order and if the transform coefficient position is not within the sub-group of transform coefficients, relative to a position traversed last among all transform coefficients not within the sub-group in the predetermined scan order, wherein the predetermined scan order traverses all transform coefficients within the sub-group after having traversed all transform coefficients not within the sub-group, and/or By decoding, if the selected transform is of the mufti-stage type, a value of transform coefficient of the selected transform using entropy coding using a probability estimation which depend on whether the transform coefficient is within the sub-group of transform coefficients of the selected transform.

By decoding, if the selected transform is of the mufti-stage type, a value of transform coefficient of the selected transform using entropy coding using a probability estimation which depends on one or neighboring transform coefficients in a manner dependent on whether the transform coefficient is within the sub-group of transform coefficients of the selected transform.

166. Decoder of any of embodiments 161 to 165,
Configured to derive the selected transform using a variable length coded index,
Configured to decode the transform coefficients by decoding a value of a transform coefficient of the selected transform using binarization and binary entropy decoding wherein
a probability estimation used in binary entropy coding depends on the VLC index, and/or
the binarization depends on the VLC index.

167. Decoder of any of embodiments 161 to 166,
Configured to decode the transform coefficients by decoding a value of a transform coefficient of the selected transform using entropy decoding wherein in entropy decoding depends on one or neighboring transform coefficients in a manner dependent on the selected transform.

168. Decoder of embodiment 167,
configured to decode the transform coefficients by decoding a value of a transform coefficient of the selected transform using entropy decoding by
selecting a local template of one or neighboring transform coefficients in a manner dependent the transform coefficient's position in the selected transform,
determine, using a mapping of a domain of possible values of the one or neighboring transform coefficient to a set of one or more contexts for the transform coefficient, a selected context for the transform coefficient,
using a probability estimation associated with the selected context for entropy decoding the value of the transform coefficient,
wherein at least one of the selection of the local template and the mapping is dependent on the selected transform.

169. Decoder of embodiment 168, configured to perform the decoding the value of the transform coefficient of the selected transform using binary entropy decoding a binarization of the value, wherein the probability estimation associated with the selected context is used for a bin of the binarization indicative of the value being zero or not.

170. Decoder according to any of embodiments 161 to 169, configured to
perform the signaling the selected transform in the data stream in a manner so that
a relative positioning of a signaling of the selected transform with respect to the transform coefficient data, and/or
a decomposition of the signaling into syntax elements,
depends on the selectable list of transforms.

181. Encoder for encoding a picture into a data stream using block-based prediction and block-based residual coding, the encoder supporting a set of transforms for the block-based residual coding and configured to
determine a selectable list of transforms for a current residual block out of the set of transforms,
encode a prediction residual within the residual block using one selected transform out of the selectable list of transforms;
signal (128) the selected transform in the data stream using an transform indicator (124),
wherein the transform indicator is signaled in the data stream using a code with one or more digits, wherein each of a set of the one or more digits is uniquely associated with a respective transform property.

182. Encoder of embodiment 181, wherein each transform property is one of
whether the selected transform is a multi-stage transform, and
whether the selected transform is a transform having less transform coefficients than a predetermined number of transform coefficients.

183. Encoder of embodiment 181 or 182, configured to
Encode at least one of the set of at least one digit using entropy coding using a probability estimation which depends on a transform indicator of a neighboring residual block.

191. Decoder for decoding a picture from a data stream using block-based prediction and block-based residual decoding, the decoder supporting a set of transforms for the block-based residual decoding and configured to
determine a selectable list of transforms for a current residual block out of the set of transforms,
decode from the data stream (14) a prediction residual within the residual block using one selected transform out of the selectable list of transforms;
derive (128) the selected transform from the data stream using an transform indicator (124),
wherein the transform indicator is derived from the data stream using a code [e.g. bins of 124 subject to binary arithmetic coding or syntax elements which 124 is composed of and which may be parsed from 14] with one or more digits, wherein each of a set of the one or more digits is uniquely associated with a respective transform property.

192. Decoder of embodiment 191, wherein each transform property is one of whether the selected transform is a multi-stage transform, and whether the selected transform is a transform having less transform coefficients than a predetermined number of transform coefficients.

193. Decoder of embodiment 191 or 192, configured to

Decode at least one of the set of at least one digit using entropy decoding using a probability estimation which depends on a transform indicator of a neighboring residual block.

Methods performed by any of above encoders/decoders,

Computer programs for performing the methods,

Data streams generated according to inventive encoding methods.

The present invention may further be realized by the following embodiments that may be combinable with any of the examples and embodiments as described and claimed herein:

1. Encoder for encoding a picture (12) into a data stream (14) using block-based prediction and block-based residual coding, the encoder supporting a set (94) of transforms for the block-based residual coding and configured to determine (122) a transform candidate list (98) of transforms for a current residual block (84) out of the set (94) of transforms based on a height and a width of the current residual block (84), and to encode a prediction residual (100) within the residual block (84) using one selected transform (102) out of the selectable list (98) of transforms and selectively signal the selected transform (102) in the data stream (14).

2. Encoder of embodiment 1, wherein the encoder supports a plurality of block dimensions, for each block dimension the set (94) of transforms comprises a subset of transforms, a domain of which corresponds to the respective block dimension, for each transform of the set (94) of transforms the encoder supports a reverse transform, a domain of which coincides with a codomain of the respective transform, and uses the reverse transform to fill a decoded picture buffer at residual blocks for which the respective transform has been selected, wherein the encoder is configured to, in determining the transform candidate list (98), exclusively populate the transform candidate list (98) with transforms out of the subset of transforms, the domain of which corresponds to the height and the width of the current residual block (84).

3. Encoder of embodiment 1 or 2, configured to, in determining the transform candidate list (98), if the height and width of the current residual block fulfills a first criterion, populate the transform candidate list (98) with one or more transforms out of the subset of transforms, the domain of which corresponds to the height and width of the current residual block (84), and the codomain of which is smaller than the domain thereof, or if the height and width of the current residual block (84) does not fulfill a first criterion, exclude from the transform candidate list the one or more transforms out of the subset of transforms, the domain of which corresponds to the height and width of the current residual block (84), and the codomain of which is smaller than the domain thereof.

4. Encoder of embodiment 3, wherein the one or more transforms is one or more of a DCT-II, DST-VII and DCT-III.

5. Encoder of any of embodiments 1 to 4, configured to, in determining the transform candidate list (98), if the height and width of the current residual block (84) fulfills a second criterion, populate the transform candidate list (98) with an identity transform out of the subset of transforms, the domain of which corresponds to the height and width of the current residual block (84), or if the height and width of the current residual block (84) does not fulfill a second criterion, exclude from the transform candidate list the identity transform out of the subset of transforms, the domain of which corresponds to the height and width of the current residual block (84).

6. Encoder of any of embodiments 1 to 5, configured to check the first and/or second criterion by checking whether the height, the width, both of the height and the width and/or the product of height and width exceeds a certain threshold.

7. Encoder of any of embodiments 1 to 6, configured to, in determining the transform candidate list (98), if the height and width of the current residual block (84) fulfills a third criterion, populate the transform candidate list (98) with a separable spectrally decomposing transform out of the subset of transforms, the domain of which corresponds to the size of the current residual block (84), if the height and width of the current residual block (84) does not fulfill a third criterion, exclude from the transform candidate list (98) the separable spectrally decomposing transform out of the subset of transforms, the domain of which corresponds to the size of the current residual block (84).

8. Encoder of embodiment 7, configured to check the third criterion by checking whether a ratio of the height and the width exceeds a certain threshold.

9. Encoder of any of embodiments 1 to 8, configured to, in determining the transform candidate list (98), if the height and width of the current residual block corresponds to a first predetermined block dimension, populate the transform candidate list (98) with first one or more transforms out of the subset of transforms, the domain of which corresponds to the height and width of the current residual block (84), and which is a multi-stage transform (106) involving a primary transform (108) applied onto a prediction residual (100) within the current residual block (84) and a secondary transform (110) applied onto a first sub-group (112) of primary transform coefficients (114) of the primary transform (108), or if the height and width of the current residual block (84) corresponds to a second predetermined block dimension, populate the transform candidate list (98) with second one or more transforms out of the subset of transforms, the domain of which corresponds to the height and width of the current residual block (84), and which is a multi-stage transform (106) involving a primary transform (108) applied onto a prediction residual (100) within the current residual block and a secondary transform (110) applied onto a second sub-group (112) of primary transform coefficients (114) of the primary transform (108),
wherein a scaling that images a first codomain of the primary transform (108) of the first one or more transforms onto the second codomain of the primary transform (108) of the first one or more transforms does not image a circumference of the first sub-group within the first codomain onto a circumference of the second sub-group within the second codomain.

10. Decoder for decoding a picture (12) from a data stream (14) using block-based prediction and block-based residual decoding, the decoder supporting a set (94) of transforms for the block-based residual decoding and configured to
   determine (122) a transform candidate list (98) of transforms for a current residual block (84) out of the set (94) of transforms based on a height and a width of the current residual block (84), and to
   decode a prediction residual (100) within the residual block (84) in a domain of one selected transform (102) out of the selectable list (98) of transforms with selectively deriving the selected transform (102) from the data stream (14).

11. Decoder of embodiment 10, wherein
   the decoder supports a plurality of block dimensions (96),
   for each block dimension (96) the set (94) of transforms comprises a sub-set of transforms, a codomain of which corresponds to the respective block dimension (96),
   wherein the decoder is configured to, in determining the transform candidate list (98), exclusively populate the transform candidate list (98) with transforms out of the subset of transforms, the codomain of which corresponds to the height and the width of the current residual block (84).

12. Decoder of embodiment 10 or 11, configured to, in determining the transform candidate list (98),
   if the height and width of the current residual block (84) fulfills a first criterion, populate the transform candidate list (98) with one or more transforms out of the subset of transforms, the codomain of which corresponds to the height and width of the current residual block (84), and the domain of which is smaller than the codomain thereof,
   if the height and width of the current residual block (84) does not fulfill a first criterion, exclude from the transform candidate list (98) the one or more transforms out of the subset of transforms, the codomain of which corresponds to the height and width of the current residual block (84), and the domain of which is smaller than the domain thereof.

13. Decoder of embodiment 12, wherein the one or more transforms is one or more of an inverse DCT-II, DST-VII and DCT-III.

14. Decoder of any of embodiments 10 to 13, configured to, in determining the transform candidate list (98),
   if the height and width of the current residual block (84) fulfills a second criterion, populate the transform candidate list (98) with an identity transform out of the subset of transforms, the codomain of which corresponds to the height and width of the current residual block (84), or
   if the height and width of the current residual block (84) does not fulfill a second criterion, exclude from the transform candidate list (98) the identity transform out of the subset of transforms, the codomain of which corresponds to the height and width of the current residual block (84).

15. Decoder of any of embodiments 10 to 14, configured to check the first and/or second criterion by checking whether the height, the width, both of the height and the width and/or the product of height and width exceeds a certain threshold.

16. Decoder of any of embodiments 10 to 15, configured to, in determining the transform candidate list (98),
   if the height and width of the current residual block (84) fulfills a third criterion, populate the transform candidate list (98) with a separable spectrally decomposing transform out of the subset of transforms, the codomain of which corresponds to the size of the current residual block (84), or
   if the height and width of the current residual block (84) does not fulfill a third criterion, exclude from the transform candidate list the separable spectrally decomposing transform out of the subset of transforms, the codomain of which corresponds to the size of the current residual block (84).

17. Decoder of embodiment 16, configured to check the third criterion by checking whether a ratio of the height and the width exceeds a certain threshold.

18. Decoder of any of embodiments 10 to 17, configured to, in determining the transform candidate list (98),
   if the height and width of the current residual block (84) corresponds to a first predetermined block dimension, populate the transform candidate list (98) with first one or more transforms out of the subset of transforms, the codomain of which corresponds to the height and width of the current residual block (84), and which reverses a multi-stage transform (106) involving a primary transform (108) applied onto a prediction residual (100) within the current residual block (84) and a secondary transform (110) applied onto a first sub-group (112) of primary transform coefficients (114) of the primary transform (108), or
   if the height and width of the current residual block (84) corresponds to a second predetermined block dimension, populate the transform candidate list (98) with second one or more transforms out of the subset of transforms, the codomain of which corresponds to the height and width of the current residual block (84), and which reverses a multi-stage transform (106) involving a primary transform (108) applied onto a prediction residual (100) within the current residual block (84) and a secondary transform (110) applied onto a second sub-group (112) of primary transform coefficients (114) of the primary transform (108),
   wherein a scaling that images a first codomain of the primary transform (108) of the first one or more transforms onto the second codomain of the primary transform (108) of the first one or more transforms does not image a circumference of the first sub-group within the first codomain onto a circumference of the second sub-group within the second codomain.

19. A method for encoding a picture (12) into a data stream (14) using block-based prediction and block-based residual coding, supporting a set (94) of transforms for the block-based residual coding, wherein the method comprises steps of
   determining (122) a transform candidate list (98) of transforms for a current residual block (84) out of the set (94) of transforms based on a height and a width of the current residual block (84), and encoding a prediction residual (100) within the residual block (84) using one selected transform (102) out of the selectable list (98) of transforms and selectively signal the selected transform (102) in the data stream (14).

20. A method for decoding a picture (12) from a data stream (14) using block-based prediction and block-based residual decoding, supporting a set (94) of transforms for the block-based residual decoding, wherein the method comprises steps of determining (122) a transform candidate list (98) of transforms for a current residual block (84) out of the set (94) of transforms based on a height and a width of the current residual block (84), and decoding a prediction residual (100) within the residual block (84) in a domain of one selected transform (102) out of the selectable list (98) of transforms with selectively deriving the selected transform (102) from the data stream (14).

21. Encoder for encoding a picture (12) into a data stream (14) using block-based prediction and block-based residual coding, the encoder supporting a set (94) of transforms for the block-based residual coding and configured to determine (130) a selectable list (98) of transforms for a current residual block (84) out of the set (94) of transforms;

encode transform coefficient data (126) into the data stream (14) which represents a prediction residual (100) within the residual block (84) using one selected transform (102) out of the selectable list (98) of transforms;

signal (128) the selected transform (102) in the data stream (14), and/or perform the determination (130) of the selectable list (98), in a manner depending on the transform coefficient data (126) or on a portion of the transform coefficient data (126).

22. Encoder according to embodiment 21, configured to determine (130) the selectable list (98) of transforms, by populating the selectable list (98) with a number of transforms out of the set (94) of transforms which number depends on the transform coefficient data (126), or a portion of the transform coefficient data (126), perform the signaling (128) of the selected transform (102) in the data stream (14) in a manner so that a code rate spent in the data stream (14) for the signaling the selected transform (102) is the lower the lower the number is.

23. Encoder according to embodiment 21, configured to determine (130) the selectable list (98) of transforms, by ordering the selectable list (98) of transforms depending on the transform coefficient data (126), or a portion of the transform coefficient data (126), perform the signaling (128) of the selected transform (102) in the data stream (14) using a variable length code, codewords of which are assigned to the transforms of the selectable list (98) of transforms depending on an order of the transforms in the selectable list (98) of transforms.

24. Encoder according to embodiment 22 or 23, configured so that the transform coefficient data (126) comprises an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform (102);

wherein the determination (130) is dependent on the indication.

25. Encoder according to embodiment 24, configured to encode a coarse version of the indication into the data stream (14) prior to the signaling (128) of the selected transform (102) in the data stream (14) wherein the determination (130) is dependent on the coarse version of the indication, and encode a refinement of the coarse version of the indication into the data stream (14) subsequent of the signaling and depending on the selected transform (102).

26. Encoder according to embodiment 25, configured to encode as the coarse version a hint revealing whether the significant transform coefficient position (132) is within a sub-group (138) of transform coefficients (134) or not, and encode as the refinement a relative position information discriminating the significant transform coefficient position (132) among positions within the sub-group (138) in case of the significant transform coefficient position (132) being within the sub-group (138) and discriminating the significant transform coefficient position (132) among positions outside the sub-group (138) in case of the significant transform coefficient position (132) being outside the sub-group (138).

27. Encoder according to embodiment 26, wherein the encoder is configured to in case of the hint revealing that the significant transform coefficient position (132) is within the sub-group (138), determine the selectable list (98) to comprise at least one mufti-stage transform (106) involving a primary transform applied onto the prediction residual (100) of the current residual block and a secondary transform applied onto a sub-group (112) of primary transform coefficients (114) of the primary transform (106) to result into the sub group (138) of the transform coefficients of the selected transform (102), and in case of the hint revealing that the significant transform coefficient position (132) is not within the sub-group (138), determine the selectable list (98) so as to not comprise the at least one multi-stage transform (106).

28. Encoder according to embodiment 27, wherein the encoder is configured to encode the relative position information using a variable length coding—VLC— with a first maximum number of codes which corresponds to a number of coefficients within the sub-group (138) in case of the hint revealing that the significant transform coefficient position (132) is within the sub-group (138), and/or with a second maximum number of codes which corresponds to a number of coefficients outside the sub-group (138) in case of the hint revealing that the significant transform coefficient position (132) is not within the sub-group (138).

29. Encoder according to any one of embodiments 26 to 28, wherein the encoder is configured to
in case of the hint revealing that the significant transform coefficient position (132) is within the sub-group (138), encode after the coarse version but prior to the refinement, a secondary transform indicator indicating whether the selected transform is among the at least one multi-stage transform (106) and/or which among the at least one multi-stage transform (106) is the selected transform.

30. Encoder according to any one of embodiments 26 to 29, wherein the encoder is configured to
in case of the hint revealing that the significant transform coefficient position (132) is within the sub-group (138), use contexts which depend on the secondary transform indicator in order to context adaptively entropy encode the transform coefficients within the sub-group (138).

31. Encoder according to embodiment 29 or 30, wherein the encoder is configured to
in case of the hint revealing that the significant transform coefficient position (132) is not within the sub-group (138), context adaptively entropy encode transform coefficients within and outside the sub-group (138).

32. Encoder according to any one of embodiments 21 to 31, configured to
count a number of significant transform coefficients (134) of the selected transform (102);
wherein the determination (130) of the selectable list (98) is dependent on the count.

33. Encoder according to any one of embodiments 21 to 32, configured to
evaluate the transform coefficient data (126) with respect to whether a number of significant transform coefficients of the selected transform (102) within a sub group (138) of the transform coefficients (134) of the selected transform (102) exceeds a certain threshold or not;
perform the determination (130) dependent on the count such that
if the number is larger than the certain threshold,
the selectable list (98) of transforms for the current residual block (84) is populated with at least one multi-stage transform (106) involving a prinary transform applied onto the prediction residual (100) of the current residual block (84) and a secondary transform applied onto a sub-group (112) of primary transform coefficients (114) of the primary transform (106) to result into the sub group (138) of the transform coefficients of the selected transform (102), and
if the number is smaller than the certain threshold,
the selectable list (98) of transforms for a current residual block (84) is not populated with any multi-stage transform (106) involving a primary transform applied onto the prediction residual (100) of the current residual block (84) and a secondary transform applied onto the sub-group (138) of primary transform coefficients (114) of the primary transform.

34. Encoder according to any of embodiments 21 to 33, configured to determine the transform candidate list (98) so that the transforms of the transform candidate list (98) coincide in codomain.

35. Encoder according to any of embodiments 21 to 34, wherein the transforms of the transform candidate list (98) comprise a first transform and a second transform which
coincide in codomain,
wherein the second transform corresponds to a secondary transform being applied onto a sub-group (112) of primary transform coefficients (114) of the first transform (108) with further primary transform coefficients (114) of the first transform (108) outside the sub group (112) of primary transform coefficients of the first transform (108) being set to zero.

36. Encoder according to embodiment 35, configured to test coding the current residual block (84) with respect to the second transform by setting to zero further primary transform coefficients (114) of the first transform (108) outside the sub group (112) of primary transform coefficients of the first transform (108).

37. Encoder according to any of embodiments 21 to 36, configured to
decide
whether to populate the transform candidate list (98) with, or to exclude from the transform candidate list (98), at least one multi-stage transform (106) involving a primary transform applied onto the prediction residual (100) of the current residual block (84) and a secondary transform applied onto a sub-group (112) of primary transform coefficients (114) of the primary transform (108) to result into the sub group (138) of the transform coefficients of the selected transform (102), or
where in the transform candidate list the at least one multi-stage transform (106) is to be placed, depending on where according to the transform coefficient data (126) significant transform coefficients are positioned.

38. Encoder according to any of embodiments 21 to 37, configured to
decide
whether to populate the transform candidate list (98) with, or to exclude from the transform candidate list (98), at least one multi-stage transform (106) involving a primary transform applied onto the prediction residual (100) of the current residual block (84) and a secondary transform applied onto a sub-group (112) of primary transform coefficients (114) of the primary transform (108) to result into the sub group (138) of the transform coefficients of the selected transform (102), or
where in the transform candidate list (98) the at least one multi-stage transform (106) is to be placed, depending on whether according to the transform coefficient data (126) any transform coefficient outside the sub group (138) of the transform coefficients is significant.

39. Encoder according to any of embodiments 21 to 38, configured to
decide
whether to populate the transform candidate list (98) with, or to exclude from the transform candidate list (98), at least one multi-stage transform (106) involving a primary transform applied onto the prediction residual (100) of the current residual block (84) and a secondary transform applied onto a sub-group (112) of primary transform coefficients (114) of the primary transform (106) to result into the sub group (138) of the transform coefficients of the selected transform (102), or where in the transform candidate list (98) the at least one multi-stage transform (106) is to be placed depending on whether according to the transform coefficient data (126) any transform coefficient inside the sub-group (112) but outside the sub group (138) of the transform coefficients is significant.

40. Encoder according to any of embodiments 21 to 39, configured to
 decide
  whether to populate the transform candidate list (98) with, or to exclude from the transform candidate list (98), at least one multi-stage transform (106) involving a primary transform (108) applied onto the prediction residual (100) of the current residual block (84) and a secondary transform (110) applied onto a subgroup (112) of primary transform coefficients (114) of the primary transform (108) to result into transform coefficients (134) of the multi-stage transform (106) being lower in number than residual samples (105) within the prediction residual (100) of the current residual block (84), and corresponding in transform coefficient position to a subset (138) of transform coefficients (134) of a further transform in the transform candidate list (98) equaling the primary transform (108), wherein the primary transform coefficients (114) of the primary transform (108) are greater in number than the transform coefficients (134) of the multi-stage transform (106), or
  where in the transform candidate list (98) the at least one multi-stage transform (106) is to be placed relative to the further transform,
 depending on
  where according to the transform coefficient data (126) significant transform coefficients are positioned, or
  whether according to the transform coefficient data (126) significant transform coefficients are positioned outside the sub-group (138) of transform coefficients, or
  whether according to the transform coefficient data (126) significant transform coefficients are positioned outside the sub-group (112) of primary transform coefficients (114).

41. Decoder for decoding a picture (12) from a data stream (14) using block-based prediction and block-based residual decoding, the decoder supporting a set (94) of transforms for the block-based residual decoding and configured to
 determine (130) a selectable list (98) of transforms for a current residual block out of the set (94) of transforms;
 decode transform coefficient data (126) from the data stream (14) which represents a prediction residual (100) within the residual block (84) using one selected transform (102) out of the selectable list (98) of transforms;
 derive (128) the selected transform (102) from the data stream (14), and/or perform the determination (130) of the selectable list (98), in a manner depending on the transform coefficient data (126) or on a portion of the data transform coefficient data (126).

42. Decoder according to embodiment 41, configured to
 determine (130) the selectable list (98) of transforms, by populating the selectable list (98) with a number of transforms out of the set (94) of transforms which number depends on the transform coefficient data (126), or on a portion of the transform coefficient data,
 perform the signaling (128) of the selected transform (102) in the data stream (14) in a manner so that a code rate spent in the data stream (14) for the signaling the selected transform (102) is the lower the lower the number is.

43. Decoder according to embodiment 41, configured to
 determine (130) the selectable list (98) of transforms, by ordering the selectable list (98) of transforms depending on the transform coefficient data (126), or on a portion of the transform coefficient data (126),
 perform the signaling (128) the selected transform (102) in the data stream using a variable length code, codewords of which are assigned to the transforms of the selectable list (98) of transforms depending on an order of the transforms in the selectable list (98) of transforms.

44. Decoder according to embodiment 42 or 43, configured
 so that the transform coefficient data (126) comprises an indication of a significant transform coefficient position (132) of the selected transform (102) and values of transform coefficients (134) of the selected transform which are traversed from the significant transform coefficient position (132) onwards by a predetermined scan order (136) which sequentially traverses coefficient positions of the selected transform;
 wherein the determination (130) is dependent on the indication.

45. Decoder according to embodiment 44, configured to
 decode a coarse version of the indication from the data stream (14) prior to the deriving of the selected transform (102) from the data stream (14) wherein the determination (130) is dependent on the coarse version of the indication, and
 decode a refinement of the coarse version of the indication from the data stream (14) subsequent of the deriving and depending on the selected transform (102).

46. Decoder according to embodiment 45, configured to
 decode as the coarse version a hint revealing whether the significant transform coefficient position (132) is within a sub-group (138) of transform coefficients (134) or not,
 and decode as the refinement a relative position information discriminating the significant transform coefficient position (132) among positions within the sub-group (138) in case of the significant transform coefficient position (132) being within the sub-group (138) and discriminating the significant transform coefficient position (132) among positions outside the sub-group (138) in case of the significant transform coefficient position (132) being outside the sub-group (138).

47. Decoder according to embodiment 46, wherein the decoder is configured to
 in case of the hint revealing that the significant transform coefficient position (132) is within the sub-group (138), determine the selectable list (98) to comprise at least one multi-stage transform (106) involving a primary transform applied onto the prediction residual (100) of the current residual block and a secondary transform applied onto a sub-group (112) of primary transform coefficients (114) of the primary transform (106) to result into the sub group (138) of the transform coefficients of the selected transform (102), and in case of the hint revealing that the significant transform coefficient position (132) is not within the sub-group (138), determine the selectable list (98) so as to not comprise the at least one multi-stage transform (106).

48. Decoder according to embodiment 47, wherein the decoder is configured to decode the relative position information using a variable length coding—VLC— with a first maximum number of codes which corresponds to a number of coefficients within the sub-group (138) in case of the hint revealing that the significant transform coefficient position (132) is within the sub-group (138), and/or with a second maximum number of codes which corresponds to a number of coefficients outside the sub-group (138) in case of the hint revealing that the significant transform coefficient position (132) is not within the sub-group (138).

49. Decoder according to any of embodiments 46 to 48, wherein the decoder is configured to in case of the hint revealing that the significant transform coefficient position (132) is within the sub-group (138), decode after the coarse version but prior to the refinement, a secondary transform indicator indicating whether the selected transform is among the at least one multi-stage transform (106) and/or which among the at least one multi-stage transform (106) is the selected transform.

50. Decoder according to any of embodiments 46 to 49, wherein the decoder is configured to in case of the hint revealing that the significant transform coefficient position (132) is within the sub-group (138), use contexts which depend on the secondary transform indicator in order to context adaptively entropy decode the transform coefficients within the sub-group (138).

51. Decoder according to embodiment 49 or 50, wherein the decoder is configured to in case of the hint revealing that the significant transform coefficient position (132) is not within the sub-group (138), context adaptively entropy decode transform coefficients within and outside the sub-group (138).

52. Decoder according to any of embodiments 41 to 51, configured to count a number of significant transform coefficients (134) of the selected transform (102);

wherein the determination (130) is dependent on the count.

53. Decoder according to embodiment 41 to 52, configured to evaluate the transform coefficient data (126) with respect to whether a number of significant transform coefficients (134) of the selected transform (102) within a sub group (138) of the transform coefficients (134) of the selected transform (102) exceeds a certain threshold or not;

perform the determination (130) dependent on the count such that if the number is larger than the certain threshold, the selectable list (98) of transforms for the current residual block (84) is populated with at least one multi-stage transform (106) involving a primary transform applied onto the prediction residual (100) of the current residual block and a secondary transform applied onto a sub-group (112) of primary transform coefficients (114) of the primary transform (106) to result into the sub group (138) of the transform coefficients of the selected transform (102), and if the number is smaller than the certain threshold, the selectable list (98) of transforms for a current residual block (84) is not populated with any multi-stage transform (106) involving a primary transform applied onto the prediction residual (100) of the current residual block (84) and a secondary transform applied onto the sub-group (138) of primary transform coefficients of the primary transform.

54. Decoder according to any of embodiment 41 to 53, configured to determine the transform candidate list (98) so that the transforms of the transform candidate list (98) coincide in codomain.

55. Decoder according to any of embodiments 41 to 54, configured to decide whether to populate the transform candidate list (98) with, or to exclude from the transform candidate list (98), at least one multi-stage transform (106) involving a primary transform applied onto the prediction residual (100) of the current residual block (84) and a secondary transform applied onto a sub-group (112) of primary transform coefficients (114) of the primary transform (106) to result into the sub group (138) of the transform coefficients of the selected transform (102), or where in the transform candidate list (98) the at least one multi-stage transform (106) is to be placed depending on where according to the transform coefficient data (126) significant transform coefficients are positioned.

56. Decoder according to any of embodiments 41 to 55, configured to decide whether to populate the transform candidate list (98) with, or to exclude from the transform candidate list (98), at least one multi-stage transform (106) involving a primary transform applied onto the prediction residual (100) of the current residual block (84) and a secondary transform applied onto a sub-group (112) of primary transform coefficients (114) of the primary transform (106) to result into the sub group (138) of the transform coefficients of the selected transform (102), or where in the transform candidate list (98) the at least one multi-stage transform (106) is to be placed depending on whether according to the transform coefficient data (126) any transform coefficient outside the sub group (138) of the transform coefficients is significant.

57. Decoder according to any of embodiments 41 to 56, configured to decide whether to populate the transform candidate list (98) with, or to exclude from the transform candidate list (98), at least one multi-stage transform (106) involving a primary transform applied onto the prediction residual (100) of the current residual block (84) and a secondary transform applied onto a sub-group (112) of primary transform coefficients (114) of the primary transform (106) to result into the sub group (138) of the transform coefficients of the selected transform (102), or where in the transform candidate list (98) the at least one multi-stage transform (106) is to be placed depending on whether according to the transform coefficient data (126) any transform coefficient inside the sub-group (112) but outside the sub group (138) of the transform coefficients is significant.

58. Decoder according to any of embodiments 41 to 57, configured to
decide
whether to populate the transform candidate list (98) with, or to exclude from the transform candidate list (98), at least one multi-stage transform (106) involving a primary transform (108) applied onto the prediction residual (100) of the current residual block (84) and a secondary transform (110) applied onto a subgroup (112) of primary transform coefficients (114) of the primary transform (108) to result into transform coefficients (134) of the multi-stage transform (106) being lower in number than residual samples (105) within the prediction residual (100) of the current residual block (84), and corresponding in transform coefficient position to a subset (138) of transform coefficients (134) of a further transform in the transform candidate list (98) equaling the primary transform (108), wherein the primary transform coefficients (114) of the primary transform (108) are greater in number than the transform coefficients (134) of the multi-stage transform (106), or
where in the transform candidate list (98) the at least one multi-stage transform (106) is to be placed relative to the further transform,
depending on
where according to the transform coefficient data (126) significant transform coefficients are positioned, or
whether according to the transform coefficient data (126) significant transform coefficients are positioned outside the sub-group (138) of transform coefficients, or
whether according to the transform coefficient data (126) significant transform coefficients are positioned outside the sub-group (112) of primary transform coefficients (114).

59. A method for encoding a picture (12) into a data stream (14) using block-based prediction and block-based residual coding, supporting a set (94) of transforms for the block-based residual coding, wherein the method comprises steps of
determining (130) a selectable list (98) of transforms for a current residual block out of the set (94) of transforms;
encoding transform coefficient data (126) into the data stream (14) which represents a prediction residual (100) within the residual block (84) using one selected transform (102) out of the selectable list (98) of transforms;
signaling (128) the selected transform (102) in the data stream (14), and/or perform the determination (130) of the selectable list (98), in a manner depending on the transform coefficient data (126) or on a portion of the transform coefficient data (126).

60. A method for decoding a picture (12) from a data stream (14) using block-based prediction and block-based residual decoding, supporting a set (94) of transforms for the block-based residual decoding, wherein the method comprises steps of
determining (130) a selectable list (98) of transforms for a current residual block out of the set (94) of transforms;
decoding transform coefficient data (126) from the data stream (14) which represents a prediction residual (100) within the residual block (84) using one selected transform (102) out of the selectable list (98) of transforms;
deriving (128) the selected transform (102) from the data stream (14), and/or perform the determination (130) of the selectable list (98), in a manner depending on the transform coefficient data (126) or a portion of the data transform coefficient data (126).

61. Encoder for encoding a picture (12) into a data stream (14) using block-based prediction and block-based residual coding, the encoder supporting a set (94) of transforms for the block-based residual coding and configured to
determine (130) a selectable list (98) of transforms for a current residual block (84) out of the set (94) of transforms;
signal (128) the selected transform in the data stream (14),
encode (140) transform coefficients (134), which represent a prediction residual (100) within the residual block (84) using one selected transform (102) out of the selectable list (98) of transforms, in a manner dependent on the selected transform (102) or the selectable list (98) of transforms.

62. Encoder of embodiment 61,
wherein the selectable list (98) of transforms comprises transforms of differing number of transform coefficients (134),
and wherein the encoder is configured to perform the encoding of the transform coefficients (134) in a manner so that a code rate spent in the data stream (14) for the encoding of the transform coefficients (134) is the lower the lower the number of transform coefficients (134) of the selected transform (102) is.

63. Encoder of embodiment 61 or 62,
wherein the selectable list (98) of transforms comprises transforms of differing number of transform coefficients (134),
wherein the encoding of the transform coefficients (134) comprises encoding an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform (102);
wherein the encoder is configured to encode the transform coefficients (134) in a manner so that
a code rate spent in the data stream (14) for the encoding of the indication is the lower the lower the number of transform coefficients (134) of the selected transform (102) is.

64. Encoder of embodiment 61 or 62,
- wherein the selectable list (98) of transforms comprises transforms of a first number of transform coefficients (134) and transforms of a second number of transform coefficients (134) larger than the first number,
- wherein the encoding of the transform coefficients (134) comprises
  - in case of the number of transform coefficients (134) of the selected transform (102) being the second number,
    - encoding an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform (102);
  - in case of the number of transform coefficients (134) of the selected transform (102) being the first number,
    - encoding values of all of the first number of transform coefficients (134) of the selected transform (102).

65. Encoder of any of embodiments 61 to 64,
- wherein the selectable list (98) of transforms comprises at least one multi-stage transform, each involving a primary transform applied onto the current residual block (84) and a secondary transform applied onto a sub-group (138) of primary transform coefficients (134) of the primary transform, wherein the sub-group (138) differs for different ones of the at least one multi-stage transforms,
- wherein the encoder is configured to encode the transform coefficients (134)
  - by encoding an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform, wherein the indication comprises, if the selected transform is a multi-stage transform, a flag whether the significant transform coefficient position (132) is within the sub-group (138) of transform coefficients (134), and if the transform coefficient position is within the sub-group (138) of transform coefficients (134), the indication indicates the significant transform coefficient position (132) relative to a position traversed last among all transform coefficients (134) of the selected transform (102) in the predetermined scan order (136) and if the transform coefficient position is not within the sub-group (138) of transform coefficients (134), relative to a position traversed last among all transform coefficients (134) not within the sub-group (138) in the predetermined scan order (136), wherein the predetermined scan order (136) traverses all transform coefficients (134) within the sub-group (138) after having traversed all transform coefficients (134) not within the sub-group (138), and/or
  - by encoding, if the selected transform is of the mufti-stage type, a value of a transform coefficient (134) of the selected transform (102) using entropy coding using a probability estimation which depends on whether the transform coefficient (134) is within the sub-group (138) of transform coefficients (134) of the selected transform (102), and/or
  - by encoding, if the selected transform (102) is of the multi-stage type, a value of a transform coefficient (134) of the selected transform (102) using entropy coding using a probability estimation which depends on one or more neighboring transform coefficients in a manner dependent on whether the transform coefficient (134) is within the sub-group (138) of transform coefficients (134) of the selected transform (102).

66. Encoder of any of embodiments 61 to 65,
- wherein the selectable list (98) of transforms comprises at least one multi-stage transform, each involving a primary transform applied onto the current residual block (84) and a secondary transform applied onto a sub-group (138) of primary transform coefficients (134) of the primary transform, wherein the selectable list (98) comprises at least one transform of a primary transform only type,
- wherein the encoder is configured to encode the transform coefficients (134)
  - by encoding an indication of a significant transform coefficient position (132) of the selected transform (102) and values of transform coefficients (134) of the selected transform which are traversed from the significant transform coefficient position (132) onwards by a predetermined scan order (136) which sequentially traverses coefficient positions of the selected transform (102), wherein the indication is relative to a position traversed last among all transform coefficients (134) of the selected transform (102) in the predetermined scan order (136) in case of the selected transform being of the primary transform only type, or relative to a position traversed last among all transform coefficients (134) not within the sub-group (138) in the predetermined scan order (136) in case of the selected transform being a multi-stage transform (106), and/or
  - by encoding an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform (102), wherein the indication comprises, if the selected transform (102) is a multi-stage transform, a flag whether the significant transform coefficient position (132) is within the sub-group (138) of transform coefficients (134), and if the transform coefficient position (132) is within the sub-group (138) of transform coefficients (134), the indication indicates the significant transform coefficient position (132) relative to a position traversed last among all transform coefficients (134) of the selected transform (102) in the predetermined scan order (136) and if the transform coefficient position (132) is not within the sub-group (138) of transform coefficients (134), relative to a position traversed last among all transform coefficients not within the sub-group (138) in the predetermined scan order (136), wherein the predetermined scan order (136) traverses all transform coefficients (134) within the sub-group (138) after having traversed all transform coefficients (134) not within the sub-group (138), and/or by encoding, if the selected transform (102) is of the multi-stage type, a value of a transform coefficient (134) of the selected transform (102) using entropy coding using a probability estimation which depends on whether the transform coefficient (134) is within the sub-group (138) of transform coefficients (134) of the selected transform (102), and/or by encoding, if the selected transform (102) is of the multi-stage type, a value of a transform coefficient (134) of the selected transform (102) using entropy coding using a probability estimation which depends on one or more neighboring transform coefficients in a manner dependent on whether the transform coefficient (134) is within the sub-group (138) of transform coefficients (134) of the selected transform (102).

67. Encoder of any of embodiments 61 to 66,
configured to encode the transform coefficients (134)
by encoding a value of a transform coefficient (134) of the selected transform (102) using binarization and binary entropy coding wherein
a probability estimation used in binary entropy coding depends on the selected transform (102), and/or
wherein the binarization depends on the selected transform (102).

68. Encoder of embodiment 66 or 67, wherein the dependency on the selected transform (102) is a dependency on whether the selected transform (102) is a multi-stage transform or not.

69. Encoder of any of embodiments 61 to 68, configured to
signal the selected transform (102) using an index,
encode the transform coefficients (134) by encoding a value of a transform coefficient (134) of the selected transform (102) using binarization and binary entropy coding, wherein
a probability estimation used in binary entropy coding depends on the index, and/or
wherein the binarization depends on the index.

70. Encoder of embodiment 69, wherein the index is a variable length code—VLC—index.

71. Encoder of any of embodiments 61 to 70,
configured to encode the transform coefficients (134) by encoding a value of a transform coefficient (134) of the selected transform using entropy coding, wherein
the entropy coding depends on one or more neighboring transform coefficients in a manner dependent on the selected transform (102).

72. Encoder of embodiment 71,
configured to encode the transform coefficients (134) by encoding a value of a transform coefficient (134) of the selected transform (102) using entropy coding by
selecting a local template of one or more neighboring transform coefficients (134) in a manner dependent the transform coefficient's position in the selected transform (102),
determine, using amapping of a domain of possible values of the one or neighboring transform coefficient to a set of one or more contexts for the transform coefficient, a selected context for the transform coefficient (134),
using a probability estimation associated with the selected context for entropy coding the value of the transform coefficient (134),
wherein at least one of the selection of the local template and the mapping is dependent on the selected transform (102).

73. Encoder of embodiment 72, configured to
perform the encoding of the value of the transform coefficient (134) of the selected transform (102) using binary entropy coding a binarization of the value, wherein the probability estimation associated with the selected context is used for a bin of the binarization indicative of the value being zero or not.

74. Encoder according to any of embodiments 61 to 73, configured to
perform the signaling of the selected transform (134) in the data stream (14) in a manner so that
a relative positioning of a signaling of the selected transform (102) with respect to the transform coefficient data (126), and/or a decomposition of the signaling into syntax elements,
depends on the selectable list (98) of transforms.

75. Decoder for decoding a picture (12) from a data stream (14) using block-based prediction and block-based residual decoding, the decoder supporting a set (94) of transforms for the block-based residual decoding and configured to
determine (130) a selectable list (98) of transforms for a current residual block (84) out of the set of transforms;
derive (128) the selected transform from the data stream (14),
decode (140) from the data stream (14) transform coefficients (134), which represent a prediction residual (100) within the residual block (84) using one selected transform (102) out of the selectable list (98) of transforms, in a manner dependent on the selected transform (102) or on the selectable list (98) of transforms.

76. Decoder of embodiment 75,
wherein the selectable list (98) of transforms comprises transforms of differing number of transform coefficients (134),
perform the decoding of the transform coefficients (134) in a manner so that a code rate spent in the data stream (14) for the transform coefficients (134) is the lower the lower the number of transform coefficients (134) of the selected transform (102) is.

77. Decoder of embodiment 75 or 76,
wherein the selectable list (98) of transforms comprises transforms of differing number of transform coefficients (134),
wherein the decoding the transform coefficients comprises decoding an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform (102);

wherein the decoder is configured to decode the transform coefficients (134) in a manner so that
a code rate spent in the data stream (14) for the indication is the lower the lower the number of transform coefficients (134) of the selected transform (102) is.

78. Decoder of embodiment 75 or 76,
wherein the selectable list (98) of transforms comprises transforms of a first number of transform coefficients (134) and transforms of a second number of transform coefficients (134) larger than the first number,
wherein the decoding of the transform coefficients (134) comprises
in case the number of transform coefficients (134) of the selected transform (102) being the second number,
decoding an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform (102); or
in case the number of transform coefficients (134) of the selected transform (102) being the first number,
decoding values of all of the first number of transform coefficients (134) of the selected transform (102).

79. Decoder of any of embodiments 75 to 78,
wherein the selectable list (98) of transforms comprises at least one multi-stage transform, each involving a primary transform applied onto the current residual block (84) and a secondary transform applied onto a sub-group (138) of primary transform coefficients (134) of the primary transform, wherein the sub-group (138) differs for different ones of the at least one mufti-stage transforms,
wherein the decoder is configured to decode the transform coefficients (134)
by decoding an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform (102), wherein the indication comprises, if the selected transform is a mufti-stage transform, a flag whether the significant transform coefficient position (132) is within the sub-group (138) of transform coefficients (134), and if the significant transform coefficient position (132) is within the sub-group (138) of transform coefficients (134), the indication indicates the significant transform coefficient position (132) relative to a position traversed last among all transform coefficients (134) of the selected transform (102) in the predetermined scan order (136) and if the transform coefficient position (132) is not within the sub-group (138) of transform coefficients (134), relative to a position traversed last among all transform coefficients (134) not within the sub-group (138) in the predetermined scan order (136), wherein the predetermined scan order (136) traverses all transform coefficients (134) within the sub-group (138) after having traversed all transform coefficients (134) not within the sub-group (138), and/or
by decoding, if the selected transform (102) is of the multi-stage type, a value of a transform coefficient (134) of the selected transform (102) using entropy coding using a probability estimation which depends on whether the transform coefficient (134) is within the sub-group (138) of transform coefficients (134) of the selected transform (102), and/or
by decoding, if the selected transform (102) is of the multi-stage type, a value of a transform coefficient (134) of the selected transform (102) using entropy coding using a probability estimation which depends on one or more neighboring transform coefficients in a manner dependent on whether the transform coefficient (134) is within the sub-group (138) of transform coefficients (134) of the selected transform (102).

80. Decoder of any of embodiments 75 to 79,
wherein the selectable list (98) of transforms comprises at least one multi-stage transform, each involving a primary transform applied onto the current residual block (84) and a secondary transform applied onto a sub-group (138) of primary transform coefficients (134) of the primary transform, wherein the selectable list (98) comprises at least one transform of a primary transform only type,
wherein the decoder is configured to decode the transform coefficients (134)
by decoding an indication of a significant transform coefficient position (132) of the selected transform (102) and values of transform coefficients (134) of the selected transform (102) which are traversed from the significant transform coefficient position (132) onwards by a predetermined scan order (136) which sequentially traverses coefficient positions of the selected transform (102), wherein the indication is relative to a position traversed last among all transform coefficients (134) of the selected transform (102) in the predetermined scan order (136) in case of the selected transform (102) being of the primary transform only type, or relative to a position traversed last among all transform coefficients (134) not within the sub-group (138) in the predetermined scan order (136) in case of the selected transform (102) being a multi-stage transform (106), and/or
by decoding an indication of a significant transform coefficient position (132) of the selected transform and values of transform coefficients (134) of the selected transform (102) which are traversed from the significant transform coefficient position (132) onwards by a predetermined scan order (136) which sequentially traverses coefficient positions of the selected transform (102), wherein the indication comprises, if the selected transform (102) is a mufti-stage transform, a flag whether the significant transform coefficient position (132) is within the sub-group (138) of transform coefficients, and if the significant transform coefficient position (132) is within the sub-group (138) of transform coefficients (134), the indication indicates the significant transform coefficient position (132) relative to a position traversed last among all transform coefficients (134) of the selected transform (102) in the predetermined scan order (136) and if the significant transform coefficient position (132) is not within the sub-group (138) of transform coefficients (134), relative to a position traversed last among all transform coefficients (134) not within the sub-group (138) in the predetermined scan order (136), wherein the predetermined scan order (136) traverses all transform coefficients (134) within the sub-group (138) after having traversed all transform coefficients (134) not within the sub-group (138), and/or by decoding, if the selected transform (102) is of the mufti-stage type, a value of a transform coefficient (134) of the selected transform (102) using entropy coding using a probability estimation which depends on whether the transform coefficient (134) is within the sub-group (138) of transform coefficients (134) of the selected transform (102), and/or by decoding, if the selected transform (102) is of the mufti-stage type, a value of a transform coefficient (134) of the selected transform (102) using entropy coding using a probability estimation which depends on one or neighboring transform coefficients in a manner dependent on whether the transform coefficient (134) is within the sub-group (138) of transform coefficients (134) of the selected transform (102).

81. Decoder of any of embodiments 75 to 80, configured to decode the transform coefficients (134) by decoding a value of a transform coefficient (134) of the selected transform (102) using binarization and binary entropy coding wherein a probability estimation used in binary entropy coding depends on the selected transform (102), and/or wherein the binarization depends on the selected transform (102).

82. Decoder of embodiment 81, wherein the dependency on the selected transform (102) is a dependency on whether the selected transform (102) is a multi-stage transform or not.

83. Decoder of any of embodiments 75 to 82, configured to derive the selected transform (102) using an index, decode the transform coefficients (134) by decoding a value of a transform coefficient (134) of the selected transform (102) using binarization and binary entropy decoding, wherein a probability estimation used in binary entropy coding depends on the index, and/or wherein the binarization depends on the index.

84. Decoder of embodiment 83, wherein the index is a variable length code—VLC—index.

85. Decoder of any of embodiments 75 to 84, configured to decode the transform coefficients (134) by decoding a value of a transform coefficient (134) of the selected transform (102) using entropy decoding, wherein the entropy decoding depends on one or more neighboring transform coefficients in a manner dependent on the selected transform (102).

86. Decoder of embodiment 85, configured to decode the transform coefficients (134) by decoding a value of a transform coefficient (134) of the selected transform (102) using entropy decoding by selecting a local template of one or neighboring transform coefficients in a manner dependent the transform coefficient's position in the selected transform (102), determining, using a mapping of a domain of possible values of the one or neighboring transform coefficient to a set of one or more contexts for the transform coefficient (134), a selected context for the transform coefficient (134), using a probability estimation associated with the selected context for entropy decoding the value of the transform coefficient (134), wherein at least one of the selection of the local template and the mapping is dependent on the selected transform (102).

87. Decoder of embodiment 86, configured to perform the decoding of the value of the transform coefficient (134) of the selected transform (102) using binary entropy decoding a binarization of the value, wherein the probability estimation associated with the selected context is used for a bin of the binarization indicative of the value being zero or not.

88. Decoder according to any of embodiments 75 to 87, configured to perform the signaling of the selected transform (102) in the data stream (14) in a manner so that a relative positioning of a signaling of the selected transform (102) with respect to the transform coefficient data (134), and/or a decomposition of the signaling into syntax elements, depends on the selectable list (98) of transforms.

89. A method for encoding a picture into a data stream using block-based prediction and block-based residual coding, supporting a set of transforms for the block-based residual coding, wherein the method comprises steps of determining (130) a selectable list (98) of transforms for a current residual block out of the set of transforms;

signaling (128) the selected transform in the data stream, encoding (140) transform coefficients, which represent a prediction residual within the residual block using one selected transform out of the selectable list of transforms, in amanner dependent on the selected transform (102) or the selectable list (98) of transforms.

90. A method for decoding a picture from a data stream using block-based prediction and block-based residual decoding, supporting a set of transforms for the block-based residual decoding, wherein the method comprises steps of determining (130) a selectable list (98) of transforms for a current residual block out of the set of transforms;

deriving (128) the selected transform from the data stream, decoding (140) from the data stream transform coefficients, which represent a prediction residual within the residual block using one selected transform out of the selectable list of transforms, in a manner dependent on the selected transform (102) or on the selectable list (98) of transforms.

91. Encoder for encoding a picture (12) into a data stream (14) using block-based prediction and block-based residual coding, the encoder supporting a set (94) of transforms for the block-based residual coding and configured to
    determine a selectable list (98) of transforms for a current residual block (84) out of the set (94) of transforms,
    encode a prediction residual (100) within the residual block (84) using one selected transform (102) out of the selectable list (98) of transforms;
    signal (128) the selected transform (102) in the data stream (14) using a transform indicator (124),
    wherein the transform indicator (124) is signaled in the data stream (14) using a code with one or more digits, wherein each of a set of the one or more digits is uniquely associated with a respective transform property.
92. Encoder of embodiment 91, wherein each transform property is one of
    whether the selected transform (102) is a multi-stage transform, and
    whether the selected transform (102) is a transform having less transform coefficients (134) than a predetermined number of transform coefficients (134).
93. Encoder of embodiment 91 or 92, configured to
    encode at least one of the set of at least one digit using entropy coding using a probability estimation which depends on a transform indicator (124) of a neighboring residual block (84').
94. Decoder for decoding a picture (12) from a data stream (14) using block-based prediction and block-based residual decoding, the decoder supporting a set (94) of transforms for the block-based residual decoding and configured to
    determine a selectable list (98) of transforms for a current residual block (84) out of the set (94) of transforms,
    decode from the data stream (14) a prediction residual (100) within the residual block (84) using one selected transform (102) out of the selectable list (98) of transforms;
    derive (128) the selected transform (102) from the data stream (14) using a transform indicator (124),
    wherein the transform indicator (124) is derived from the data stream (14) using a code with one or more digits, wherein each of a set of the one or more digits is uniquely associated with a respective transform property.
95. Decoder of embodiment 94, wherein each transform property is one of
    whether the selected transform (102) is a multi-stage transform, and
    whether the selected transform (102) is a transform having less transform coefficients (134) than a predetermined number of transform coefficients (134).
96. Decoder of embodiment 94 or 95, configured to
    decode at least one of the set of at least one digit using entropy decoding using a probability estimation which depends on a transform indicator (124) of a neighboring residual block (84').
97. A method for encoding a picture (12) into a data stream (14) using block-based prediction and block-based residual coding, supporting a set (94) of transforms for the block-based residual coding, wherein the method comprises steps of
    determining a selectable list (98) of transforms for a current residual block (84) out of the set (94) of transforms,
    encoding a prediction residual (100) within the residual block (84) using one selected transform (102) out of the selectable list (98) of transforms;
    signaling (128) the selected transform (102) in the data stream (14) using a transform indicator (124),
    wherein the transform indicator (124) is signaled in the data stream (14) using a code with one or more digits, wherein each of a set of the one or more digits is uniquely associated with a respective transform property.
98. A method for decoding a picture (12) from a data stream (14) using block-based prediction and block-based residual decoding, supporting a set (94) of transforms for the block-based residual decoding, wherein the method comprises steps of
    determining a selectable list (98) of transforms for a current residual block (84) out of the set (94) of transforms,
    decoding from the data stream (14) a prediction residual (100) within the residual block (84) using one selected transform (102) out of the selectable list (98) of transforms;
    deriving (128) the selected transform from the data stream (14) using a transform indicator (124),
    wherein the transform indicator (124) is derived from the data stream (14) using a code with one or more digits, wherein each of a set of the one or more digits is uniquely associated with a respective transform property.
99. Encoder for encoding a picture (12) into a data stream (14) using block-based prediction and block-based residual coding, the encoder supporting a set (94) of transforms for the block-based residual coding and configured to
    predict an intra-predicted block (80) by applying a spatial neighborhood (90) of the intra-predicted block (80) onto a selected neural network out of a plurality (92) of neural networks to obtain a prediction (104) of the intra-predicted block (80), and
    determine a selectable set (98) of transforms for a residual block (84) covering the intra-predicted block (80) out of the set (94) of transforms based on the selected neural network and a block size (96) of the residual block (84),
    encode a prediction residual (100) associated with the prediction of the intra-predicted block (80) within the residual block (84) using one selected transform (102) out of the selectable set (98) of transforms and signal the selected transform in the data stream (14).
100. Encoder of embodiment 99, configured to
    perform the determination so that
    for block sizes above a predetermined threshold,
    the selectable set (98) of transforms is populated by a first number of one or more multi-stage transforms (106), each involving a primary transform (108) applied onto the prediction residual (100) and a secondary transform (110) applied onto a sub-group (112) of primary transform coefficients (114) of the primary transform (108), the secondary transform (110) being non-separable and depending on the selected neural network.

101. Encoder of embodiment 100, configured to
perform the determination so that the primary transform (108) depends on the selected neural network (102) and is a separable two-dimensional transform (116).
102. Encoder of embodiment 101, wherein the sub-group (112) represents a low-frequency portion of the primary transform (108).
103. Encoder of any of embodiments 100 to 102, wherein the first number is between 2 and 6, both inclusively.
104. Encoder of any of embodiments 100 to 103, configured to
perform the determination so that
for block sizes below the predetermined threshold, the selectable set (98) of transforms is populated by a second number of one or more non-separable transforms (118).
105. Encoder of embodiment 104, when referring back to embodiment 102, wherein the first and second number are equal.
106. Encoder of any of embodiments 100 to 105, configured to
perform the determination so that the selectable set (98) of transforms is further populated by a third number of one or more separable two-dimensional transforms (116).
107. Encoder of embodiment 106, wherein the third number is 1 or 5.
108. Encoder of any of embodiments 99 to 107, configured to
perform the prediction so that the prediction of the intra predicted block (80) is obtained in a domain (118) of a primary transform (108),
perform the determination so that
the selectable set (98) of transforms is populated by a fourth number of one or more multi-stage transforms (106), each involving the primary transform (108) and a secondary transform (110) applied onto a sub-group (112) of the primary transform coefficients (114) of the primary transform (108), the secondary transform (110) being non-separable and depending on the selected neural network.
109. Encoder of embodiment 108, configured to
perform the determination so that the primary transform (108) is a separable two-dimensional transform (116).
110. Encoder of embodiment 108 or 109, wherein the sub-group (112) represents a low-frequency portion of the primary transform (108).
111. Encoder of any of embodiments 108 to 110, wherein the fourth number is between 2 and 6, both inclusively.
112. Encoder of any of embodiments 110 to 111, configured to
perform the determination so that the selectable set (98) of transforms is further populated by the primary transform (108).
113. Encoder of any of embodiments 99 to 112 configured to
check whether a quantization parameter of the residual block (84) is included in a set of one or more predetermined quantization parameters, and
if yes, perform the determination so that
the selectable set (98) of transforms is further populated by a set of one or more predetermined transforms associated with the set of one or more predetermined quantization parameters.
114. Decoder for decoding a picture (12) from a data stream (14) using block-based prediction and block-based residual decoding, the decoder supporting a set (94) of transforms for the block-based residual decoding and configured to
predict an intra-predicted block by applying a spatial neighborhood (90) of the intra-predicted block (80) onto a selected neural network out of a plurality (92) of neural networks to obtain a prediction (104) of the intra-predicted block (80), and
determine a selectable set (98) of transforms for a residual block (84) covering the intra-predicted block (80) out of the set (94) of transforms based on the selected neural network and a block size (96) of the residual block (84),
decode a prediction residual (100) associated with the prediction (104) of the intra-predicted block (80) within the residual block (84) from the data stream in a domain of one selected transform (102) out of the selectable set (98) of transforms with deriving the selected transform from the data stream (14).
115. Decoder of embodiment 114, configured to
perform the determination so that
for block sizes above a predetermined threshold,
the selectable set (98) of transforms is populated by a first number of one or more multi-stage transforms (106), each involving a primary transform (108) applied onto the prediction residual (100) and a secondary transform (110) applied onto a sub-group (112) of primary transform coefficients (114) of the primary transform (108), the secondary transform (110) being non-separable and depending on the selected neural network.
116. Decoder of embodiment 115, configured to
perform the determination so that the primary transform (108) depends on the selected neural network (102) and is a separable two-dimensional transform (116).
117. Decoder of embodiment 116, wherein the sub-group (112) represents a low-frequency portion of the primary transform (108).
118. Decoder of any of embodiments 115 to 117, wherein the first number is between 2 and 6, both inclusively.
119. Decoder of any of embodiments 115 to 118, configured to
perform the determination so that
for block sizes below the predetermined threshold,
the selectable set (98) of transforms is populated by a second number of one or more non-separable transforms (118).
120. Decoder of embodiment 119, when referring back to embodiment 117, wherein the first and second number are equal.
121. Decoder of any of embodiments 115 to 120, configured to
perform the determination so that the selectable set (98) of transforms is further populated by a third number of one or more separable two-dimensional transforms (116).

122. Decoder of embodiment 121, wherein the third number is 1 or 5.
123. Decoder of any of embodiments 114 to 122, configured to
perform the prediction so that the prediction (104) of the intra predicted block (80) is obtained in a domain (118) a primary transform (108),
perform the determination so that
the selectable set (98) of transforms is populated by a fourth number of one or more multi-stage transforms (106), each involving the primary transform (108) and a secondary transform (110) applied onto a sub-group (112) of the primary transform coefficients (114) of the primary transform (108), the secondary transform (110) being non-separable and depending on the selected neural network.
124. Decoder of embodiment 123, configured to
perform the determination so that the primary transform (108) is a separable two-dimensional transform (116).
125. Decoder of embodiment 123 or 124, wherein the sub-group (112) represents a low-frequency portion of the primary transform (108).
126. Decoder of any of embodiments 123 to 125, wherein the fourth number is between 2 and 6, both inclusively.
127. Decoder of any of embodiments 123 to 126, configured to
perform the determination so that the selectable set (98) of transforms is further populated by the primary transform (108).
128. Decoder of any of embodiments 114 to 127 configured to
check whether a quantization parameter of the residual block (84) is included in a set of one or more predetermined quantization parameters, and
if yes, perform the determination so that
the selectable set (98) of transforms is further populated by a set of one or more predetermined transforms associated with the set of one or more predetermined quantization parameters.
129. A method for encoding a picture (12) into a data stream (14) using block-based prediction and block-based residual coding, supporting a set (94) of transforms for the block-based residual coding wherein the method comprises steps of
predicting an intra-predicted block by applying a spatial neighborhood (90) of the intra-predicted block (80) onto a selected neural network out of a plurality (92) of neural networks to obtain a prediction (104) of the intra-predicted block (80),
determining a selectable set (98) of transforms for a residual block (84) covering the intra-predicted block (80) out of the set (94) of transforms based on the selected neural network and a block size (96) of the residual block (84),
encoding a prediction residual (100) associated with the prediction of the intra-predicted block (80) within the residual block (84) using one selected transform (102) out of the selectable set (98) of transforms and signal the selected transform in the data stream (14).
130. A method for decoding a picture (12) from a data stream (14) using block-based prediction and block-based residual decoding, supporting a set (94) of transforms for the block-based residual decoding, wherein the method comprises steps of
predicting an intra-predicted block by applying a spatial neighborhood (90) of the intra-predicted block (80) onto a selected neural network out of a plurality (92) of neural networks to obtain a prediction (104) of the intra-predicted block (80),
determining a selectable set (98) of transforms for a residual block (84) covering the intra-predicted block (80) out of the set (94) of transforms based on the selected neural network and a block size (96) of the residual block (84),
decoding a prediction residual (100) associated with the prediction (104) of the intra-predicted block (80) within the residual block (84) from the data stream in a domain of one selected transform (102) out of the selectable set (98) of transforms with deriving the selected transform from the data stream (14).
131. Encoder for encoding a picture (12) into a data stream (14) using block-based prediction and block-based residual coding, the encoder configured to
predict an intra-predicted block (80) by applying a spatial neighborhood (90) of the intra-predicted block (80) onto a neural network ($NN_\#$) to obtain a prediction (104) of the intra-predicted block (80) in a domain (118) of a primary transform (108), and
encode a prediction residual (100) associated with the prediction (104) of the intra-predicted block (80) within a residual block (84) using one selected transform (102) out of a selectable set (98) of transforms and signal the selected transform (102) in the data stream (14),
wherein the selectable set (98) of transforms is populated by at least one multi-stage transform (106) involving the primary transform (108) and a secondary transform (110) applied onto a sub-group (112) of primary transform coefficients (114) of the primary transform (108).
132. Encoder of embodiment 131, wherein
the selectable set (98) of transforms is populated by a number of multi-stage transforms (106), each involving the primary transform (108) and a secondary transform (110) applied onto a sub-group (112) of primary transform coefficients (114) of the primary transform (108), the secondary transforms (110) being non-separable.
133. Encoder of any of embodiments 132, wherein the number is between 2 and 6, both inclusively.
134. Encoder of any of embodiments 131 or 133, wherein the primary transform (108) is a separable two-dimensional transform.
135. Encoder of any of embodiments 131 to 134, wherein the sub-group (112) represents a low-frequency portion of the primary transform.
136. Encoder of any of embodiments 131 to 135, configured to
perform the determination so that the selectable set (98) of transforms is further populated by the primary transform.
137. Encoder of any of embodiments 131 to 136, configured to
check whether a quantization parameter of the intra-predicted block is included in a set of one or more predetermined quantization parameters, and
if yes, perform the determination so that
the selectable set of transforms is further populated by a set of one or more predetermined transforms associated with the set of one or more predetermined quantization parameters.

138. Decoder for decoding a picture (12) from a data stream (14) using block-based prediction and block-based residual coding, the decoder configured to
predict an intra-predicted block (80) by applying a spatial neighborhood (90) of the intra-predicted block (80) onto a neural network ($NN_\#$) to obtain a prediction (104) of the intra-predicted block (80) in a domain (118) of a primary transform (108), and
decode from the data stream (14) a prediction residual (100) associated with the prediction (104) of the intra-predicted block (80) within a residual block (84) in a further domain (119) of one selected transform (102) out of a selectable set (98) of transforms with deriving the selected transform (102) from the data stream (14),
wherein the selectable set (98) of transforms is populated by at least one multi-stage transform (106) involving the primary transform (108) and a secondary transform (110) applied onto a sub-group (112) of primary transform coefficients (114) of the primary transform (108).

139. Decoder of embodiment 138, wherein
the selectable set (98) of transforms is populated by a number of multi-stage transforms (106), each involving the primary transform (108) and a secondary transform (110) applied onto a sub-group (112) of primary transform coefficients (114) of the primary transform (108), the secondary transforms (110) being non-separable.

140. Decoder of any of embodiments 139, wherein the number is between 2 and 6, both inclusively.

141. Decoder of any of embodiments 138 or 140, wherein the primary transform (108) is a separable two-dimensional transform.

142. Decoder of any of embodiments 138 to 141, wherein the sub-group (112) represents a low-frequency portion of the primary transform.

143. Decoder of any of embodiments 138 to 142, configured to
perform the determination so that the selectable set (98) of transforms is further populated by the primary transform.

144. Decoder of any of embodiments 138 to 143, configured to
check whether a quantization parameter of the intra-predicted block is included in a set of one or more predetermined quantization parameters, and
if yes, perform the determination so that
the selectable set of transforms is further populated by a set of one or more predetermined transforms associated with the set of one or more predetermined quantization parameters.

145. A method for encoding a picture (12) into a data stream (14) using block-based prediction and block-based residual coding, wherein the method comprises steps of
predicting an intra-predicted block (80) by applying a spatial neighborhood (90) of the intra-predicted block (80) onto a neural network ($NN_\#$) to obtain a prediction (104) of the intra-predicted block (80) in a domain (118) of a primary transform (108), and
encoding a prediction residual (100) associated with the prediction (104) of the intra-predicted block (80) within a residual block (84) using one selected transform (102) out of a selectable set (98) of transforms and signal the selected transform (102) in the data stream (14),
wherein the selectable set (98) of transforms is populated by at least one multi-stage transform (106) involving the primary transform (108) and a secondary transform (110) applied onto a sub-group (112) of primary transform coefficients (114) of the primary transform (108).

146. A method for decoding a picture (12) from a data stream (14) using block-based prediction and block-based residual coding, the method comprises steps of
predicting an intra-predicted block (80) by applying a spatial neighborhood (90) of the intra-predicted block (80) onto a neural network ($NN_\#$) to obtain a prediction (104) of the intra-predicted block (80) in a domain (118) of a primary transform (108), and
decoding from the data stream (14) a prediction residual (100) associated with the prediction (104) of the intra-predicted block (80) within a residual block (84) in a further domain (119) of one selected transform (102) out of a selectable set (98) of transforms with deriving the selected transform (102) from the data stream (14),
wherein the selectable set (98) of transforms is populated by at least one multi-stage transform (106) involving the primary transform (108) and a secondary transform (110) applied onto a sub-group (112) of primary transform coefficients (114) of the primary transform (108).

147. Encoder for encoding a picture (12) into a data stream (14) using block-based prediction and block-based residual coding, the encoder supporting a set (94) of transforms for the block-based residual coding and configured to
predict an intra-predicted block (80) based on a spatial neighborhood (90) of the intra-predicted block (80) using a selected one of out of a set (120) of intra prediction modes to obtain a prediction (104) of the intra-predicted block (80), and
determine a selectable set (98) of transforms for a residual block (84) covering the intra-predicted block (80) out of the set (94) of transforms based on the selected intra prediction mode and a block size (96) of the residual block (84),
encode a prediction residual (100) associated with the prediction (104) of the intra-predicted block (80) within the residual block (84) using one selected transform (102) out of the selectable set (98) of transforms and signal the selected transform (102) in the data stream (14).

148. Encoder of embodiment 147, configured to
perform the determination so that
for block sizes of a first predetermined set of predetermined block sizes,
the selectable set (98) of transforms is populated by a number of one or more multi-stage transforms (106), each involving a primary transform (108) applied onto the prediction residual (100) and a secondary transform (110) applied onto a sub-group (112) of primary transform coefficients (114) of the primary transform (108), the secondary transform (110) being non-separable and depending on the selected intra prediction mode.

149. Encoder of embodiment 148, configured to
perform the determination so that the primary transform (108) depends on the selected intra-prediction mode and is a separable two-dimensional transform (116).

150. Encoder of embodiment 148 or 149, wherein the sub-group (112) depends on the selected intra-prediction mode.

151. Encoder of any of embodiments 148 to 150, configured to
perform the determination so that
for block sizes of a second predetermined set of predetermined block sizes smaller than the first predetermined set of predetermined block sizes,
the selectable set (98) of transforms is populated by a second number of one or more non-separable transforms (118).

152. Encoder of any of embodiments 148 to 151, configured so that a manner at which the secondary transform (110) depends on the selected intra prediction mode involves an intra prediction mode aggregation.

153. Encoder of any of embodiments 148 to 152, configured so that a manner at which the primary transform (108) depends on the selected intra prediction mode involves an intra prediction mode aggregation.

154. Encoder of any of embodiments 147 to 153, configured to
check whether a quantization parameter of the residual block (84) is included in a set of one or more predetermined quantization parameters, and
if yes, perform the determination so that
the selectable set (98) of transforms is further populated by a set of one or more predetermined transforms associated with the set of one or more predetermined quantization parameters.

155. Decoder for decoding a picture (12) from a data stream (14) using block-based prediction and block-based residual decoding, the decoder supporting a set (94) of transforms for the block-based residual decoding and configured to
predict an intra-predicted block (80) based on a spatial neighborhood (90) of the intra-predicted block (80) using a selected one of out of a set (120) of intra prediction modes to obtain a prediction (104) of the intra-predicted block (80), and
determine a selectable set (98) of transforms for a residual block (84) covering the intra-predicted block (80) out of the set (94) of transforms based on the selected intra prediction mode and a block size (96) of the residual block (84),
decode from the data stream (14) a prediction residual (100) associated with the prediction (104) of the intra-predicted block (80) within the residual block (84) in a domain of one selected transform (102) out of the selectable set (98) of transforms with deriving the selected transform (102) from the data stream (14).

156. Decoder of embodiment 155, configured to
perform the determination so that
for block sizes of a first predetermined set of predetermined block sizes,
the selectable set (98) of transforms is populated by a number of one or more multi-stage transforms (106), each involving a primary transform (108) applied onto the prediction residual (100) and a secondary transform (110) applied onto a sub-group (112) of primary transform coefficients (114) of the primary transform (108), the secondary transform (110) being non-separable and depending on the selected intra prediction mode.

157. Decoder of embodiment 156, configured to
perform the determination so that the primary transform (108) depends on the selected intra-prediction mode and is a separable two-dimensional transform (116).

158. Decoder of embodiment 156 or 157, wherein the sub-group (112) depends on the selected intra-prediction mode.

159. Decoder of any of embodiments 156 to 158, configured to
perform the determination so that
for block sizes of a second predetermined set of predetermined block sizes smaller than the first predetermined set of predetermined block sizes,
the selectable set (98) of transforms is populated by a second number of one or more non-separable transforms (116).

160. Decoder of any of embodiments 156 to 159, configured so that a manner at which the secondary transform (110) depends on the selected intra prediction mode involves an intra prediction mode aggregation.

161. Decoder of any of embodiments 155 to 160 configured to
check whether a quantization parameter of the residual block (84) is included in a set of one or more predetermined quantization parameters, and
if yes, perform the determination so that
the selectable set (98) of transforms is further populated by a set of one or more predetermined transforms associated with the set of one or more predetermined quantization parameters.

162. A method for encoding a picture (12) into a data stream (14) using block-based prediction and block-based residual coding, supporting a set (94) of transforms for the block-based residual coding, wherein the method comprises steps of
predicting an intra-predicted block (80) based on a spatial neighborhood (90) of the intra-predicted block (80) using a selected one of out of a set (120) of intra prediction modes to obtain a prediction (104) of the intra-predicted block (80),
determining a selectable set (98) of transforms for a residual block (84) covering the intra-predicted block (80) out of the set (94) of transforms based on the selected intra prediction mode and a block size (96) of the residual block (84),
encoding a prediction residual (100) associated with the prediction (104) of the intra-predicted block (80) within the residual block (84) using one selected transform (102) out of the selectable set (98) of transforms and signal the selected transform (102) in the data stream (14).

163. A method for decoding a picture (12) from a data stream (14) using block-based prediction and block-based residual decoding, supporting a set (94) of transforms for the block-based residual decoding, wherein the method comprises steps of
predicting an intra-predicted block (80) based on a spatial neighborhood (90) of the intra-predicted block (80) using a selected one of out of a set (120) of intra prediction modes to obtain a prediction (104) of the intra-predicted block (80),
determining a selectable set (98) of transforms for a residual block (84) covering the intra-predicted block (80) out of the set (94) of transforms based on the selected intra prediction mode and a block size (96) of the residual block (84), decoding from the data stream (14) a prediction residual (100) associated with the prediction (104) of the intra-predicted block (80) within the residual block (84) in a domain of one selected transform (102) out of the selectable set (98) of transforms with deriving the selected transform (102) from the data stream (14).

164. Encoder for encoding a picture (12) into a data stream (14) using block-based prediction and block-based residual coding, the encoder supporting a set (94) of transforms for the block-based residual coding and configured to determine (122) a selectable list (98) of transforms for a current residual block (84) out of the set (94) of transforms based on a reference transform selected for a neighboring residual block (84', 84"), encode a prediction residual (100) within the residual block (84) using one selected transform (102) out of the selectable list (98) of transforms and signal the selected transform (102) in the data stream (14).

165. Encoder of embodiment 164, configured to order (122) the selectable list (98) using the reference transform.

166. Encoder of embodiment 164 or 165, configured to order (122) the selectable list (98) by positioning the reference transform or a transform corresponding to the reference transform at a rank (# in "n,") associated with a most probable selection, or a second most probable selection.

167. Encoder of any of embodiments 164 to 166, configured to determine (122) a selectable list (98) of transforms for a current residual block (84) out of the set (94) of transforms based on reference transforms selected for a set of neighboring residual blocks (84', 84").

168. Encoder of embodiment 167, configured to order (122) the selectable list (98) by positioning the reference transforms mutually at an order corresponding to a frequency at which the reference transforms are selected for the set of neighboring residual blocks (84', 84").

169. Encoder of any of embodiments 164 to 168, configured to populate (122) the selectable list (98) with the reference transform.

170. Encoder of any of embodiment 169, wherein the reference transform is an analytically definable separable spectrally decomposing transform and the encoder is configured to populate (122) the selectable list (98) with a further transform derived by adapting the reference transform to a block size (96) of the current residual block (84).

171. Encoder of any of embodiment 169 or 170, configured to perform the populating provided that one or more certain characteristics associated with the neighboring block (84', 84") and the current residual block (84) are sufficiently similar, and/or the reference transform is a separable spectrally decomposing transform.

172. Encoder of embodiment 171, wherein the one or more characteristics comprise one or more of an intra prediction mode.

173. Encoder of any of embodiments 164 to 172, configured to order (122) the selectable list (98) by ranking transforms in the selectable set (98) of transforms according to a similarity to the reference transform in one or more certain characteristics and/or determine the selectable list (98) of transforms in a manner excluding transforms from the selectable list (98) which exceed a certain dissimilarity to the reference transform in one or more certain characteristics.

174. Encoder of embodiment 173, wherein the one or more characteristics comprise one or more of a primary transform.

175. Encoder of any of embodiments 164 to 174, configured to order (122) the selectable list (98) by ranking transforms in the selectable set (98) of transforms depending on one or more certain characteristics of the neighboring block (84') and/or determine the selectable list (98) of transforms in a manner excluding transforms from the selectable list (98) depending on one or more certain characteristics of the neighboring block (84').

176. Encoder of embodiment 175, wherein the one or more characteristics comprise one or more of a number of significant transform coefficients.

176. Encoder of embodiment 175 or 176, wherein the one or more characteristics comprise one or more of a number of significant transform coefficients with ranking transforms less probable or excluding same which are of a mufti-stage type with a sub-group (112) of primary transform coefficients subject to a secondary transform if the number of significant transform coefficients is below a certain threshold.

178. Encoder of any of embodiments 164 to 177 configured to check whether a quantization parameter of the current block is included in a set of one or more predetermined quantization parameters, and if yes, perform the determination so that the selectable set (98) of transforms is further populated by a set of one or more predetermined transforms associated with the set of one or more predetermined quantization parameters.

179. Decoder for decoding a picture (12) from a data stream (14) using block-based prediction and block-based residual decoding, the decoder supporting a set (94) of transforms for the block-based residual decoding and configured to determine (122) a selectable list (98) of transforms for a current residual block (84) out of the set (94) of transforms based on a reference transform selected for a neighboring residual block (84', 84"), decode a prediction residual (100) within the residual block (84) in a domain of one selected transform (102) out of the selectable list (98) of transforms with deriving the selected transform (102) from the data stream (14).

180. Decoder of embodiment 179, configured to order (122) the selectable list (98) using the reference transform.

181. Decoder of embodiment 179 or 180, configured to order (122) the selectable list (98) by positioning the reference transform or a transform corresponding to the reference transform at a rank (# in "n,") associated with a most probable selection, or a second most probable selection.

182. Decoder of any of embodiments 179 to 181, configured to
   determine (122) a selectable list (98) of transforms for a current residual block (84) out of the set (94) of transforms based on reference transforms selected for a set of neighboring residual blocks (84', 84").
183. Decoder of embodiment 182, configured to
   order (122) the selectable list (98) by positioning the reference transforms mutually at an order corresponding to a frequency at which the reference transforms are selected for the set of neighboring residual blocks (84', 84").
184. Decoder of any of embodiments 179 to 183, configured to populate (122) the selectable list (98) with the reference transform.
185. Decoder of embodiment 184 wherein the reference transform is an analytically definable separable spectrally decomposing transform and the decoder is configured to
   populate (122) the selectable list (98) with a further transform derived by adapting the reference transform to a block size (96) of the current residual block (84).
186. Decoder of embodiment 184 or 185, configured to perform the populating provided that
   one or more certain characteristics associated with the neighboring block (84', 84") and the current residual block (84) are sufficiently similar, and/or
   the reference transform is a separable spectrally decomposing transform.
187. Decoder of embodiment 186, wherein the one or more characteristics comprise one or more of an intra prediction mode.
188. Decoder of any of embodiments 179 to 187, configured to
   order (122) the selectable list (98) by ranking transforms in the selectable set (98) of transforms according to a similarity to the reference transform in one or more certain characteristics, and/or
   determine the selectable list (98) of transforms in a manner excluding transforms from the selectable list (98) which exceed a certain dissimilarity to the reference transform in one or more certain characteristics.
189. Decoder of embodiment 188, wherein the one or more certain characteristics comprise one or more of a primary transform.
190. Decoder of any of embodiments 179 to 189, configured to
   order (122) the selectable list (98) by ranking transforms in the selectable set (98) of transforms depending on one or more certain characteristics of the neighboring block (84'), and/or
   determine the selectable list (98) of transforms in a manner excluding transforms from the selectable list (98) depending on one or more certain characteristics of the neighboring block (84').
191. Decoder of embodiment 190, wherein the one or more characteristics comprise one or more of a number of significant transform coefficients.
192. Decoder of embodiment 190 or 191, wherein the one or more characteristics comprise one or more of
   a number of significant transform coefficients with ranking transforms less probable or excluding same which are of a mufti-stage type with a sub-group (112) of primary transform coefficients subject to a secondary transform if the number of significant transform coefficients is below a certain threshold.
193. Decoder of any of embodiments 179 to 192 configured to
   check whether a quantization parameter of the current block is included in a set of one or more predetermined quantization parameters, and
   if yes, perform the determination so that
      the selectable set (98) of transforms is further populated by a set of one or more predetermined transforms associated with the set of one or more predetermined quantization parameters.
194. A method for encoding a picture (12) into a data stream (14) using block-based prediction and block-based residual coding, supporting a set (94) of transforms for the block-based residual coding, wherein the method comprises steps of
   determining (122) a selectable list (98) of transforms for a current residual block (84) out of the set (94) of transforms based on a reference transform selected for a neighboring residual block (84', 84"),
   encoding a prediction residual (100) within the residual block (84) using one selected transform (102) out of the selectable list (98) of transforms and signal the selected transform (102) in the data stream (14).
195. A method for decoding a picture (12) from a data stream (14) using block-based prediction and block-based residual decoding, supporting a set (94) of transforms for the block-based residual decoding, wherein the method comprises steps of
   determining (122) a selectable list (98) of transforms for a current residual block (84) out of the set (94) of transforms based on a reference transform selected for a neighboring residual block (84', 84"),
   decoding a prediction residual (100) within the residual block (84) in a domain of one selected transform (102) out of the selectable list (98) of transforms with deriving the selected transform (102) from the data stream (14).
196. Encoder for encoding a picture (12) into a data stream (14) using block-based prediction and block-based residual coding, the encoder supporting a set (94) of transforms for the block-based residual coding and configured to
   determine a selectable list (98) of transforms for a current residual block (84) out of the set of transforms, in a manner dependent on a quantization parameter of the current block so that
      if the quantization parameter corresponds to a quantization finer than a certain threshold,
         the selectable list (98) of transforms for a current residual block is populated with at least one multi-stage transform (106) involving a primary transform (108) applied onto a prediction residual (100) within the current residual block and a secondary transform (110) applied onto a sub-group (112) of primary transform coefficients (114) of the primary transform, and
      if the quantization parameter corresponds to a quantization coarser than a certain threshold,
         the selectable list of transforms for a current residual block is populated, in addition to or in place of the at least one multi-stage transform (106), with a modification of the at least one mufti-stage transform wherein the primary transform coefficients (114) beyond the sub-group (112) are zeroed, and encode the prediction residual (100) within the residual block (84) using one selected transform (102) out of the selectable list (98) of transforms and signal the selected transform in the data stream (14).

197. Decoder for decoding a picture (12) from a data stream (14) using block-based prediction and block-based residual decoding, the decoder supporting a set (94) of transforms for the block-based residual decoding and configured to determine a selectable list (98) of transforms for a current residual block (84) out of the set of transforms, in manner dependent on a quantization parameter of the current block so that if the quantization parameter corresponds to a quantization finer than a certain threshold, the selectable list (98) of transforms for a current residual block is populated with at least one multi-stage transform (106) involving a primary transform (108) applied onto a prediction residual (100) within the current residual block and a secondary transform (110) applied onto a sub-group (112) of primary transform coefficients (114) of the primary transform, and if the quantization parameter corresponds to a quantization coarser than a certain threshold, the selectable list of transforms for a current residual block populated, in addition to or in place of the at least one multi-stage transform (106), with a modification of the at least one multi-stage transform wherein the primary transform coefficients (114) beyond the sub-group (112) are zeroed, and decode the prediction residual (100) within the residual block (84) in a domain of one selected transform (102) out of the selectable list (98) of transforms with deriving the selected transform from the data stream (14).

198. A method for encoding a picture (12) into a data stream (14) using block-based prediction and block-based residual coding, supporting a set (94) of transforms for the block-based residual coding, wherein the method comprises steps of determining a selectable list (98) of transforms for a current residual block (84) out of the set of transforms, in a manner dependent on a quantization parameter of the current block so that if the quantization parameter corresponds to a quantization finer than a certain threshold, the selectable list (98) of transforms for a current residual block is populated with at least one multi-stage transform (106) involving a primary transform (108) applied onto a prediction residual (100) within the current residual block and a secondary transform (110) applied onto a sub-group (112) of primary transform coefficients (114) of the primary transform, and if the quantization parameter corresponds to a quantization coarser than a certain threshold, the selectable list of transforms for a current residual block is populated, in addition to or in place of the at least one multi-stage transform (106), with a modification of the at least one multi-stage transform wherein the primary transform coefficients (114) beyond the sub-group (112) are zeroed, and encoding the prediction residual (100) within the residual block (84) using one selected transform (102) out of the selectable list (98) of transforms and signal the selected transform in the data stream (14).

199. A method for decoding a picture (12) from a data stream (14) using block-based prediction and block-based residual decoding, supporting a set (94) of transforms for the block-based residual decoding, wherein the method comprises steps of determining a selectable list (98) of transforms for a current residual block (84) out of the set of transforms, in manner dependent on a quantization parameter of the current block so that if the quantization parameter corresponds to a quantization finer than a certain threshold, the selectable list (98) of transforms for a current residual block is populated with at least one multi-stage transform (106) involving a primary transform (108) applied onto a prediction residual (100) within the current residual block and a secondary transform (110) applied onto a sub-group (112) of primary transform coefficients (114) of the primary transform, and if the quantization parameter corresponds to a quantization coarser than a certain threshold, the selectable list of transforms for a current residual block populated, in addition to or in place of the at least one multi-stage transform (106), with a modification of the at least one multi-stage transform wherein the primary transform coefficients (114) beyond the sub-group (112) are zeroed, and decoding the prediction residual (100) within the residual block (84) in a domain of one selected transform (102) out of the selectable list (98) of transforms with deriving the selected transform from the data stream (14).

200. Encoder for encoding a picture into a data stream using block-based prediction and block-based residual coding, the encoder supporting a set of transforms for the block-based residual coding and configured to determine (122) a selectable list (98) of transforms for a current residual block out of the set of transforms based on a reference transform selected for a neighboring residual block, in a manner dependent on a number of, or a sum over, significant transform coefficients in one or more neighboring residual blocks (84', 84") so that if the number or sum is larger than a certain threshold, the selectable list (98) of transforms for a current residual block is populated with at least one multi-stage transform involving a primary transform applied onto a prediction residual (100) of the current residual block and a secondary transform applied onto a sub-group of primary transform coefficients of the primary transform, and if the number or sum is smaller than the certain threshold, the selectable list of transforms for a current residual block is populated, in addition to or in place of the at least one multi-stage transform, with a modification of the at least one multi-stage transform wherein primary transform coefficients beyond the sub-group are zeroed, and encode a prediction residual within the residual block using one selected transform out of the selectable list of transforms and signal the selected transform in the data stream.

201. Decoder for decoding a picture from a data stream using block-based prediction and block-based residual decoding, the decoder supporting a set of transforms for the block-based residual decoding and configured to determine (122) a selectable list (98) of transforms for a current residual block out of the set of transforms based on a reference transform selected for a neighboring residual block, in manner dependent on a number of, or a sum over, significant transform coefficients in one or more neighboring residual blocks (84', 84") so that if the number or sum is larger than a certain threshold,
the selectable list (98) of transforms for a current residual block is populated with at least one multi-stage transform involving a primary transform applied onto a prediction residual (100) of the current residual block and a secondary transform applied onto a sub-group of primary transform coefficients of the primary transform, and
if the number or sum is smaller than the certain threshold,
the selectable list of transforms for a current residual block is populated, in addition to or in place of the at least one multi-stage transform, with a modification of the at least one multi-stage transform wherein primary transform coefficients beyond the sub-group are zeroed, and
decode a prediction residual within the residual block in a domain of one selected transform out of the selectable list of transforms with deriving the selected transform from the data stream.

202. A method for encoding a picture into a data stream using block-based prediction and block-based residual coding, supporting a set of transforms for the block-based residual coding, wherein the method comprises steps of determining (122) a selectable list (98) of transforms for a current residual block out of the set of transforms based on a reference transform selected for a neighboring residual block, in a manner dependent on a number of, or a sum over, significant transform coefficients in one or more neighboring residual blocks (84', 84") so that if the number or sum is larger than a certain threshold,
the selectable list (98) of transforms for a current residual block is populated with at least one mufti-stage transform involving a primary transform applied onto a prediction residual (100) of the current residual block and a secondary transform applied onto a sub-group of primary transform coefficients of the primary transform, and
if the number or sum is smaller than the certain threshold,
the selectable list of transforms for a current residual block is populated, in addition to or in place of the at least one multi-stage transform, with a modification of the at least one mufti-stage transform wherein primary transform coefficients beyond the sub-group are zeroed, and
encoding a prediction residual within the residual block using one selected transform out of the selectable list of transforms and signal the selected transform in the data stream.

203. A method for decoding a picture from a data stream using block-based prediction and block-based residual decoding, supporting a set of transforms for the block-based residual decoding, wherein the method comprises steps of determining (122) a selectable list (98) of transforms for a current residual block out of the set of transforms based on a reference transform selected for a neighboring residual block, in manner dependent on a number of, or a sum over, significant transform coefficients in one or more neighboring residual blocks (84', 84") so that if the number or sum is larger than a certain threshold,
the selectable list (98) of transforms for a current residual block is populated with at least one mufti-stage transform involving a primary transform applied onto a prediction residual (100) of the current residual block and a secondary transform applied onto a sub-group of primary transform coefficients of the primary transform, and
if the number or sum is smaller than the certain threshold,
the selectable list of transforms for a current residual block is populated, in addition to or in place of the at least one multi-stage transform, with a modification of the at least one multi-stage transform wherein primary transform coefficients beyond the sub-group are zeroed, and
decoding a prediction residual within the residual block in a domain of one selected transform out of the selectable list of transforms with deriving the selected transform from the data stream.

204. A computer program for implementing the method of at least one of embodiments 19, 20, 59, 60, 89, 90, 97, 98, 129, 130, 145, 146, 162, 163, 194, 195, 198,199, 202 or 203 when being executed on a computer or signal processor.

205. A data stream obtainable by the method of at least one of embodiments 19, 20, 59, 60, 89, 90, 97, 98, 129, 130, 145, 146, 162, 163, 194, 195, 198, 199, 202 or 203.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] J. Chen, E. Aishina, G. J. Sullivan, J.-R. Ohm, J. Boye (JEM editors) "Algorithm description of Joint Exploration Test Model 7", JVET-G1001, Torino, July 2017.
[2] X. Zhao, J. Chen, M. Karczewicz, "Mode-dependent non-separable secondary transform", ITU-T SG16/Q6 Doc. COM16-C1044, October 2015.
[3] C. Lan, J. Xu and F. Wu, "Enhancement of HEVC using Signal Dependent Transform (SDT)", MPEG doc. m37503, October 2015 and ITU-T SG16/Q6 Doc. VCEG-AZO8, June 2015.
[4] E. Aishina, A. Aishin, J.-H. Min, K. Choi, A. Saxena, M. Budagavi, "Known tools performance investigation for next generation video coding", ITU-T SG16 Doc. VCEG-AZ05, June 2015.
[5] J. Chen, Y. Chen, M. Karczewicz, X. Li, H. Liu, L. Zhang, X. Zhao, "Coding tools investigation for next generation video coding", ITU-T SG16 Doc. COM16-C806, February 2015.
[6] B. Li, O. G. Guleryuz, J. Ehmann and A. Vosough, "LAYERED-GIVENS TRANSFORMS: TUNABLE COMPLEXITY, HIGH-PERFORMANCE APPROXIMATION OF OPTIMAL NON-SEPARABLE TRANSFORMS", ICIP, 2017.
[7] Said, Amir, et al. "Highly efficient non-separable transforms for next generation video coding." *Picture Coding Symposium (PCS)*, 2016. IEEE, 2016.
[8] De Luxan Hernadez, Marpe, et al. "Predictive Picture Coding using Transform-Based Residual Coding", PCT/EP2017/067708, 2018.

The invention claimed is:

1. A method for encoding a picture into a data stream using block-based prediction and block-based residual coding, the method comprising:
  determining a set of transform candidates for a current residual block out of a set of transforms based on a height and a width of the current residual block and positions of significant transform coefficients, the determined set including a primary transform, the set of transforms including a plurality of multi-stage transforms and the primary transform, each of the multi-stage transforms including the primary transform and a respective non-separable secondary transform applied to primary transform coefficients resulting in respective secondary transform coefficients;
  wherein determining the set of transform candidates includes:
    determining whether at least one transform coefficient outside a sub-group of transform coefficient positions is significant;
    in response to a determination that no transform coefficient outside the sub-group is significant, including the plurality of multi-stage transforms in the determined set; and in response to a determination that at least one transform coefficient outside the sub-group is significant, omitting the plurality of multi-stage transforms from the determined set;
selecting a transform out of the determined set of transform candidates;
encoding a prediction residual for the current residual block using the selected transform;
selectively signaling the selected transform in the data stream,
wherein selectively signaling the selected transform includes:
when the determined set of transform candidates includes the plurality of multi-stage transforms, signaling an index in the data stream; and
when the plurality of multi-stage transforms is excluded from the determined set of transform candidates, not signaling the index in the data stream.

2. A method of decoding a picture from a data stream using block-based prediction and block-based residual decoding, the method comprising:
determining a set of transform candidates for a current residual block out of a set of transforms based on a height and a width of the current residual block and positions of significant transform coefficients, the determined set including a reverse transform of a primary transform, the set of transforms including reverse transforms of a plurality of multi-stage transforms and the reverse transform of the primary transform, each of the multi-stage transforms including the primary transform and a respective non-separable secondary transform applied to primary transform coefficients resulting in respective secondary transform coefficients, wherein determining the set of transform candidates includes:
determining whether at least one transform coefficient outside a sub-group of transform coefficient positions is significant;
in response to a determination that no transform coefficient outside the sub-group is significant, including the reverse transforms for the plurality of multi-stage transforms in the determined set; and
in response to a determination that at least one transform coefficient outside the sub-group is significant, omitting the reverse transforms for the plurality of multi-stage transforms from the determined set;
selecting a transform from the determined set of transform candidates and decoding a prediction residual within the current residual block, wherein selecting a transform includes selectively decoding the transform by:
when the determined set of transform candidates includes the reverse transforms for the plurality of multi-stage transforms, decoding an index from the data stream; and
when the reverse transforms for the plurality of multi-stage transforms are excluded from the determined set of transform candidates, not decoding the index from the data stream.

3. The method of claim 1, wherein the primary transform coefficients to which the non-separable secondary transform is applied represent a low-frequency portion of the primary transform.

4. The method of claim 1, further comprising:
encoding an indication of a last significant transform coefficient position in a predetermined scan order of sequentially traversing transform coefficient positions and
determining the set of transform candidates based on the indication.

5. The method of claim 1, wherein the primary transform coefficients to which the non-separable secondary transform is applied belong to three 4×4 left/top most coefficient sub-groups.

6. The method of claim 1, wherein determining the set of transform candidates is further based on an intra prediction mode aggregation.

7. The method of claim 2, wherein the primary transform coefficients to which the non-separable secondary transform is applied represent a low-frequency portion of the primary transform.

8. The method of claim 2, further comprising:
decoding an indication of a last significant transform coefficient position in a predetermined scan order of sequentially traversing transform coefficient positions; and
determining the set of transform candidates based on the indication.

9. The method of claim 2, wherein the sub-group of primary transform coefficients to which the non-separable secondary transform is applied belong to three 4×4 left/top most coefficient sub-groups.

10. The method of claim 2, wherein determining the set of transform candidates is further based on an intra prediction mode aggregation.

11. The method of claim 2, wherein it is determined that no transform coefficient outside the sub-group is significant and between 2 and 6 reverse transforms of respective multi-stage transforms are included in the determined set.

12. A video encoder for encoding a picture into a data stream using block-based prediction and block-based residual coding, the video encoder comprising:
at least one processor configured to:
determine a set of transform candidates for a current residual block out of a set of transforms based on a height and a width of the current residual block and positions of significant transform coefficients, the determined set including a primary transform, the set of transforms including a plurality of multi-stage transforms and the primary transform, each of the multi-stage transforms including the primary transform and a respective non-separable secondary transform applied to primary transform coefficients resulting in respective secondary transform coefficients,
wherein the at least one processor is configured to determine the set of transform candidates by:
determining whether at least one transform coefficient outside a sub-group of transform coefficient positions is significant;
in response to a determination that no transform coefficient outside the sub-group is significant, including the plurality of multi-stage transforms in the determined set; and
in response to a determination that at least one transform coefficient outside the sub-group is significant, omitting the plurality of multi-stage transforms from the determined set;
select a transform out of the determined set of transform candidates;
encode a prediction residual for the current residual block using the selected transform; and
selectively signal the selected transform in the data stream, wherein the at least one processor is configured the selectively signal the selected transform in the data stream by:
  when the determined set of transform candidates includes the plurality of multi-stage transforms, signaling an index in the data stream, and
  when the plurality of multi-stage transforms is excluded from the determined set of transform candidates, not signaling the index in the data stream.

13. The video encoder of claim 12, wherein the primary transform coefficients to which the non-separable transform is applied represent a low-frequency portion of the primary transform.

14. The video encoder of claim 12, wherein the at least one processor is configured to:
  encode an indication of a last significant transform coefficient position in a predetermined scan order of sequentially traversing transform coefficient positions; and
  determine the set of transform candidates based on the indication.

15. The video encoder of claim 12, wherein the primary transform coefficients to which the non-separable secondary transform is applied belong to three 4×4 left/top most coefficient sub-groups.

16. The video encoder of claim 12, wherein the at least one processor is further configured to determine the set of transform candidates further based on an intra prediction mode aggregation.

17. A video decoder for decoding a picture into a data stream using block-based prediction and block-based residual coding, the video decoder comprising:
  at least one processor configuredto:
    determine a set of transform candidates for a current residual block out of a set of transforms based on a height and a width of the current residual block and positions of significant transform coefficients, the determined set including a reverse transform of a primary transform, the set of transforms including reverse transforms of a plurality of multi-stage transforms and the reverse transform of the primary transform, each of the multi-stage transforms including the primary transform and a respective non-separable secondary transform applied to primary transform coefficients resulting in respective secondary transform coefficients,
    wherein the at least one processor is configured to determine the set of transform candidates by:
      determining whether at least one transform coefficient outside a sub-group of transform coefficient positions is significant;
      in response to a determination that no transform coefficient outside the sub-group is significant, including the reverse transforms for the plurality of multi-stage transforms in the determined set; and
      in response to a determination that at least one transform coefficient outside the sub-group is significant, omitting the reverse transforms for the plurality of multi-stage transforms from the determined set;
    select a transform from the determined set of transform candidates and decode a prediction residual within the current residual block, wherein the at least one processor is configured to select a transform by selectively decoding the transform by:
      when the determined set of transform candidates includes the reverse transforms for the plurality of multi-stage transforms, decoding an index from the data stream, and
      when the reverse transforms for the plurality of multi-stage transforms are excluded from the determined set of transform candidates, not decoding the index from the data stream.

18. The video decoder of claim 17, wherein the primary transform coefficients to which the non-separable secondary transform is applied represent a low-frequency portion of the primary transform.

19. The video decoder of claim 17, wherein the at least one processor is configured to:
  decode an indication of a last significant transform coefficient position in a predetermined scan order of sequentially traversing transform coefficient positions; and
  determine the set of transform candidates based on the indication.

20. The video decoder of claim 17, wherein the primary transform coefficients to which the non-separable secondary transform is applied belong to three 4×4 left/top most coefficient sub-groups.

21. The video decoder of claim 17, wherein the at least one processor is configured to determine the set of transform candidates further based on an intra prediction mode aggregation.

22. The video decoder of claim 17, wherein the processor is configured to include between 2 and 6 reverse transforms of respective multistage transforms in the determined set when it is determined that no transform coefficient outside the sub-group is significant.

23. A non-transitory computer readable storage medium having a computer program stored thereon, the computer program, when executed on a processor, causing the processor to perform:
  determining a set of transform candidates for a current residual block out of a set of transforms based on a height and a width of the current residual block and positions of significant transform coefficients, the determined set including a primary transform, the set of transforms including a plurality of multi-stage transforms and the primary transform, each of the multi-stage transforms comprising the primary transform and a respective non-separable secondary transform applied to primary transform coefficients resulting in respective secondary transform coefficients,
  wherein determining the set of transform candidates includes:
    determining whether at least one transform coefficient outside a sub-group of transform coefficient positions is significant;
    in response to a determination that no transform coefficient outside the sub-group is significant, including the plurality of multi-stage transforms in the determined set; and
    in response to a determination that at least one transform coefficient outside the sub-group is significant, omitting the plurality of multi-stage transforms from the determined set;
  selecting a transform out of the determined set of transform candidates;
  encoding a prediction residual for the current residual block using the selected transform; and
  selectively signaling the selected transform in a data stream, wherein selectively signaling the selected transform includes:
when the determined set of transform candidates includes the plurality of multi-stage transforms, signaling an index in the data stream, and
when the plurality of multi-stage transforms is excluded from the determined set of transform candidates, not signaling the index in the data stream.

24. The non-transitory computer readable storage medium of claim 23, wherein the primary transform coefficients to which the non-separable secondary transform is applied represent a low-frequency portion of the primary transform.

25. The non-transitory computer readable storage medium of claim 23, wherein the computer program, when executed on the processor, causes the processor to further perform:
encoding an indication of a last significant transform coefficient position in a predetermined scan order of sequentially traversing transform coefficient positions; and
determining the set of transform candidates further based on the indication.

26. The non-transitory computer readable storage medium of claim 23, wherein the primary transform coefficients to which the non-separable secondary transform is applied belong to three 4×4 left/top most coefficient sub-groups.

27. The non-transitory computer readable storage medium of claim 23, wherein determining the set of transform candidates is further based on an intra prediction mode aggregation.

28. A non-transitory computer readable storage medium having a computer program stored thereon, the computer program, when executed on a processor, causing the processor to perform:
determining a set of transform candidates for a current residual block out of a set of transforms based on a height and a width of the current residual block and positions of significant transform coefficients, the determined set including a reverse transform of a primary transform, the set of transforms including reverse transforms of a plurality of multi-stage transforms and the reverse transform of the primary transform, each of the multi-stage transforms comprising the primary transform and a respective non-separable secondary transform applied to primary transform coefficients resulting in respective secondary transform coefficients,
wherein determining the set of transform candidates includes:
determining whether at least one transform coefficient outside a sub-group of transform coefficient positions is significant;
in response to a determination that no transform coefficient outside the sub-group is significant, including the reverse transforms for the plurality of multi-stage transforms in the determined set; and
in response to a determination that at least one transform coefficient outside the sub-group is significant, omitting the reverse transforms plurality of multi-stage transforms in the determined set;
selecting a transform from the determined set of transform candidates and decoding a prediction residual within the current residual block, wherein selecting a transform includes selectively decoding the transform by:
when the determined set of transform candidates includes the reverse transforms for the plurality of multi-stage transforms, decoding an index from a data stream, and
when the reverse transforms for the plurality of multi-stage transforms are excluded from the determined set of transform candidates, not decoding the index from the data stream.

29. The non-transitory computer readable storage medium of claim 28, wherein the primary transform coefficients to which the non-separable secondary transform is applied represent a low-frequency portion of the primary transform.

30. The non-transitory computer readable storage medium of claim 28,
wherein computer program, when executed on the processor, causes the processor to further perform:
decoding an indication of a last significant transform coefficient position in a predetermined scan order of sequentially traversing transform coefficient positions; and
determining the set of transform candidates based on the indication.

31. The non-transitory computer readable storage medium of claim 28, wherein the primary transform coefficients to which the non-separable secondary transform is applied belong to three 4×4 left/top most coefficient sub-groups.

32. The non-transitory computer readable storage medium of claim 28, wherein determining the set of transform candidates is further based on an intra prediction mode aggregation.

33. The non-transitory computer readable storage medium of claim 28, wherein it is determined that no significant coefficient outside the sub-group is significant and the reverse transforms of between 2 and 6 respective multi-stage transforms are included in the determined set.

* * * * *